US012576329B2

(12) United States Patent

Paselk et al.

(10) Patent No.: US 12,576,329 B2

(45) Date of Patent: Mar. 17, 2026

(54) MULTI-MATERIAL SKATEBOARD DECK

(71) Applicant: KARSTEN MANUFACTURING CORPORATION, Phoenix, AZ (US)

(72) Inventors: Justin A. Paselk, Phoenix, AZ (US); Jordan D. Shoenhair, Scottsdale, AZ (US); John A. Solheim, Phoenix, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

(21) Appl. No.: 18/058,215

(22) Filed: Nov. 22, 2022

(65) Prior Publication Data

US 2023/0158394 A1 May 25, 2023

Related U.S. Application Data

(60) Provisional application No. 63/380,028, filed on Oct. 18, 2022, provisional application No. 63/264,505, filed on Nov. 23, 2021.

(51) Int. Cl.
| | |
|---|---|
| *A63C 17/01* | (2006.01) |
| *B32B 3/04* | (2006.01) |

(Continued)

(52) U.S. Cl.
CPC .............. *A63C 17/017* (2013.01); *B32B 3/04* (2013.01); *B32B 5/02* (2013.01); *B32B 21/042* (2013.01); *B32B 21/10* (2013.01); *B32B 37/24* (2013.01); *B32B 38/0004* (2013.01); *B32B 2037/243* (2013.01); *B32B 2250/05* (2013.01);

(Continued)

(58) Field of Classification Search
CPC ..... A63C 17/017; A63C 17/01; A63C 17/012; A63C 17/015; B32B 3/04; B32B 5/02; B32B 21/042; B32B 21/10; B32B 37/24; B32B 38/0004; B32B 2037/243; B32B 2250/05; B32B 2255/08; B32B 2255/26; B32B 2260/021; B32B 2260/046; B32B 2307/732; B32B 2317/16; B32B 2255/02; B32B 21/14; B32B 5/024; B32B 2262/106; B32B 7/03
See application file for complete search history.

(56) References Cited

U.S. PATENT DOCUMENTS

| | | | |
|---|---|---|---|
| 6,458,462 | B1 | 10/2002 | Kang et al. |
| 6,983,951 | B2 | 1/2006 | Merino et al. |

(Continued)

FOREIGN PATENT DOCUMENTS

| | | |
|---|---|---|
| CN | 2836870 | 11/2006 |
| CN | 112571894 | 3/2021 |

(Continued)

OTHER PUBLICATIONS

Materialdistrict.com, Triaxial Woven Fabric, Nov. 26, 2009, obtained from: https://materialdistrict.com/material/triaxial-woven-fabric/ (Year: 2009).*

(Continued)

*Primary Examiner* — Brian Handville

(57) ABSTRACT

A skateboard deck with multiple layers constructed from multiple materials is disclosed. Embodiments for design and manufacture are disclosed.

18 Claims, 25 Drawing Sheets

(51) Int. Cl.

| | |
|---|---|
| *B32B 5/02* | (2006.01) |
| *B32B 21/04* | (2006.01) |
| *B32B 21/10* | (2006.01) |
| *B32B 37/24* | (2006.01) |
| *B32B 38/00* | (2006.01) |

(52) U.S. Cl.
CPC ....... *B32B 2255/08* (2013.01); *B32B 2255/26* (2013.01); *B32B 2260/021* (2013.01); *B32B 2260/046* (2013.01); *B32B 2307/732* (2013.01); *B32B 2317/16* (2013.01)

(56) References Cited

U.S. PATENT DOCUMENTS

| | | | |
|---|---|---|---|
| 7,465,481 B2 | 12/2008 | Imaizumi et al. | |
| 7,503,820 B2 | 3/2009 | Cheung | |
| 7,578,254 B2 | 8/2009 | Cheung | |
| 7,735,844 B2 | 6/2010 | Gallo | |
| 7,748,725 B2 | 7/2010 | Piumarta | |
| 8,642,186 B2 | 2/2014 | Hama et al. | |
| 9,526,976 B1 * | 12/2016 | Marshall | A63C 17/015 |
| 9,707,746 B2 | 7/2017 | McGuire | |
| 9,744,430 B2 | 8/2017 | Hill et al. | |
| 10,137,357 B1 | 11/2018 | Rosolowski et al. | |
| 10,981,371 B2 | 4/2021 | McGuire | |
| 2007/0155261 A1 * | 7/2007 | Cheung | B63B 13/00 |
| | | | 441/65 |
| 2008/0261000 A1 | 10/2008 | White et al. | |
| 2011/0037238 A1 * | 2/2011 | Devine | A63C 17/226 |
| | | | 280/87.042 |
| 2013/0303039 A1 | 11/2013 | Logosz | |

| | | | |
|---|---|---|---|
| 2017/0013120 A1 * | 1/2017 | Hodge | H04M 3/42221 |
| 2020/0298543 A1 | 9/2020 | O'Brien et al. | |
| 2021/0154989 A1 | 5/2021 | McGuire | |
| 2021/0268366 A1 | 9/2021 | Hasegawa | |
| 2021/0339113 A1 | 11/2021 | Ekker | |

FOREIGN PATENT DOCUMENTS

| | | | |
|---|---|---|---|
| EP | 0742035 | 11/1996 | |
| FR | 2836836 | 9/2003 | |
| JP | H1119272 | 1/1999 | |
| KR | 200407918 | 2/2006 | |
| TW | M597673 | 7/2020 | |
| WO | 2015/172202 | 11/2015 | |
| WO | WO-2020045240 A1 * | 3/2020 | A63C 17/01 |

OTHER PUBLICATIONS

"The Strongest Skateboard Deck in the World" (https://www.skateboardershq.com/the-strongest-skateboard-deck-in-the-world/).
Screen captures from YouTube video clip entitled "Girl Skateboards Pop Secret: Wear Test and Review," 2 pages, uploaded on Apr. 25, 2020 by user "Shredz Shop". Retrieved from Internet: <https://www.youtube.com/watch?v=k5V21Wt3DuQ>.
Screen captures from YouTube video clip entitled "Santa Cruz Introduces "The Best Skateboard You Will Ever Ride" | The VX Deck," 2 pages, uploaded on May 26, 2019 by user "The Berrics". Retrieved from Internet: <http://www.youtube.com/widgetdemo>.
Micaiah Furukawa, "Introducing Flight Deck Construction", Powell-Peralta, (Nov. 4, 2017) at <https://powell-peralta.com/blog/Flight_Deck_Construction>.

* cited by examiner

MULTI-MATERIAL SKATEBOARD DECK

CROSS REFERENCE PRIORITIES

This claims the benefit of U.S. Provisional Application No. 63/380,028, filed Dec. 18, 2022; and U.S. Provisional Application No. 63/264,505, filed Nov. 23, 2021, the contents of all of which are entirely incorporated herein by reference.

TECHNICAL FIELD

This disclosure relates generally to skateboards, and more specifically to multi-material skateboard decks.

BACKGROUND

Skateboards have been ridden for over half of a century for recreation and as a convenient and entertaining form of transportation. Skateboards have an advantage over most other wheeled forms of transportation in that they can be easily picked up and carried at the destination, for example, into a building. In addition, skilled riders have learned how to perform many different tricks on skateboards and competitions have been held between skateboarders to demonstrate their skills. Skateboards have also been used for cross-training and skills development for other balance-oriented sports such as surfing and snowboarding.

The skateboard typically comprises three main components, a skateboard deck, a plurality of truck assemblies, and a plurality of wheels. The skateboard deck provides the rider with a platform to stand on. The skateboard deck must be stable enough to allow the rider to control the board but have certain flexibility to allow for comfort while riding.

When a skateboard is used as a mode of transportation the weight of the skateboard is important, as a lighter skateboard deck is easier to carry. A rider must carry the skateboard with them once they have arrived at their destination, and therefore it is desirable for the skateboard to be as light as possible.

When a rider uses the skateboard to perform various tricks the rider must have a skateboard deck that is lightweight, durable, and retains its shape. The skateboard deck must be lightweight as it requires less force for the rider to manipulate the skateboard with their feet for the trick they are attempting. When the rider attempts a trick, the rider uses their feet to get the board off the ground by shifting their weight and then kicking the skateboard in such a way that it rotates about any axis running through the skateboard. These tricks can sometimes be at a height above the ground exceeding 10 feet even 20 feet. The skateboard deck therefore must also be durable as it will be subject to great forces upon landing the trick and when coming into contact with other surfaces. A durable skateboard deck is further required as it gives the rider peace of mind that their skateboard deck will not break during a trick, and it will save them money as the rider is no longer required to buy a skateboard deck as frequently. It is also important that a skateboard deck retains its shape and does not warp, if a skateboard deck were to warp it would be considered unrideable.

Skateboard decks are commonly made from a plurality of wooden material layers. Typical skateboard decks often comprise seven or more layers, also known as plies, of wood, such as maple wood. Due to the relatively low strength-to-weight ratio of maple wood, such prior art skateboard decks are unnecessarily heavy due to the amount of wood needed to provide structural integrity. Room for improvement exists to make skateboard decks lighter. Making a skateboard deck lighter presents multiple challenges as it is important to maintain structural integrity and provide the desired stiffness for a comfortable and advantageous riding experience while lightening the skateboard.

Certain prior art skateboard decks attempt to reduce weight by providing one or more layers with a lightweight, high-strength material, such as a fiber-reinforced polymeric material. However, due to the inability to control how an exterior fiber-reinforced layer wears over time, the fiber-reinforced layer has been limited to providing fiber-reinforced layers as internal layers, rather than a bottom or top layer of the skateboard. There is a need in the art for a multi-material skateboard deck with top and bottom layers made of a fiber-reinforced polymer to provide a high-strength board that is lighter weight and wherein the outer layers absorb stress and provide strength.

BRIEF DESCRIPTION OF THE DRAWINGS

To facilitate further description of the embodiments, the following drawings are provided in which.

DESCRIPTION

Figure 1:
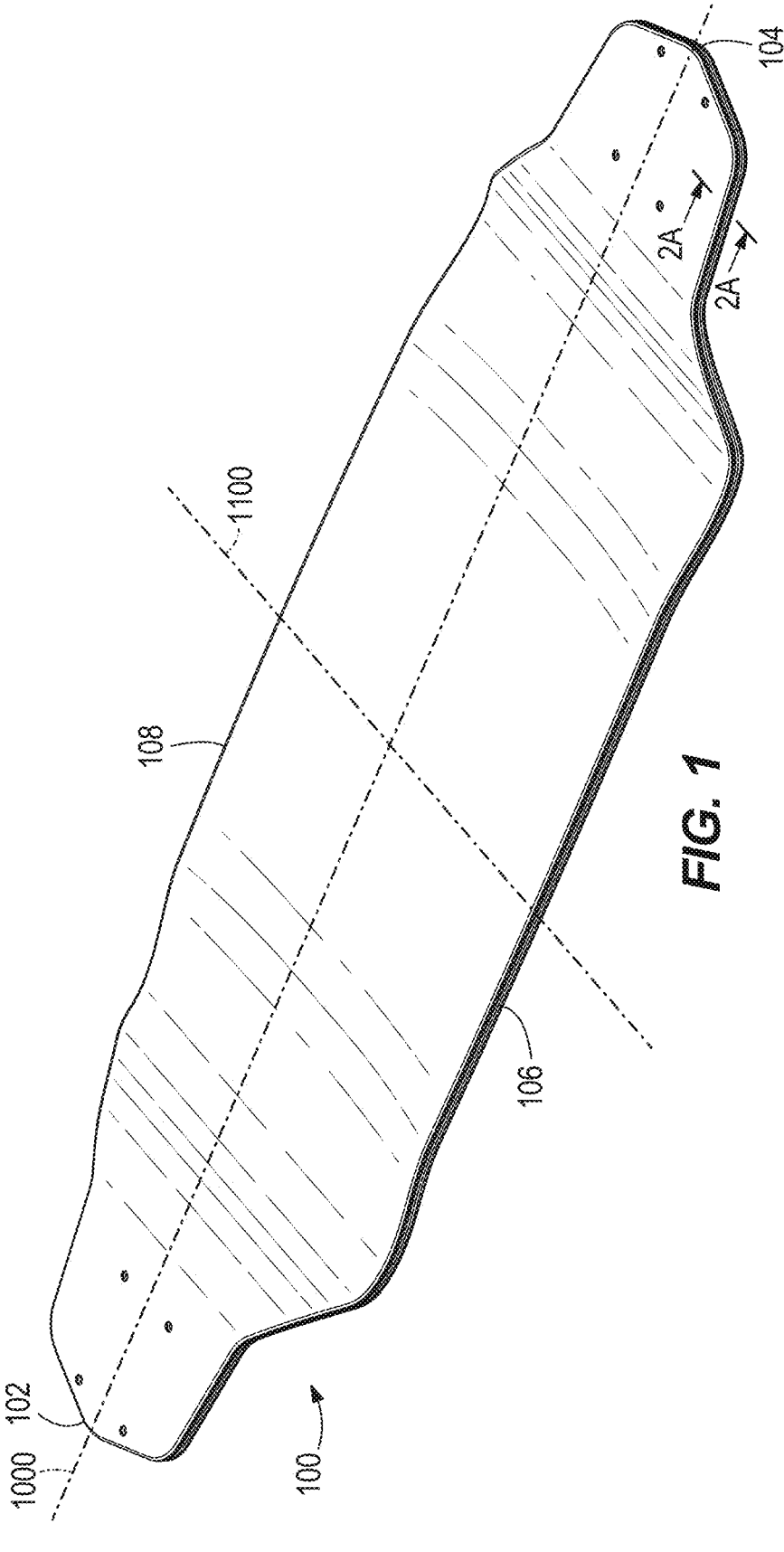
FIG. 1 illustrates a perspective view of a multi-material skateboard deck.

Embodiments of the subject matter described herein include improved skateboard decks having a multi-material construction, and methods, for example, of creating a multi-material skateboard deck. In some embodiments, the multi-material skateboard deck can comprise a plurality of layers, wherein one or more layers can be formed of a material different than that of one or more other layers. The plurality layers can be stacked together, laminated, and molded to form the multi-material skateboard deck. The plurality of layers can comprise a plurality of stiffening layers and a plurality of layers that are more resilient than the stiffening layers. In some embodiments, the stiffening layers form the outer surfaces of the skateboard. A skateboard comprising stiffening layers as the outer layers of the board (the top layer and bottom layer) absorbs stress better than an industry-standard board.

The stiffening layers are generally constructed using a material with a high strength-to-weight ratio, such as a fiber-reinforced polymeric material. Forming one or more layers from a fiber-reinforced polymeric material allows for the weight of the deck to decrease while maintaining a similar stiffness to a traditional skateboard. The fiber-reinforced polymeric material absorbs stress better than industry-standard materials such as wood. The fiber-reinforced polymeric material provides the multi-material skateboard deck with the ability to absorb stress without compromising its structural properties. The weight savings the fiber-reinforced polymeric material provides in combination with the stress absorption provide the current invention and embodiments described herein with the ability to decrease the weight of the board while maintaining similar strength and in some cases a better strength than the industry standard boards.

The fiber-reinforced polymeric material can cover 50% to 100% of a top surface area and 50% to 100% of a bottom surface area. The fiber-reinforced polymeric material used in the embodiments described herein can comprise a plurality of reinforcing fibers impregnated with a polymeric resin matrix. In many embodiments, the plurality of reinforcing fibers can be carbon fiber, aramid fiber (i.e. Kevlar), glass fiber, natural fiber (i.e. flax fiber, hemp fiber) or any other suitable fiber with a sufficient strength. The fiber-reinforced polymeric material used in the embodiments described herein can comprise an areal weight between 100 GSM (grams per square meter) to 1500 GSM. The fiber-reinforced polymeric material can comprise various weave styles to achieve different mechanical properties.

The resilient layers can comprise a material with greater flexibility than the stiffening layers. These materials include, but are not limited to, various types of wood, elastomeric materials, foams, elastomers, vitrimers, thermoplastic polymers, and thermoplastic polymers.

The embodiments described herein can have a strength-to-weight ratio between 4.0 lbf/g and 8.0 lbf/g. The embodiments described herein can have a strength-to-weight ratio after approximately 1-2 months of heavy use between 4.0 lbf/g and 8.0 lbf/g. The embodiments described herein can have a mass of 400 grams to 1500 grams. The embodiments described herein can have a weight saving of 9% to 65% when compared to an industry-standard board.

The lamination and pressing process implemented to construct the multi-material deck utilizes a resin to adhere the various layers together. Resin is applied to each layer, the layers are stacked together to form a deck, and the deck is placed in a mold. After the deck is placed in the mold, a hydraulic press applies heat and pressure to the deck to compress the layers and cure the resin. The pressure during the lamination process can range from 90 psi to 200 psi. The heat during the lamination process can range from 150° F. to 210° F. The process of heating and pressing the layers of the deck removes excess epoxy by reducing the viscosity of the resin and allowing it to flow out from the interlaminar layers more easily. This results in a reduction of up to 30% of the epoxy applied during the combination process, which improves the mechanical properties and performance of the deck.

Further, these skateboard decks can be coupled with multi-wheel trucks that are designed to minimize wheel interactions with noncontinuous and uneven surfaces. The overall riding and commuting experience a rider can experience with the improved weight and strength capabilities of the deck coupled with the smooth riding characteristics provided by the multi-wheel truck can enhance an individual's experience and satisfaction.

These skateboard decks can further be combined with a street-style skateboard truck, that is a skateboard truck that is designed to be used to perform various tricks such as jumps, vert ramp, halfpipe, street skate style, big air, and any other forms of trick a rider can perform on a skateboard.

These skateboard decks can be coupled with any form of an electronic motorized wheel, electric motors, or any assembly that would form an electronically powered skateboard assembly. In some embodiments, the skateboard can have a remote that controls the motor and thus dictates the speed at which the board travels. The electronically powered skateboard assembly can further comprise a battery pack to power the motors.

The weight savings the multi-material deck provided is advantageous as when it is used in combination with an electric board assembly or the multi-wheel trucks the board can have a similar weight to a board that has a typical two-wheel skateboard truck. The multi wheel trucks and the electric board assembly add un-wanted weight. The multi-material deck provides both situations a deck that saves weight and maintains the strength required for a skateboard deck.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment. The terms "comprises," "comprising," "including," and "having," are inclusive and therefore specify the presence of stated items, but do not preclude the presence of other items. As used in this specification, the term "or" includes any and all combinations of one or more of the listed items. When the terms first, second, third, etc. are used to differentiate various items from each other, these designations are merely for convenience and do not limit the items.

The terms "first," "second," "third," "fourth," "fifth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements, mechanically or otherwise. Coupling (whether mechanical or otherwise) may be for any length of time, e.g., permanent or semi-permanent or only for an instant.

The term or phrase "connect", "connected", "connects", "connecting" used herein can be defined as joining two or more elements together, mechanically or otherwise. Connecting (whether mechanical or otherwise) can be for any length of time, e.g. permanent or semi-permanent or only for an instant.

The term or phrase "link", "linked", "links", "linking" used herein can be defined as a relationship between two or more elements where at least one element affects another element. Linking (whether mechanical or otherwise) can be for any length of time, e.g. permanent or semi-permanent or only for an instant.

The term or phrase "secure", "secured", "secures", "securing" used herein can be defined as fixing or fastening (one or more elements) firmly so that it cannot be moved or become loose. Securing (whether mechanical or otherwise) can be for any length of time, e.g. permanent or semi-permanent or only for an instant.

The term or phrase "skateboard" used herein can be defined as a ridable apparatus. The skateboard can be defined by four distinct portions. A top portion of the skateboard is defined as the portion of a deck the user stands on. A bottom portion of the skateboard is defined as the portion opposite the top portion. A stance of the right footed user by convention is defined as the left foot being forward of the right foot. A front portion of the skateboard is defined as being proximal to the left foot of the user. A back portion of the skateboard is defined as being proximal with the right foot of the user. A forward direction is defined as the skateboard direction of travel when the right foot pushes backwards on a ground surface to make the skateboard move in the opposite direction. Similarly, when the multi-wheel truck of the present invention is attached to the deck of said skateboard, a front portion of the multi-wheel truck can be defined as the portion of the truck disposed nearest the front portion of the skateboard, and a back portion of the truck can be defined as the portion of the truck disposed nearest the back portion of the skateboard.

The term or phrase "ground" or "rolling surface" used herein can be defined as the surface on which the wheels of the skateboard typically roll. The ground or rolling surface is considered to be a generally smooth surface during typical operation of the skateboard. However, at certain locations, the ground or rolling surface can comprise discontinuities or obstacles such as cracks, bumps, expansion joints, or foreign objects that create a portion of the ground or rolling surface that is unsmooth.

In many examples as used herein, the term "approximately" can be used when comparing one or more values, ranges of values, relationships (e.g., position, orientation, etc.) or parameters (e.g., velocity, acceleration, mass, temperature, spin rate, spin direction, etc.) to one or more other values, ranges of values, or parameters, respectively, and/or when describing a condition (e.g., with respect to time), such as, for example, a condition of remaining constant with respect to time. In these examples, use of the word "approximately" can mean that the value(s), range(s) of values, relationship(s), parameter(s), or condition(s) are within $\pm 0.5\%$, $\pm 1.0\%$, $\pm 2.0\%$, $\pm 3.0\%$, $\pm 5.0\%$, and/or $\pm 10.0\%$ of the related value(s), range(s) of values, relationship(s), parameter(s), or condition(s), as applicable.

The term quasi-isotropic used herein can be defined as properties for a material in which the strength and stiffness are equal in all directions within a single plane.

The term triaxial as used herein can be defined for a material that comprises fibers oriented along three different axes within a single plane.

The term or phrase industry standard 7-ply used herein can be defined as a standard build skateboard deck comprising 7 layers of maple laminated together.

The term or phrase industry standard 9-ply used herein can be defined as a standard build skateboard deck comprising 9 layers of maple laminated together.

The term thickness relates to a measurement taken at any single point on a skateboard deck. The thickness is measured in a direction that is perpendicular to a plane created by a longitudinal axis 1000 and a transversal axis 1100.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

I. GENERAL DESCRIPTION OF THE MULTI-MATERIAL SKATEBOARD DECK

Referring to FIG. 1, the multi-material skateboard deck 100 comprises a nose 102, a tail 104, a heel end 106, and a toe end 108. The nose 102 can be defined at a front end of the board, wherein the front end is located toward the direction of travel during use of the skateboard. The tail 104 is opposite the nose 102, located at the rear end opposite the direction of travel during use of the skateboard. The heel end 106 extends from the nose 102 to the tail 104 along the side proximate the heels of a user riding the skateboard with a "regular" stance (wherein the user's left foot is proximate the nose of the deck, and the user's right foot is proximate the tail of the deck). The toe end 108 extends from the nose 102 to the tail 104 opposite the heel end 106, along the side proximate the toes of a user riding the skateboard with a regular stance. A longitudinal axis 1000 connects the nose 102 and the tail 104, and a transverse axis 4100 connects the heel end 106 and toe end 108. The transverse axis 4100 is perpendicular to the longitudinal axis 1000. The deck further comprises a riding surface 114 on which the rider stands during use, and an underside surface 116 opposite the riding surface 114.

The multi-material skateboard deck 100 can be formed by a plurality of stiffening layers and a plurality of resilient layers laminated together. The combination of layer type with external stiffening layers and internal resilient layers allows the decks to be lighter than industry standard decks while maintaining at least the same strength to weight ratios. An industry standard skateboard deck typically has a mass between approximately 1000.0 to 2000.0 grams, depending on the shape and layup. For example, an industry standard 7-ply layup typically has a mass between approximately 1000.0 to 1450.0 grams and an industry standard 9-ply layup typically has a mass between approximately 1400.0 to 2000.0 grams. An industry standard skateboard deck typically has a strength to weight ratio between approximately 3.5 to 3.9 lbf/g, depending on the layup. For example, an industry standard 7-ply layup typically has a strength to weight ratio of approximately 3.9 lbf/g and an industry stiff 9-ply layup typically has a weight to strength ratio of approximately 3.5 lbf/g. The multi-material skateboard deck 100 described herein can be between 9% and 65% lighter than the industry standard boards while maintaining a strength to weight ration or in some cases increasing a strength to weight ratio between 4.0 lbf/g and 8.0 lbf/g.

In many embodiments, the mass of the multi-material skateboard deck 100 can be between 400.0 and 1500.0 grams. In some embodiments, the mass of the multi-material skateboard deck 100 can be between 400.0 and 450.0 grams, 450.0 and 500.0 grams, 500.0 and 550.0 grams, 550.0 and 600.0 grams, 600.0 and 650.0 grams, 650.0 and 700.0 grams, 700.0 and 750.0 grams, 750.0 and 800.0 grams, 800.0 and 850.0 grams, 850.0 and 900.0 grams, 900.0 and 950.0 grams, 950.0 and 1000.0 grams, 1000.0 and 1050.0 grams, 1050.0 and 1100.0 grams, 1100.0 and 1150.0 grams, 1150.0 and 1200.0 grams, 1200.0 and 1250.0 grams, 1250.0 and 1300.0 grams, 1300.0 and 1350.0 grams, 1350.0 and 1400.0 grams, 1400.0 and 1450.0 grams, or 1450.0 and 1500.0 grams. In some embodiments the mass of the multi-material skateboard deck 100 can be less than or equal to 400.0 grams, 450.0 grams, 500.0 grams, 550.0 grams, 600.0 grams, 650.0 grams, 700.0 grams, 750.0 grams, 800.0 grams, 850.0 grams, 900.0 grams, 950.0 grams, 1000 grams, 1050 grams, 1100 grams, 1150 grams, 1200 grams, 1250 grams, 1300 grams, 1350 grams, 1400 grams, 1450 grams, or 1500 grams. In some embodiments the mass of the multi-material skateboard deck 100 can be no greater than 400.0 grams, 450.0 grams, 500.0 grams, 550.0 grams, 600.0 grams, 650.0 grams, 700.0 grams, 750.0 grams, 800.0 grams, 850.0 grams, 900.0 grams, 950.0 grams, 1000 grams, 1050 grams, 1100 grams, 1150 grams, 1200 grams, 1250 grams, 1300 grams, 1350 grams, 1400 grams, 1450 grams, or 1500 grams.

In many embodiments, the mass of the multi-material skateboard deck 100 can be between 8% and 65% lighter than a comparably shaped deck comprising an industry standard layup. In some embodiments, the mass of the multi-material skateboard deck 100 can be between 8% and 10%, 10% and 15%, 15% and 20%, 20% and 25%, 25% and 30%, 30% and 35%, 35% and 40%, 40% and 45%, 45% and 50%, 50% and 55%, 55% and 60%, or 60% and 65% lighter than a comparably shaped deck comprising an industry standard layup. In some embodiments, the mass of the multi-material skateboard deck 100 can be at least 8%, 10%, 15%, 20%, 25%, 30%, 35%, 40%, 45%, 50%, 55%, 60%, or 65% lighter than a comparably shaped deck comprising an industry standard layup. In some embodiments, the mass of the multi-material skateboard deck 100 can be greater than or equal to 8%, 10%, 15%, 20%, 25%, 30%, 35%, 40%, 45%, 50%, 55%, 60%, or 65% lighter than a comparably shaped deck comprising an industry standard layup.

In many embodiments, the strength to weight ratio of the multi-material skateboard deck 100 can be between 4.0 and 8.0 lbf/g. In some embodiments, the strength to weight ratio of the multi-material skateboard deck 100 can be between 4.0 and 4.2 lbf/g, 4.2 and 4.4 lbf/g, 4.4 and 4.6 lbf/g, 4.6 and 4.8 lbf/g, 4.8 and 5.0 lbf/g, 5.0 and 5.2 lbf/g, 5.2 and 5.4 lbf/g, 5.4 and 5.6 lbf/g, 5.6 and 5.8 lbf/g, or 7.8 and 8.0 lbf/g. In some embodiments, the strength to weight ratio of the multi-material skateboard deck 100 can be at least 4.0 lbf/g, 4.2 lbf/g, 4.4 lbf/g, 4.6 lbf/g, 4.8 lbf/g, 5.0 lbf/g, 5.2 lbf/g, 5.4 lbf/g, 5.6 lbf/g, 5.8 lbf/g, or 6.0 lbf/g. In some embodiments, the strength to weight ratio of the multi-material skateboard deck 100 can be at greater than or equal to 4.0 lbf/g, 4.2 lbf/g, 4.4 lbf/g, 4.6 lbf/g, 4.8 lbf/g, 5.0 lbf/g, 5.2 lbf/g, 5.4 lbf/g, 5.6 lbf/g, 5.8 lbf/g, 6.0 lbf/g, 6.2 lbf/g, 6.4 lbf/g, 6.6 lbf/g, 6.8 lbf/g, 7.0 lbf/g, 7.2 lbf/g, 7.4 lbf/g, 7.6 lbf/g, 7.8 lbf/g, or 8.0 lbf/g.

An industry standard skateboard deck that has undergone approximately 1 to 2 months of heavy use typically has a strength to weight ratio between approximately 3.0 to 3.9 lbf/g, depending on the layup. For example, an industry standard 7-ply layup that has undergone approximately 1 to 2 months of heavy use typically has a strength to weight ratio of approximately 3.1 lbf/g and an industry stiff 9-ply layup that has undergone approximately 1 to 2 months of heavy use typically has a weight to strength ratio of approximately 3.3 lbf/g. The multi-material skateboard deck 100 described herein can be between 9% and 65% lighter than the industry standard boards while maintaining a strength to weight ratio and in some cases increasing a strength to weight ratio between 4.0 lbf/g and 8.0 lbf/g. In some embodiments, the strength to weight ratio of the multi-material skateboard deck 100 that has undergone approximately 1 to 2 months of heavy use can be between 4.0 and 4.2 lbf/g, 4.2 and 4.4 lbf/g, 4.4 and 4.6 lbf/g, 4.6 and 4.8 lbf/g, 4.8 and 5.0 lbf/g, 5.0 and 5.2 lbf/g, 5.2 and 5.4 lbf/g, 5.4 and 5.6 lbf/g, 5.6 and 5.8 lbf/g, or 7.8 and 8.0 lbf/g. In some embodiments, the strength to weight ratio of the multi-material skateboard deck 100 that has undergone approximately 1 to 2 months of heavy use can be at least 4.0 lbf/g, 4.2 lbf/g, 4.4 lbf/g, 4.6 lbf/g, 4.8 lbf/g, 5.0 lbf/g, 5.2 lbf/g, 5.4 lbf/g, 5.6 lbf/g, 5.8 lbf/g, or 6.0 lbf/g. In some embodiments, the strength to weight ratio of the multi-material skateboard deck 100 that has undergone approximately 1 to 2 months of heavy use can be at greater than or equal to 4.0 lbf/g, 4.2 lbf/g, 4.4 lbf/g, 4.6 lbf/g, 4.8 lbf/g, 5.0 lbf/g, 5.2 lbf/g, 5.4 lbf/g, 5.6 lbf/g, 5.8 lbf/g, 6.0 lbf/g, 6.2 lbf/g, 6.4 lbf/g, 6.6 lbf/g, 6.8 lbf/g, 7.0 lbf/g, 7.2 lbf/g, 7.4 lbf/g, 7.6 lbf/g, 7.8 lbf/g, or 8.0 lbf/g.

In many embodiments, each of the plurality of stiffening layers comprises a material with a high strength-to-weight ratio. In many embodiments, the stiffening layer comprises a fiber-reinforced polymeric material. The fiber-reinforced polymeric material can comprise a plurality of reinforcing fibers impregnated with a polymeric resin. The polymeric material can be a thermoset resin with a maximum glass transition temperature of 125 F°, polybenzoxazine networks, polyurethanes, polyurea, phenolics, polyimides, polyesters, cyanate esters, vinyl ester and silicone resins, hydrocarbon based thermoplastic such as polyethylene or polypropylene, polyamides, polyethylene terephthalate, polybutylene terephthalate, polylactic acid, acrylonitrile butadiene styrene, polystyrene, polymethyl methacrylate, polyphenylene sulfide and polycarbonate, or any vitrimer resin.

In many embodiments, the plurality of reinforcing fibers can be carbon fiber, glass fiber, boron fibers, basalt fibers, any natural fiber (i.e. hemp fiber, banana fiber, flax fiber, pine straw fiber among others), metallic fibers, Kevlar fibers, or any other suitable fiber with sufficient strength. The fiber-reinforced polymeric material can be any combination of the aforementioned fibers with any of the aforementioned thermoplastic, thermoset, vitrimer, or a mixture of these resins as the matrix.

The fiber-reinforced polymeric material can cover 50% to 100% of a top surface area and 50% to 100% of a bottom surface area. The top surface area is the surface area of the board when viewing the board from the top. The bottom surface area is the surface area of the board when viewing the board from the bottom. In some embodiments, the fiber-reinforced polymeric material approximately covers 50% of the top surface area and 50% of the bottom surface area. In some embodiments, the fiber-reinforced polymeric material approximately covers 55% of the top surface area and covers 55% of the bottom surface area. In some embodiments, the fiber-reinforced polymeric material approximately covers 60% of the top surface area and covers 60% of the bottom surface area. In some embodiments, the fiber-reinforced polymeric material approximately covers 65% of the top surface area and covers 65% of the bottom surface area. In some embodiments, the fiber-reinforced polymeric material approximately covers 70% of the top surface area and approximately covers 70% of the bottom surface area. In some embodiments, the fiber-reinforced polymeric material approximately covers 75% of the top surface area and covers 75% of the bottom surface area. In some embodiments, the fiber-reinforced polymeric material approximately covers 80% of the top surface area and covers 80% of the bottom surface area. In some embodiments, the fiber-reinforced polymeric material approximately covers 85% of the top surface area and covers 85% of the bottom surface area. In some embodiments, the fiber-reinforced polymeric material approximately covers 90% of the top surface area and covers 90% of the bottom surface area. In some embodiments, the fiber-reinforced polymeric material approximately covers 95% of the top surface area and covers 95% of the bottom surface area. In some embodiments, the fiber-reinforced polymeric material approximately covers 100% of the top surface area and covers 100% of the bottom surface area.

The plurality of reinforcing fibers of each layer can be oriented in one or more fiber plies with a specific directionality. In some embodiments, the stiffening layer can comprise one or more unidirectional plies. The fiber orientation of the one or more unidirectional plies can be oriented in a direction parallel to the longitudinal axis 1000, perpendicular (90°) to the longitudinal axis 1000, or at an acute angle from the longitudinal axis 1000.

The fiber orientation of the plies parallel to the longitudinal axis 1000 can be arranged between −10° and 10°. In some embodiments, the orientation of these fibers can be between −10° and −5°, between −5° and 0°, between 0° and 5°, or between 5° and 10° relative to the longitudinal axis 1000. The fiber orientation of the plies perpendicular to the longitudinal axis 1000 can be arranged between 80° and 100°. In some embodiments, the orientation of these fibers can be between 80° and 85°, between 85° and 90°, between 90° and 95°, or between 95° and 100° relative to the longitudinal axis of the deck. The fiber orientation of the plies at an acute angle from the longitudinal axis 1000 can be arranged between −90° and 90°. In some embodiments, the orientation of these fibers can be greater than or equal to −90°, −80°, −70°, −60°, −50°, −40°, −30°, −20°, −10°, 0°, 10°, 20°, 30°, 40°, 50°, 60°, 70°, 80°, or at a maximum 90°.

In a particular triaxial weave that can be used in any of the embodiments described herein, the triaxial weave can comprise a polyacrylonitrile (PAN)-based carbon fiber. The carbon fiber weave is braided in a triaxial fashion where a plurality of longitudinal fibers are placed at 0° relative to the longitudinal axis and a plurality of axial fibers are placed at +/−60° relative to the longitudinal axis. The longitudinal fibers entail 60% to 70% of the total weight of the triaxial weave while the axial fibers comprise the remaining 30% to 40% of the weight. The fiber orientation helps the board to be stiffer in the longitudinal direction providing support to the transversal direction. The width of the triaxial weave is 12 inches and the thickness of each layer is 0.02 inches. This fabric width is designed to facilitate an easier manufacturing process for skateboards. The width allows the triaxial weave needed to be cut in the transversal axis 1100 direction instead of a transversal axis 1100 direction and a longitudinal axis 1000 direction. Fewer cuts in the carbon fiber weave not only entails time savings during the fabrication of the skateboards but also reduces the risk of fiber slippage during the compression molding. Fiber slippage will produce an imbalance in the fiber lay-up across the skateboard. The triaxial weave comprises an areal weight of this carbon fiber weave is between 500 grams per square meter (GSM) and 600 GSM.

In some embodiments, the stiffening layer can comprise a plurality of unidirectional plies with different orientations laminated together to create a single fiber-reinforced layer with quasi-isotropic properties. In many other embodiments, the stiffening layer can comprise a woven fiber ply. In some embodiments, the woven fiber ply can be a plain weave, a twill weave, a harness satin weave, a fish weave, a spread tow weave, a braided weave, a unidirectional weave, a triaxial weave, a custom weave, or any other suitable weave. The woven fiber ply can be aligned in a plurality of directions in relation to the longitudinal axis 1000 and the transverse axis 1100.

The weaves can comprise an areal weight of fibers ranging from 100 GSM to 1500 GSM. The areal weight can be between 100 GSM and 200 GSM, 200 GSM and 300 GSM, 300 GSM and 400 GSM, 400 GSM and 500 GSM, 500 GSM and 600 GSM, 600 GSM and 700 GSM, 700 GSM and 800 GSM, 800 GSM and 900 GSM, 900 GSM and 1000 GSM, 1000 GSM and 1100 GSM, 1100 GSM and 1200 GSM, 1200 GSM and 1300 GSM, 1300 GSM and 1400 GSM or 1400 GSM and 1500 GSM.

Each of the plurality of resilient layers in many embodiments can comprise a material with greater flexibility than the stiffening layers. These materials include, but are not limited to, various types of wood, elastomeric materials, foams, elastomers, vitrimers, thermoplastic polymers, and thermoplastic polymers. The resilient layers can comprise a wood material including but not limited to maple, walnut, balsa, cherry, mahogany, oak, ash, birch, ebony, rainbow wood, black walnut, spruce, aspen, pine, or any other type of suitable wood. In some embodiments, the structural properties of the resilient layers align in some relation to the longitudinal axis 1000 and transversal axis 1100. For example, in embodiments comprising a resilient layer made of wood, the ply of wood used can have fibers aligned in a singular direction, giving the ply a particular grain orientation. The grain orientation gives the ply a structural property wherein the ply is stronger in the direction of the grain when compared to the strength in a direction perpendicular to the grain. Different materials will have different structural properties that can be aligned in a plurality of directions in relation to the longitudinal axis 1000 and transverse axis 1100 of the multi-material skateboard deck 100. The resilient layers provide flexibility to the skateboard deck. A more flexible skateboard deck can absorb vibrations associated with riding the skateboard and provides a more comfortable ride to the user.

The stiffening layers and resilient layers can vary in thickness within a single deck and across various deck embodiments. In embodiments that encompass at least two resilient layers the resilient layers can be between 0.040 and 0.070 inch in thickness. In some embodiments, the at least two resilient layers can be between 0.040 and 0.045 inch, 0.045 inch and 0.050 inch, 0.050 and 0.055 inch, 0.055 inch and 0.060 inch, 0.060 and 0.065 inch, or 0.065 inch and 0.070 inch in thickness. In some embodiments, the at least two resilient layers can be at least 0.040 inch, 0.045 inch, 0.050 inch, 0.055 inch, 0.060 inch, 0.065 inch, or 0.070 inch in thickness. In some embodiments, the at least two resilient layers can be less than or equal to 0.040 inch, 0.045 inch, 0.050 inch, 0.055 inch, 0.060 inch, 0.065 inch, or 0.070 inch in thickness. In some embodiments, the at least two resilient layers can be a maximum thickness of 0.040 inch, 0.045 inch, 0.050 inch, 0.055 inch, 0.060 inch, 0.065 inch, or 0.070 inch. In embodiments that encompass a single resilient layer the resilient layer can be between 0.20 and 0.30 inch in thickness. In some embodiments, the single resilient layer can be between 0.20 and 0.22 inch, 0.22 and 0.24 inch, 0.24 and 0.26 inch, 0.26 and 0.28 inch, or 0.28 and 0.30 inch in thickness. In some embodiments, the single resilient layer can be at least 0.20 inch, 0.22 inch, 0.24 inch, 0.26 inch, 0.28 inch, or 0.30 inch in thickness. In some embodiments, the single resilient layer can be less than or equal to 0.20 inch, 0.22 inch, 0.24 inch, 0.26 inch, 0.28 inch, or 0.30 inch in thickness. In some embodiments, the single resilient layer can be a maximum thickness of 0.20 inch, 0.22 inch, 0.24 inch, 0.26 inch, 0.28 inch, or 0.30 inch in thickness. In many embodiments, the stiffening layers can be between 0.005 inch and 0.0150 inch in thickness. In some embodiments, the stiffening layer can be at least 0.005 inch, 0.0075 inch, 0.0100 inch, 0.0125 inch, or 0.0150 inch in thickness. In some embodiments, the stiffening layer can be less than or equal to 0.005 inch, 0.0075 inch, 0.0100 inch, 0.0125 inch, or 0.0150 inch in thickness. In some embodiments, the stiffening layer can be a maximum thickness of 0.005 inch, 0.0075 inch, 0.0100 inch, 0.0125 inch, or 0.0150 inch. The reinforcing fibers in the stiffening layer are encased within a polymeric resin matrix. In many embodiments, the resin matrix can comprise a thermoplastic resin, a thermosetting resin (i.e. epoxy resin), a vitrimer resin, or any other suitable resin. The polymeric resin matrix can have a thickness of 0.005 inches or less in between each layer of the plurality of layers. As the resin thickness between each layer decreases the stress the resin endures under load decreases. In other words, additional thickness of the epoxy subjects the epoxy matrix to greater stress under load, in that the stress is borne by the epoxy instead of being transferred to the material of the bonded layers.

The embodiments of a multi-material skateboard deck described herein can have a thickness between 0.2 inch to 0.7 inch. The thickness can be between 0.2 inch to 0.25 inch. The thickness can be between 0.25 inch to 0.3 inch. The thickness can be between 0.3 inch to 0.35 inch. The thickness can be between 0.35 inch to 0.4 inch. The thickness can be between 0.4 inch to 0.45 inch. The thickness can be between 0.45 inch to 0.5 inch. The thickness can be between 0.5 inch to 0.55 inch. The thickness can be between 0.6 inch to 0.65 inch. The thickness can be between 0.65 inch to 0.7 inch.

In many embodiments, one or more stiffening layers can comprise a graphic or decal to enhance the aesthetic appearance of the multi-material skateboard deck 100. In particular, it is desirable for any stiffening layers that form a visible surface of the multi-material skateboard deck 100 (i.e. the riding surface 114 or the underside surface 116) to comprise a graphic or decal 160. In many embodiments one or more stiffening layers forming a visible surface of the multi-material skateboard deck 100 which can comprise a decal 160 encased within the resin matrix. Encasing the decal 160 within the resin matrix allows the decal to be visible, as if printed on or adhered to the surface of the laminate, as well as protects the decal from scratching, peeling, or otherwise becoming damaged.

In many embodiments, the decal 160 can be a vinyl decal. The decal 160 can comprise any shape or size suitable to fit within the stiffening layer. In many embodiments, particularly in embodiments comprising a relatively large decal, the decal 160 can comprise a plurality of perforations that allow resin to easily flow through the decal 160. The plurality of perforations can keep the decal 160 from folding or creasing as the resin is applied to the stiffening layer.

The multi-material skateboard 100 deck can further comprise a shape suitable for comfortable and easy riding. The shape of the multi-material skateboard deck 100 can be formed through a molding process, described in detail below. In many embodiments, the multi-material skateboard deck 100 can comprise a shape standard in the skateboarding industry, such as a long board shape, a radial shape, a progressive shape, a w-concave shape, a flat cave shape, a gas pedal shape, an asymmetric shape, a convex shape, a flat shape, a rocker shape, a camber shape, a drop down shape, a cruiser shape, a mini cruiser shape, or a bulldog cruiser shape.

Providing one or more layers of the multi-material skateboard deck 100 as a fiber-reinforced polymeric material provides stiffness and strength to the multi-material skateboard deck 100 without contributing a significant amount of weight. Replacing layers that would otherwise be formed of wood in the prior art with a fiber-reinforced stiffening layer reduces the weight of the skateboard deck, because the stiffening layer comprises a greater strength-to-weight ratio than the typical wood used in prior art skateboard decks, and therefore less weight is required to provide the same stiffness and structural integrity.

II. EMBODIMENT I. OF THE MULTI-MATERIAL SKATEBOARD DECK

Figure 2A:
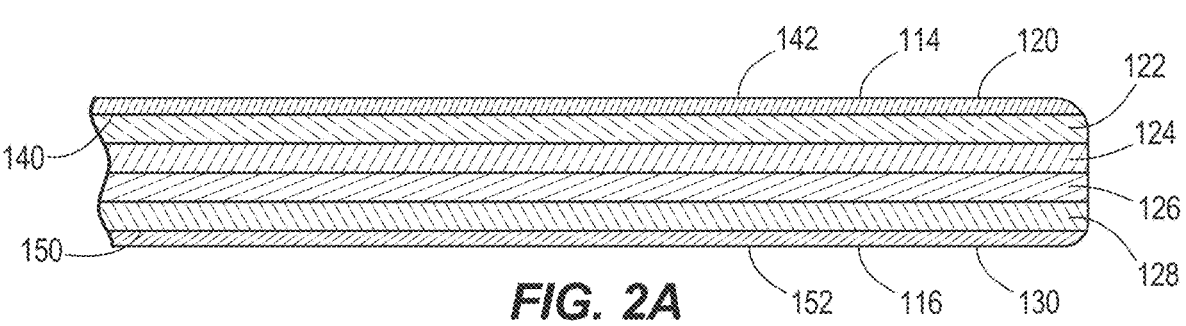
FIG. 2A illustrates a close-up cross-sectional view, along cross-section 2A, showing the layer arrangement of the multi-material skateboard deck of FIG. 1.
Figure 2B:
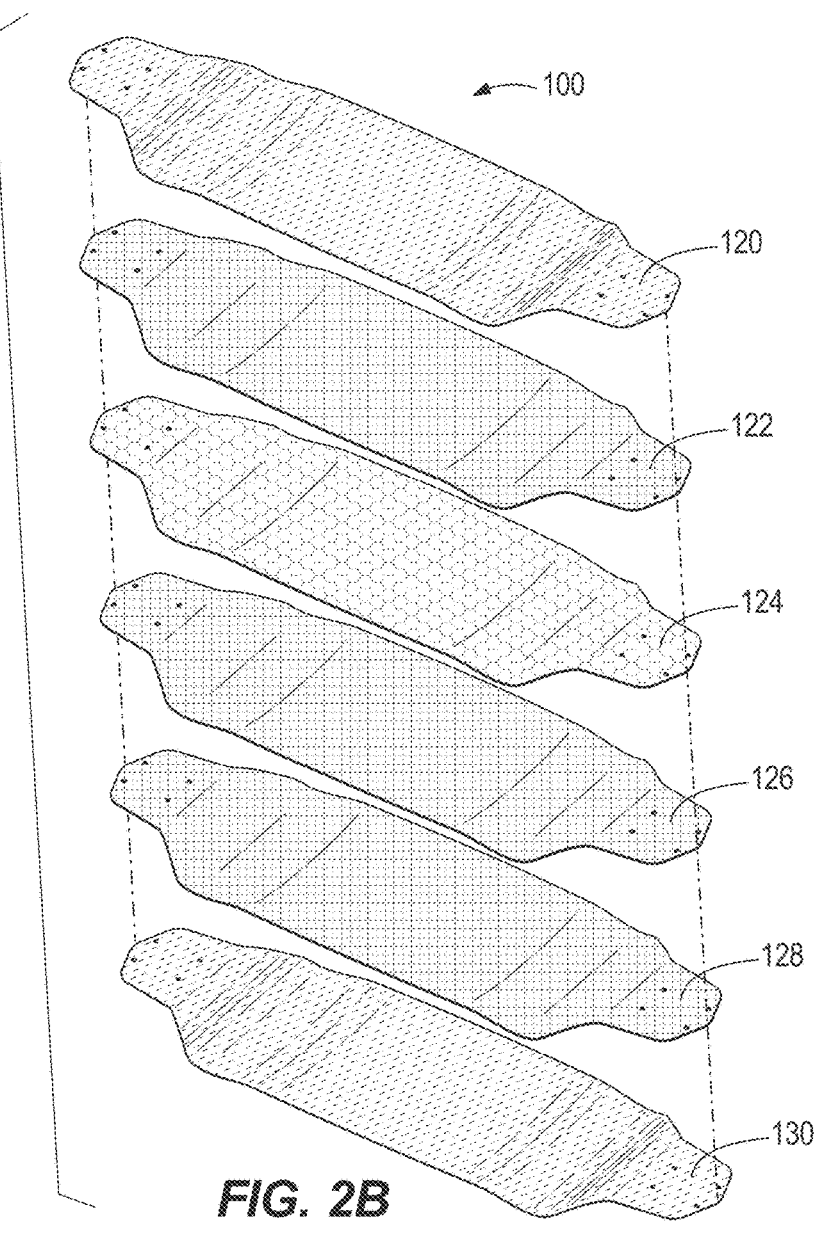
FIG. 2B illustrates an exploded view of a multi-material skateboard comprising the layers of FIG. 2A.

Referring to FIGS. 2A and 2B, in one embodiment of the multi-material skateboard deck, the multi-material skateboard deck 100 comprises a top layer 120, a first internal layer 122, a second internal layer 124, a third internal layer 126, a fourth internal layer 128 and a bottom layer 130. The plurality of internal layers is sandwiched in between the top layer 120 and the bottom layer 130 and are numbered from closest to the top layer 120 to closest to the bottom layer 130. The top layer 120 comprises a top inner surface 140 interfacing the first internal layer 122 and a top outer surface 142 opposite the top inner surface 140. In some embodiments, the top outer surface 142 forms the riding surface 114 of the multi-material skateboard deck 100. In many embodiments, however, the top outer surface 142 can be covered by grip tape, wherein the grip tape then forms the riding surface 114 of the multi-material skateboard deck 100. Similarly, the bottom layer 130 comprises a bottom inner surface 150 interfacing the fourth internal layer 128 and a bottom outer surface 152 opposite the bottom inner surface 150. In many embodiments, the bottom outer surface 152 forms the underside surface 116 of the multi-material skateboard deck 100.

In the embodiment of FIGS. 2A and 2B, the top layer 120 and bottom layer 130 are stiffening layers comprising a fiber-reinforced polymer material. In many embodiments, the top layer 120 and bottom layer 130 comprise a carbon fiber reinforced polymer layer. The stiffening layers can comprise any suitable fiber, as disclosed above. In many embodiments, the top layer 120 and bottom layer 130 comprise a woven fiber fabric having quasi-isotropic properties. In many embodiments, the top layer 120 and bottom layer 130 comprise a triaxial fiber weave, producing approximately the same strength properties in all directions. The stiffening layers can comprise any suitable fiber weave as disclosed above. Structurally, the outermost layers of the deck experience the most stress due to flexural forces, thus utilizing carbon fiber as the exterior layers maximizes the effect of the carbon fiber strength by providing strength in tension.

The plurality of internal layers in the embodiment of FIGS. 2A and 2B are provided as resilient layers, as described above. In many embodiments, each of the plurality of internal layers are made of wood, such as maple or balsa. In many embodiments, one or more of the plurality of internal layers can comprise a grain orientation different than one or more other of the plurality of internal layers. For example, in many embodiments, one or more internal layers can comprise a grain orientation extending parallel to the longitudinal axis 1000 and one or more internal layers can comprise a grain orientation extending perpendicular to the longitudinal axis 1000 (i.e. parallel to the transverse axis 1100). In the embodiment of FIG. 2, the first internal layer 122, the third internal layer 126, and the fourth internal layer 128 comprise grain orientations extending substantially parallel to the longitudinal axis 1000, and the second internal layer 124 comprises a grain orientation extending substantially perpendicular to the longitudinal axis 1000. Providing resilient internal members with different grain orientations provides flexibility to the skateboard deck while contributing to the isotropic strength of the deck.

When laminated, the aforementioned plurality of layers constructed together form the multi-material skateboard deck 100. The inclusion of stiffening layers forming the top layer 120 and the bottom layer 130 and resilient internal layers allows the multi-material skateboard deck 100 to comprise the desirable stiffness at a lighter weight than skateboard decks of other arrangements. In many embodiments, the multi-material skateboard deck 100 comprising lightweight stiffening top and bottom layers comprises a reduced weight that is up to 300 grams. lighter than a traditional skateboard deck comprising seven layers each made of maple wood. This weight savings results in approximately a 25% reduction in the overall weight of the skateboard deck.

In a specific embodiment of a multi-material skateboard deck 100, the top layer 120 comprises a triaxial woven carbon fiber reinforced polymer. The first internal layer 122 comprises maple wood wherein the grain is oriented parallel to the longitudinal axis. The second internal layer 124 comprises maple wood wherein the grain is oriented perpendicular to the longitudinal axis 1000. The third internal layer 126 comprises maple wood wherein the grain is oriented parallel to the longitudinal axis 1000. The fourth internal layer 128 comprises maple wood wherein the grain is oriented parallel to the longitudinal axis. The bottom layer 130 comprises a triaxial woven carbon fiber reinforced polymer. The top layer 120 and the bottom layer 130 act as stiffening layers and have a density less than the first internal layer 122, second internal layer 124, third internal layer 126, and fourth internal layer 128.

This embodiment of the multi-material skateboard deck 100 comprises a weight between 750 and 1200 grams, dependent upon the deck shape. This provides weight savings between 18% and 25% compared to the industry standard 7-ply deck. This embodiment of the multi-material skateboard deck 100 comprises a strength-to-weight ratio between 4.0 and 4.4 lbf/g. This embodiment allows the multi-material skateboard deck to be lighter while still providing comparable strength values and capabilities when compared to the industry standard 7-ply deck.

III. EMBODIMENT II. OF THE MULTI-MATERIAL SKATEBOARD DECK

Figures 3A, 3B:
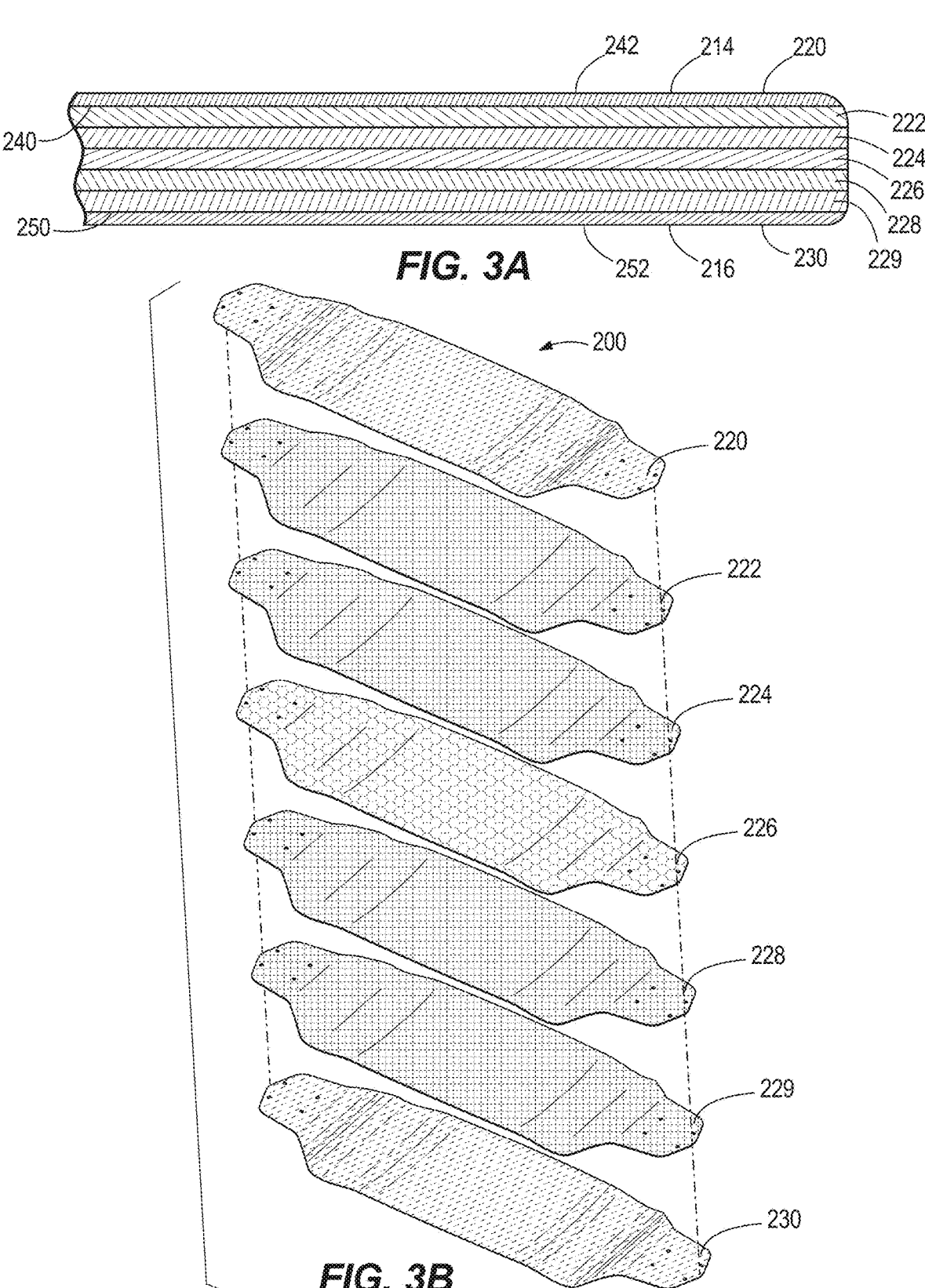
FIG. 3A illustrates a close-up cross-sectional view showing the layer arrangement of another embodiment of a multi-material skateboard deck along a cross-section similar to 2A.
FIG. 3B illustrates an exploded view of a multi-material skateboard deck comprising the layers of FIG. 3A.

Referring to FIGS. 3A and 3B, in one embodiment of the multi-material skateboard deck 200 the multi-material skateboard deck 200 comprises a top layer 220, a first internal layer 222, a second internal layer 224, a third internal layer 226, a fourth internal layer 228, a fifth internal layer 229 and a bottom layer 230. The plurality of internal layers is sandwiched in between the top layer 220 and the bottom layer 230, and are numbered from closest to the top layer 220 to closest to the bottom layer 230. The top layer 220 comprises a top inner surface 240 interfacing the first internal layer 222 and a top outer surface 242 opposite the top inner surface 240. In some embodiments, the top outer surface 242 forms the riding surface 214 of the multi-material skateboard deck 200. In many embodiments, however, the outer surface of the top layer can be covered by grip tape, wherein the grip tape (not shown) then forms the riding surface 214 of the multi-material skateboard deck 200. Similarly, the bottom layer comprises a bottom inner surface 250 interfacing the fourth internal layer 228 and a bottom outer surface 252 opposite the bottom inner surface 250. In many embodiments, the bottom outer surface 252 forms the underside surface 216 of the multi-material skateboard deck 200.

In the embodiment of FIGS. 3A and 3B, the top layer 220 and bottom layer 230 are stiffening layers comprising a fiber-reinforced polymer material. In many embodiments, the top layer 220 and bottom layer 230 comprise a carbon fiber reinforced polymer layer. In many embodiments, the top layer 220 and bottom layer 230 comprise a woven fiber fabric having quasi-isotropic properties. In many embodiments, the top layer 220 and the bottom layer 230 comprise a triaxial fiber weave, producing approximately the same strength properties in all directions. Structurally, the outermost layers of the deck experience the most stress due to flexural forces, thus utilizing carbon fiber as the exterior layers maximizes the effect of the carbon fiber strength by providing strength in tension.

The plurality of internal layers in the embodiment of FIGS. 3A and 3B are provided as resilient layers, as described above. In many embodiments, each of the plurality of internal layers are made of wood, such as maple or balsa. In many embodiments, one or more of the plurality of internal layers can comprise a grain orientation different than one or more other of the plurality of internal layers. For example, in many embodiments, one or more internal layers can comprise a grain orientation extending parallel to the longitudinal axis and one or more internal layers can comprise a grain orientation extending perpendicular to the longitudinal axis (i.e. parallel to the transverse axis). In the embodiment of FIGS. 3A and 3B, the first internal layer 222, the second internal layer 224, the fourth internal layer 228, and the fifth internal layer 229 comprise grain orientations extending substantially parallel to the longitudinal axis, and the third internal layer 226 comprises a grain orientation extending substantially perpendicular to the longitudinal axis. Providing resilient internal members with different grain orientations provides flexibility to the multi-material skateboard deck 200 while contributing to the isotropic strength of the multi-material skateboard deck 200.

In a specific embodiment of a multi-material skateboard deck 200, the top layer 220 comprises a triaxial woven carbon fiber reinforced polymer. The first internal layer 222 comprises maple wood wherein the grain is oriented parallel to the longitudinal axis 1000. The second internal layer 224 comprises maple wood wherein the grain is oriented parallel to the longitudinal axis 1000. The third internal layer 226 comprises maple wood wherein the grain is oriented perpendicular to the longitudinal axis 1000. The fourth internal layer 228 comprises maple wood wherein the grain is oriented parallel to the longitudinal axis 1000. The fifth internal layer 229 comprises maple wood wherein the grain is oriented parallel to the longitudinal axis 1000. The bottom layer 230 comprises a triaxial woven carbon fiber reinforced polymer. The top layer 220 and the bottom layer 230 act as stiffening layers and have a density less than the first internal layer 222, second internal layer 224, third internal layer 226, fourth internal layer 228, and fifth internal layer 229.

This embodiment of the multi-material skateboard deck 200 comprises a weight between 950 and 1500 g, dependent upon the deck shape. This provides weight savings between 25% and 33% compared to the industry stiff 9-ply deck. This embodiment of the multi-material skateboard deck 200 comprises a strength-to-weight ratio between 4.5 and 5.4 lbf/g. This embodiment allows the multi-material skateboard deck to be lighter while still providing comparable strength values and capabilities when compared to the industry standard 9-ply deck

IV. EMBODIMENT III. OF THE MULTI-MATERIAL SKATEBOARD DECK

Figure 4A:
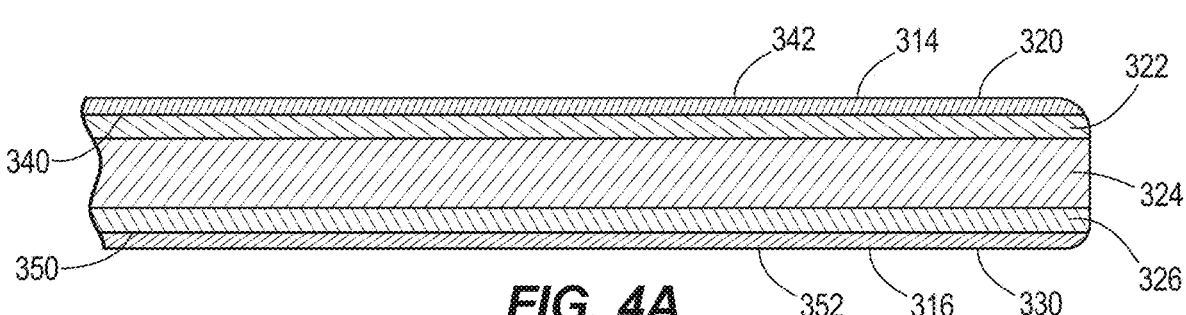
FIG. 4A illustrates a close-up cross-sectional view showing the layer arrangement of another embodiment of the multi-material skateboard deck along a cross-section similar to 2A.
Figure 4B:
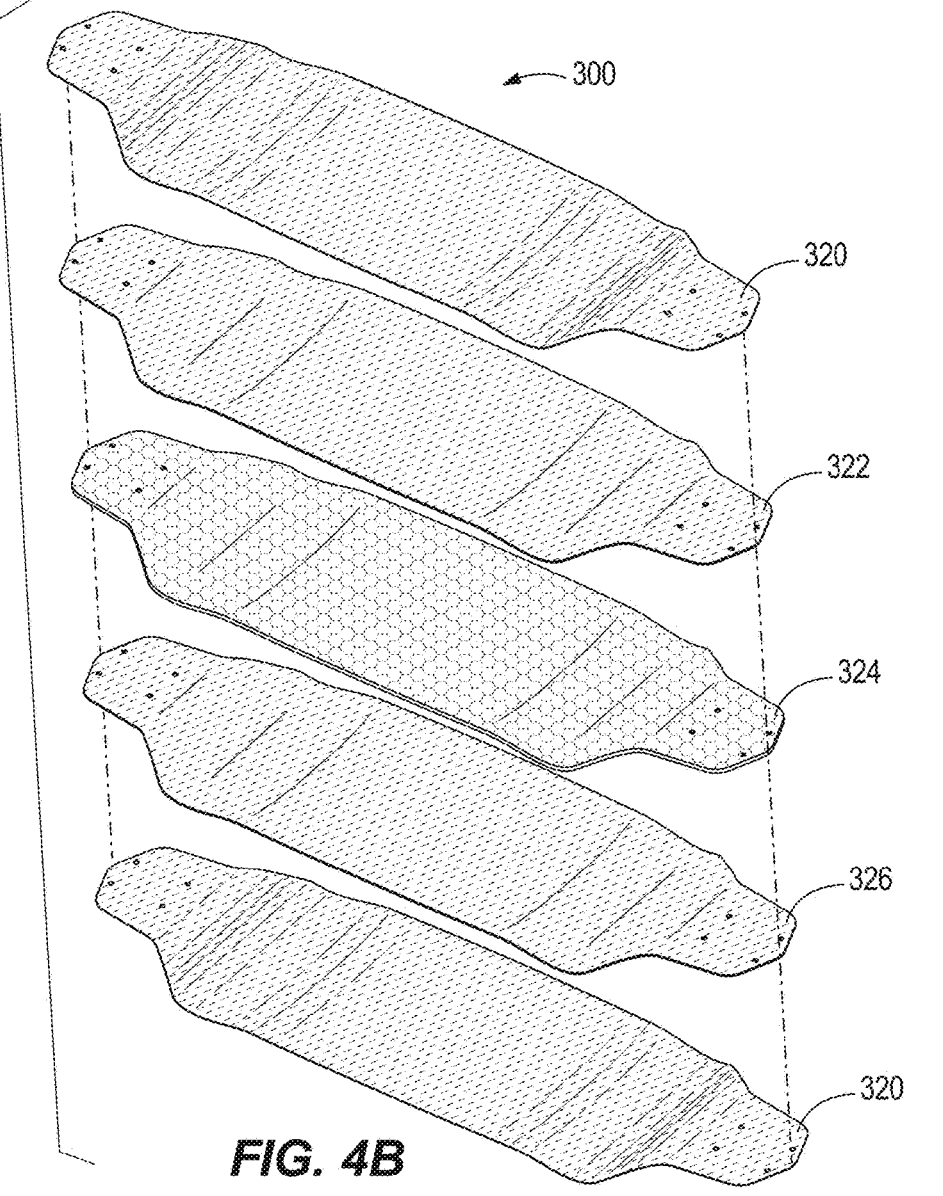
FIG. 4B illustrates an exploded view of a multi-material skateboard deck comprising the layers of FIG. 4A.
Figure 5:
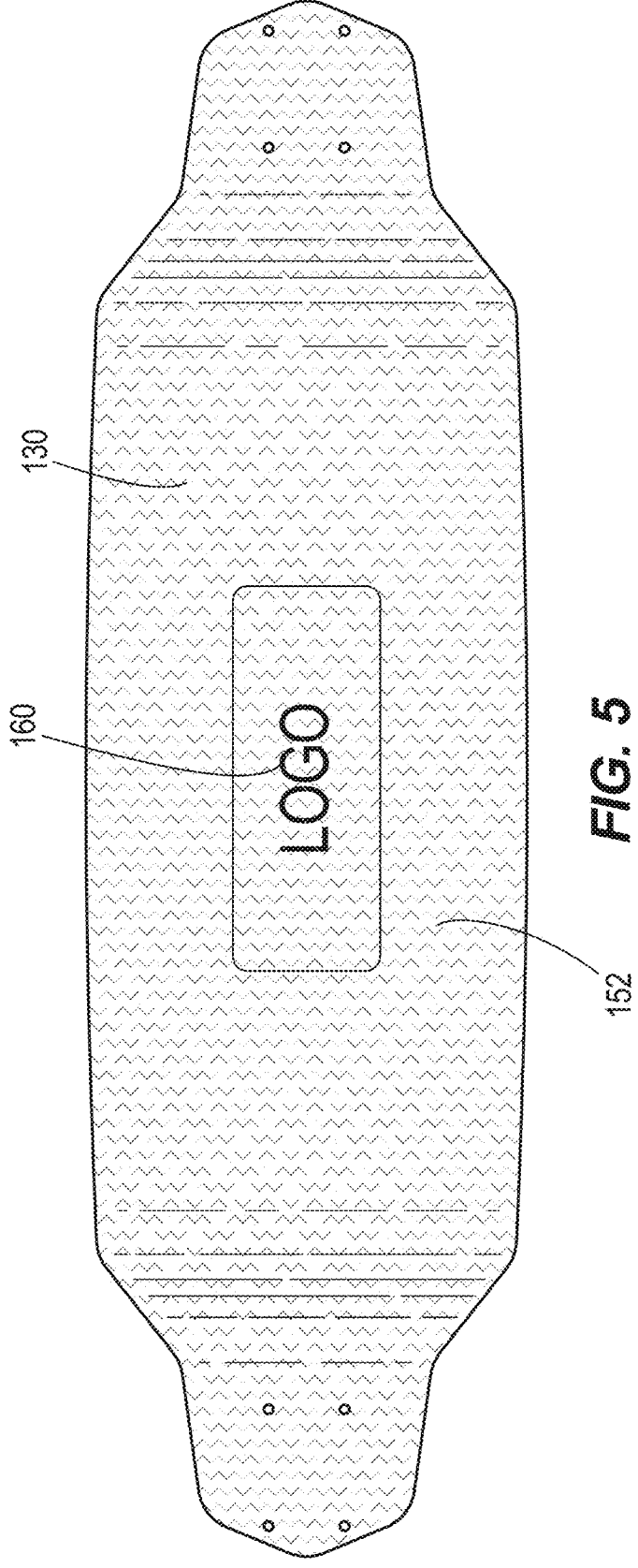
FIG. 5 illustrates a bottom view of the multi-material skateboard deck of the FIG. 1 with a decal encased within the resin matrix.

Referring to FIGS. 4A and 4B, in one embodiment of the multi-material skateboard deck 300 the multi-material skateboard deck 300 comprises a top layer 320, a first internal layer 322, a second internal layer 324, a third internal layer 326, and a bottom layer 330. The plurality of internal layers are sandwiched in between the top layer 320 and the bottom layer 330, and are numbered from closest to the top layer 320 to closest to the bottom layer 330. The top layer 320 comprises a top inner surface 340 interfacing the first internal layer 322 and a top outer surface 342 opposite the top inner surface 340. In some embodiments, the top outer surface 342 forms the riding surface 314 of the multi-material skateboard deck 300. In many embodiments, however, the top outer surface 342 can be covered by grip tape (not shown), wherein the grip tape then forms the riding surface 314 of the multi-material skateboard deck 300. Similarly, the bottom layer 330 comprises a bottom inner surface 350 interfacing the third internal layer 326 and a bottom outer surface 352 opposite the bottom inner surface 350. In many embodiments, the bottom outer surface 352 forms the underside surface 316 of the multi-material skateboard deck 300.

In the embodiment of FIGS. 4A and 4B, the top layer 320, bottom layer 330, first internal layer 322 and third internal layer 326 are stiffening layers comprising a fiber-reinforced polymer material. In many embodiments, the top layer 320 and bottom layer 330 comprise a carbon fiber reinforced polymer layer. In many embodiments, the top layer 320 and bottom layer 330 comprise a woven fiber fabric having quasi-isotropic properties. In many embodiments, the top layer 320 and the bottom layer 330 comprise a triaxial fiber weave, producing approximately the same strength properties in all directions. Structurally, the outermost layers of the deck experience the most stress due to flexural forces, thus utilizing carbon fiber as the exterior layers maximizes the effect of the carbon fiber strength by providing strength in tension.

In many embodiments the first internal layer 322 and the third internal layer 326 comprise a carbon fiber reinforced polymer layer. In some embodiments, the first internal layer 322 and the third internal layer 326 comprise a unidirectional carbon fiber oriented in the longitudinal axis direction.

The second internal layer 324 in the embodiment of FIGS. 4A and 4B is provided as a resilient layer, as described above. In the embodiment in FIGS. 4A and 4B, the second internal layer 324 comprises an end grain wood core. In many embodiments, the end grain wood is balsa. The second internal layer 324 can be between 0.20 inch to 0.30 inch thick. In some embodiments, the second internal layer 324 can be up to 0.20 inch, up to 0.22 inch, up to 0.24 inch, up to 0.26 inch, up to 0.28 inch, or up to 0.30 inch. In one exemplary embodiment, the second internal layer 324 is comprised of an end grain balsa wood is 0.25 inch thick.

In a specific embodiment of a multi-material skateboard deck 300, the top layer 320 comprises a triaxial woven carbon fiber reinforced polymer. The first internal layer 322 comprises a unidirectional carbon fiber oriented in the longitudinal axis 1000 direction. The second internal layer 324 comprises of an end grain balsa wood. The third internal layer 326 comprises a unidirectional carbon fiber oriented in the longitudinal axis 1000 direction. The bottom layer 330 comprises a triaxial woven carbon fiber reinforced polymer. The top layer 320 and the bottom layer 330 act as stiffening layers.

This embodiment of the multi-material skateboard deck 300 comprises a weight between 400 and 750 g, dependent upon the deck shape. This provides weight savings between 49% and 60% compared to the industry standard 7-ply deck. This embodiment of the multi-material skateboard deck 300 comprises a strength-to-weight ratio between 6.3 and 7.5 lbf/g. This embodiment allows the multi-material skateboard deck to be lighter while still providing comparable strength values and capabilities when compared to the industry standard 7-ply deck

V. SKATEBOARD TRUCK

Figure 8:
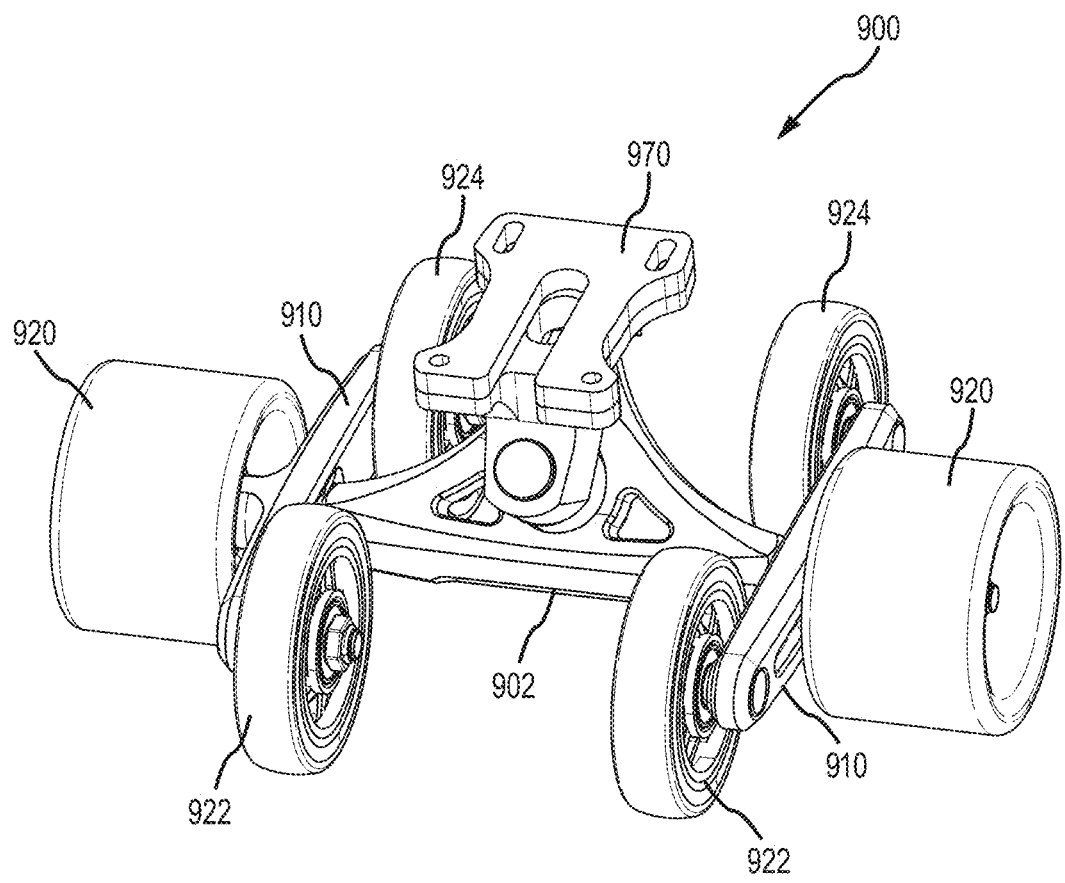
FIG. 8 illustrates a perspective view of a multi-wheel skateboard truck according to one embodiment.
Figure 9:
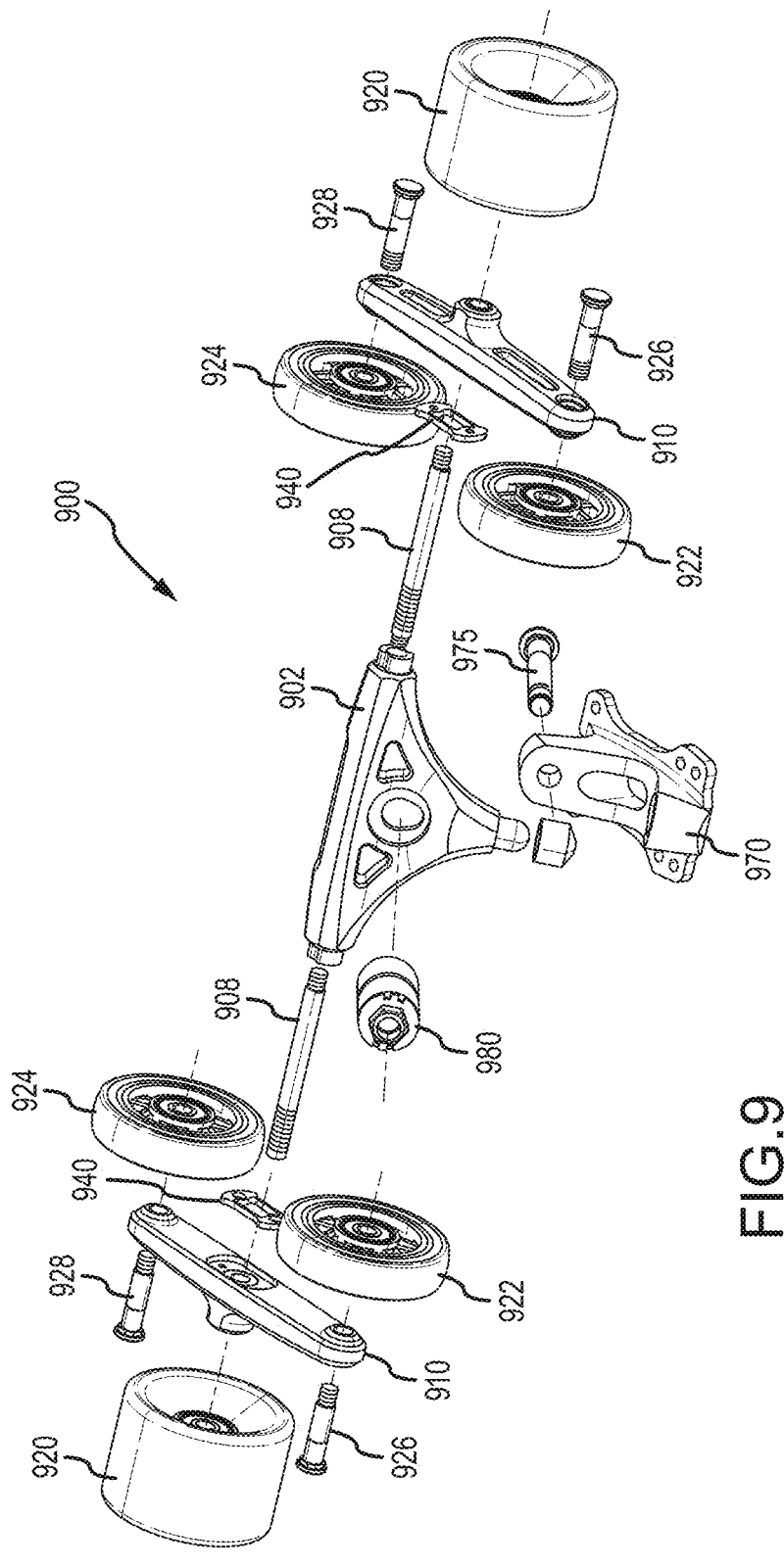
FIG. 9 illustrates an exploded view of the truck of FIG. 1.

Described below, are embodiments of a multi-wheel truck. FIGS. 8-9 illustrate an embodiment of the truck 900 that comprises a unique suspension system and attack angle α that allow the truck 900 to smoothly pass over discontinuous surfaces. In general, the truck 900 comprises a plurality of wheel sets comprising a rotating level arm 910 and a plurality of wheels. The truck 900 further comprises a hanger 902 that serves to connect the plurality of wheel sets. The truck 900 further comprises a baseplate 970 configured to receive the hanger 902 and couple the truck 900 to the underside of a skateboard deck (not shown). The arrangement of the hanger 902 and baseplate 970 will be described in greater detail below.

Figure 10:
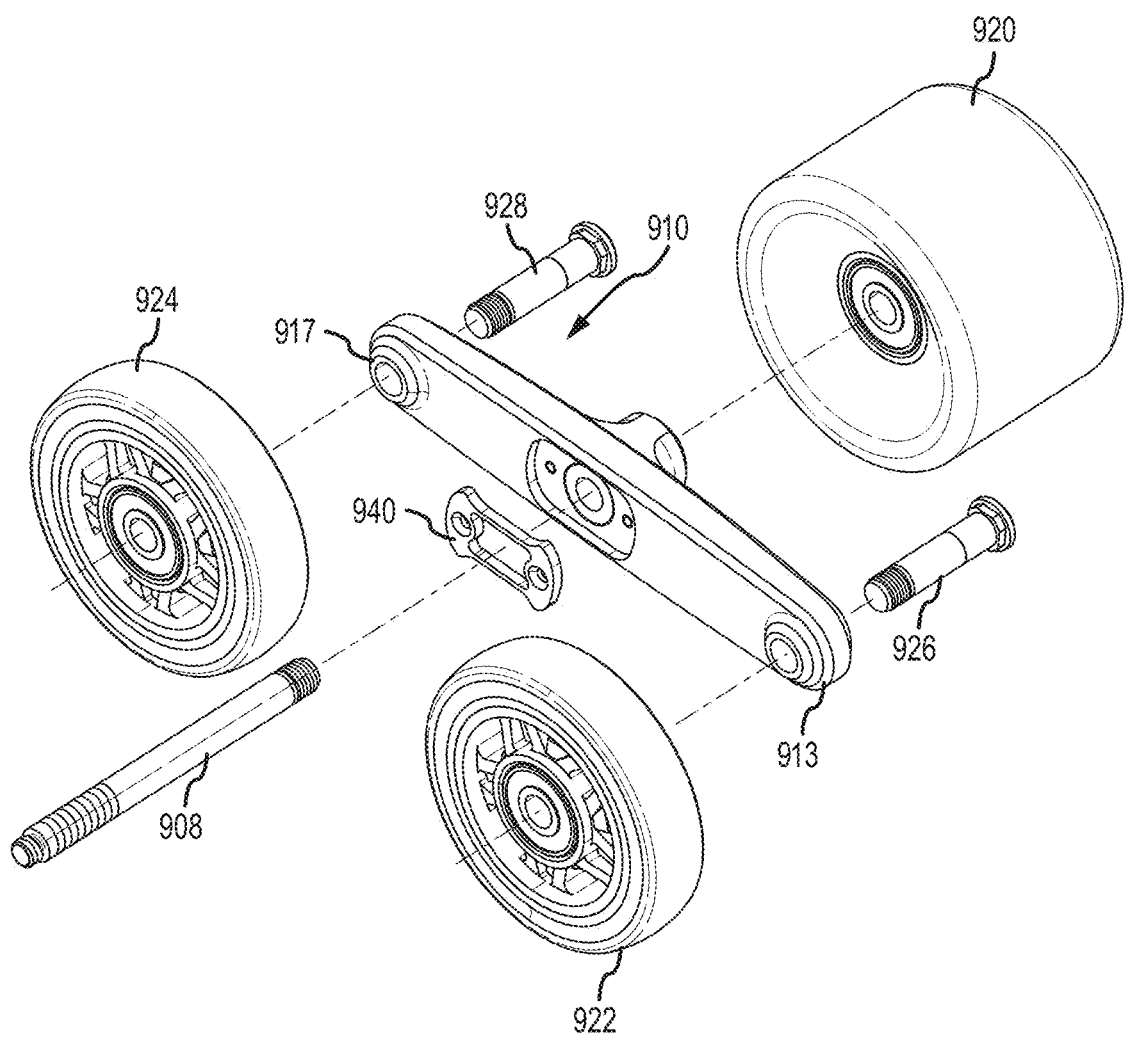
FIG. 10 illustrates an exploded view of a wheel set of the truck of FIG. 1.

The plurality of wheel sets creates a suspension system that absorbs unwanted shock upon impact with an obstacle and provides a smooth ride over such obstacles. FIG. 10 illustrates a wheel set according to the present truck 900. In many embodiments, each wheel set comprises a rotatable level arm 910 coupled to a central axle 908, at least one central wheel 920 rotatably coupled to a central axle 908, and a plurality of auxiliary wheels coupled to the level arm 910 by a plurality of auxiliary axles. In many embodiments, each wheel set comprises one central wheel 920 and two auxiliary wheels, including a leading wheel 922 and a trailing wheel 924. In many embodiments, the truck 900 comprises a pair of wheel sets, one on either side of the truck 900 and affixed to opposite ends of the hanger 902. In many embodiments, each of the pair of wheel sets is affixed to either end of the hanger 902 and sits along a longitudinal axis 4000 extending from a first end 904 of the hanger 902 to a second end 906 of the hanger 902.

The central axle 908 can be coupled to one end of the hanger 902 and configured to affix both the central wheel 920 and the rotatable level arm 910 thereto. The central axle 908 can be received by a void 956 formed within the end of the hanger 902 and fixedly coupled therein. In many embodiments, the central wheel 920 forms a bore. The bore is sized to allow the central wheel 920 to couple to and freely rotate about the central axle 908. This allows the skateboard to smoothly and securely roll along the central wheel 920 during use.

The level arm 910 is also rotatably coupled to the central axle 908. The level arm 910 comprises a front region 912 disposed near the front of the truck 900 (i.e. the portion of the truck 900 nearest the front of the skateboard), a middle region 914 centered about the central axle 908, and a rear region 916 opposite the front region 912 and disposed near the back of the truck 900. The middle region 914 comprises a middle bore 915 located substantially at the center of the level arm 910 and configured to concentrically link, attach, and/or couple the central axle 908. The middle bore 915 allows the level arm 910 to couple to and rotate about the central axle 908. In the illustrated embodiment, auxiliary wheels are attached at either end of the level arm 910 by a plurality of auxiliary axles 926, 928. As illustrated in FIG. 10, the front region 912 is configured to receive a leading wheel 922. The front region 912 comprises a front bore 913 configured to concentrically link, attach, and/or couple a front auxiliary axle 926 (hereafter "front axle"). The front axle 926 is fixedly coupled within the front bore 913 so that the front axle 926 is restricted from rotating with respect to the level arm 910. The leading wheel 922 is configured to affix to the front axle 926 and allowed to freely rotate upon said front axle 926. As shown in FIG. 10, the rear region 916 is configured to receive a trailing wheel 924. The rear region 916 comprises a rear bore 917 configured to concentrically link, attach, and/or couple a rear auxiliary axle 928 (hereafter "rear axle"). The rear axle 928 is fixedly coupled within the rear bore 917 so that the rear axle 928 is restricted from rotating with respect to the level arm 910. The trailing wheel 924 is configured to affix to the rear axle 928 and allowed to freely rotate upon said rear axle 928. The configuration of the leading and trailing wheels 922, 924 attached to either end of the level arm 910 by the plurality of auxiliary axles 926, 928 allows the leading and trailing wheels 922, 924 to roll freely along the ground during use of the skateboard. The location of the auxiliary axles 926, 928 to which the leading and trailing wheels 922, 924 are attached allows the leading and trailing wheels 922, 924 to move up or down as the level arm 910 rotates about the central axle 908.

The suspension system creates a "lifting effect" that provides smooth passage of the truck 900 over obstacles or discontinuities in the rolling surface. As the truck 900 rolls along the ground, the level arm 910 can rotate in response to discontinuities in the surface. The rotation of the level arm 910 allows the auxiliary wheels on either end of the level arm 910 to raise or lower according to the terrain of the rolling surface. The freedom of the auxiliary wheels to raise or lower in response to obstacles serves to absorb the shock typically associated with impact between a wheel and such obstacles.

The lifting effect also serves to dynamically distribute load between the central and auxiliary wheels during use to provide an even smoother ride. During normal use of the skateboard rolling along a smooth surface, the central wheel 920 can support a majority of the weight of the rider. However, when the central wheel 920 encounters an obstacle, such as a crack, the leading wheel 922 and/or the trailing wheel 924 can bear the majority of the weight of the rider to keep the truck 900 stable. For example, upon impact with a crack in the rolling surface, the leading wheel 922 encounters the crack first. As the leading wheel 922 is in the crack, the level arm 910 can rotate to lower the leading wheel 922 into the crack. Meanwhile, the majority of the load of the skateboard is supported by the central wheel 920, which continues to roll along the main rolling surface. As the leading wheel 922 exits the crack, the central wheel 920 can enter the crack. The level arm 910 can rotate to raise the leading wheel 922 and allow it to continue rolling along the main rolling surface. Rather than falling into the crack and causing deceleration of the board or shock to the rider, the central wheel 920 can be suspended over the crack by the level arm 910. Because the level arm is supported on either end by the leading and trailing wheels 922, 924, which are rolling on the smooth rolling surface, substantially the entire load of the skateboard is supported between the auxiliary wheels, and little to none of the load is carried by the central wheel 920. As the central wheel 920 exits the crack, the trailing wheel 924 can enter the crack. As the trailing wheel 924 is in the crack, the level arm 910 can rotate to lower the trailing wheel into the crack. Meanwhile, the majority of the load of the board is supported by the central wheel 920, which is again rolling along the main rolling surface. Because there is at least one wheel rolling along the main rolling surface and supporting the majority of the weight of the rider at any given time, the suspension system provides stability to the truck 900 by allowing the wheel set to act as a single wheel rolling continuously along a smooth surface.

The truck 900 further comprises a spatial arrangement between the plurality of wheels that works in conjunction with the suspension system to provide smooth traversal of obstacles and discontinuous surfaces. The spatial arrangement of the wheels enables the lifting effect of the suspension system to occur no matter the angle at which the skateboard encounters an obstacle. In many embodiments, the central and auxiliary wheels are spaced apart, both laterally (i.e. with respect to a direction extending along the longitudinal axis 4000) and in a front-to-rear direction. This spatial arrangement of the wheels provides the truck 900 with a wide base and prevents the wheels within each given wheel set from all impacting an obstacle simultaneously. Therefore, there is always at least one wheel of every given wheel set supporting the weight of the rider on the main rolling surface at any given time. The spatial relationship between the wheels within a given wheel set can be characterized by an attack angle α, described in detail below.

Figure 11:
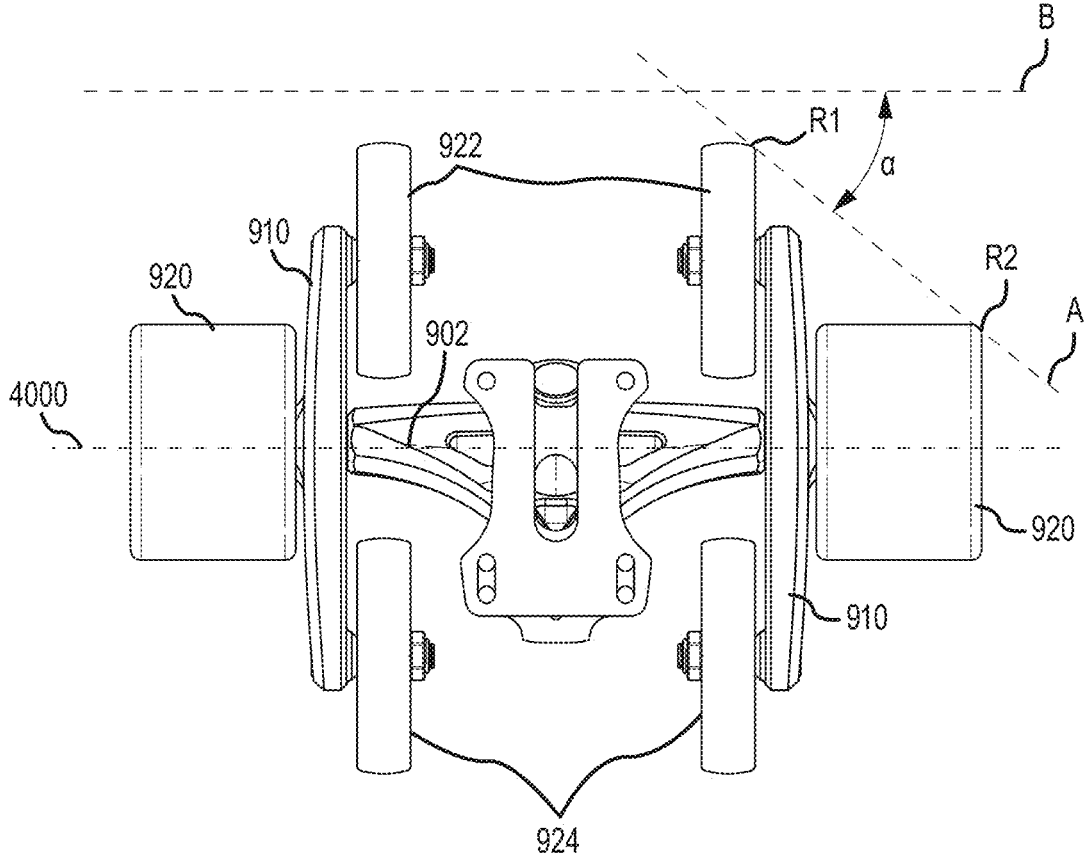
FIG. 11 illustrates a top view of the truck of FIG. 1 forming an attack angle according to the present invention.

The attack angle α is a characteristic of the spatial relationship between the central and auxiliary wheels of the truck 900. As shown in FIG. 11, the attack angle α can be defined as the acute angle between a first reference line A connecting the central wheel 920 and the leading wheel 922 of a particular wheel set and a second reference line B extending parallel to the longitudinal axis 4000. The first reference line A can connect a first reference point R1 located on the leading wheel 922 and a second reference point R2 located on the central wheel 920. The first reference point R1 is the forwardmost and outermost (i.e. furthest spaced away from the hanger 902) point of the leading wheel 922. Similarly, the second reference point R2 is the forwardmost and outermost point of the central wheel 920. Different configurations of the leading and central wheel 920 can alter the relationship between the first and second reference point R1, R2, thus altering the directionality of the first reference line A.

Because the attack angle α relates the position of the first and second reference points R1, R2, the attack angle α is dependent on the size and location of the central wheel 920 and the leading wheel 922. Specifically, different specific configurations of the central wheel 920 and the leading wheel 922 in terms of the lateral spacing between the central wheel 920 and leading wheel 922, the front-to-rear spacing between the central wheel 920 and leading wheel 922, the widths of the central wheel 920 and leading wheel 922, and the diameters of the central wheel 920 and leading wheel 922 create different attack angles α. In this way, the attack angle α can be manipulated by changing the spatial relationship between the leading and central wheels 920 and/or by altering the diameter and/or width of the leading wheel 922 and central wheel 920. For example, providing a greater lateral distance between the leading wheel 922 and the central wheel 920 creates an attack angle α that is shallower, while providing a smaller lateral distance between the leading wheel 922 and the central wheel 920 creates an attack angle α that is steeper. Similarly, altering the diameter and/or width of one or more wheels within the wheel set changes the location of the first reference point R1 and/or second reference point R2, which in turn alters the orientation of the first reference line A. The diameter and width of the plurality of wheels is further detailed below.

Figure 12:
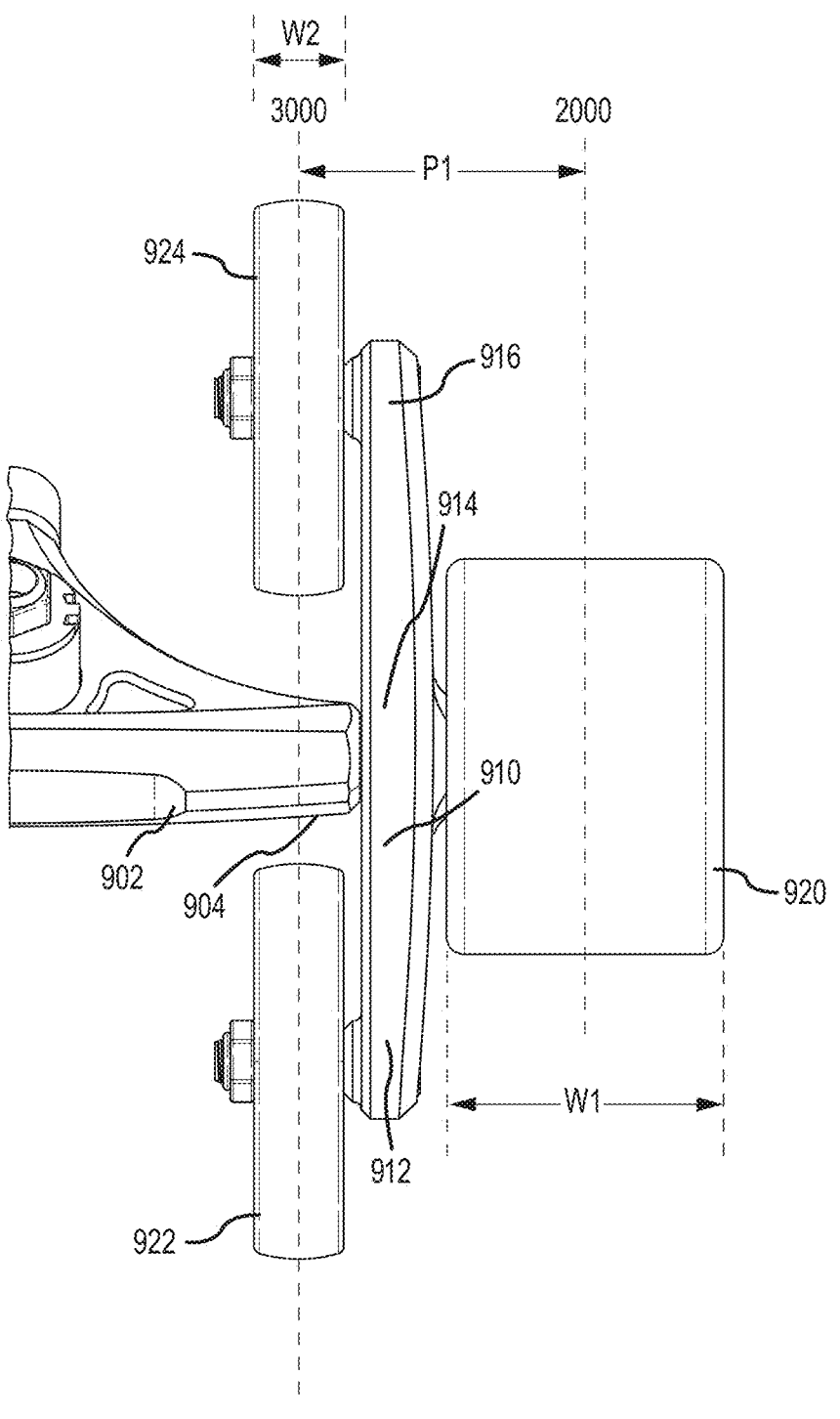
FIG. 12 illustrates the dimensions and spacing of the wheel set illustrated in FIG. 3 from a top view.

In many embodiments the central wheel 920 is laterally spaced away from the plurality of auxiliary wheels to create the attack angle α. In general, the plurality of auxiliary wheels comprise an "inline" configuration in which the leading and trailing wheels 922, 924 are positioned in a straight line from the front of the truck 900 to the rear. The central wheel 920 is not in line with respect to the auxiliary wheels, but rather is laterally spaced away from the auxiliary wheels. In many embodiments, as illustrated by FIG. 12, the central wheel 920 is laterally spaced further from the hanger 902 than the auxiliary wheels, such that the auxiliary wheels are located between the central wheel 920 and the hanger 902. In alternative embodiments (not shown), the central wheel 920 can be laterally spaced closer to the hanger 902 than the auxiliary wheels, such that the central wheel 920 is located between the auxiliary wheels and the hanger 902. The lateral spacing between the auxiliary wheels, in particular the leading wheel 922 and the central wheel 920, with respect to one another can be characterized by the distance between a pair of planes. The leading wheel 922 and central wheel 920 can each sit upon a respective plane separated by a particular distance in a longitudinal direction. FIG. 12 illustrates a first plane 2000 extending in a front-to-rear direction through the center of the central wheel 920. Similarly, a second plane 3000 is illustrated, wherein the second plane 3000 extends in a front-to-rear direction (thus parallel to the first plane 2000) through the center of the leading wheel 922. In many embodiments, the distance P1 between the first plane 2000 and the second plane 3000 is approximately 2.0 inches. In some embodiments, the distance P1 between the first plane 2000 and the second plane 3000 can range approximately between 0.5 inches and 3.0 inches. In some embodiments, the distance P1 between the first plane 2000 and the second plane 3000 ranges approximately between 0.5 inches and 1.0 inches, approximately between 1.0 inches and 1.5 inches, approximately between 1.5 inches and 2.0 inches, between approximately 2.0 inches and 2.5 inches, or approximately between 2.5 inches and 3.0 inches. The distance between plane 2000 and plane 3000 create a wheel set in which the central wheel 920 is laterally spaced from the auxiliary wheels. This configuration creates the desired attack angle α and a wide base for the wheel set.

Figure 13:
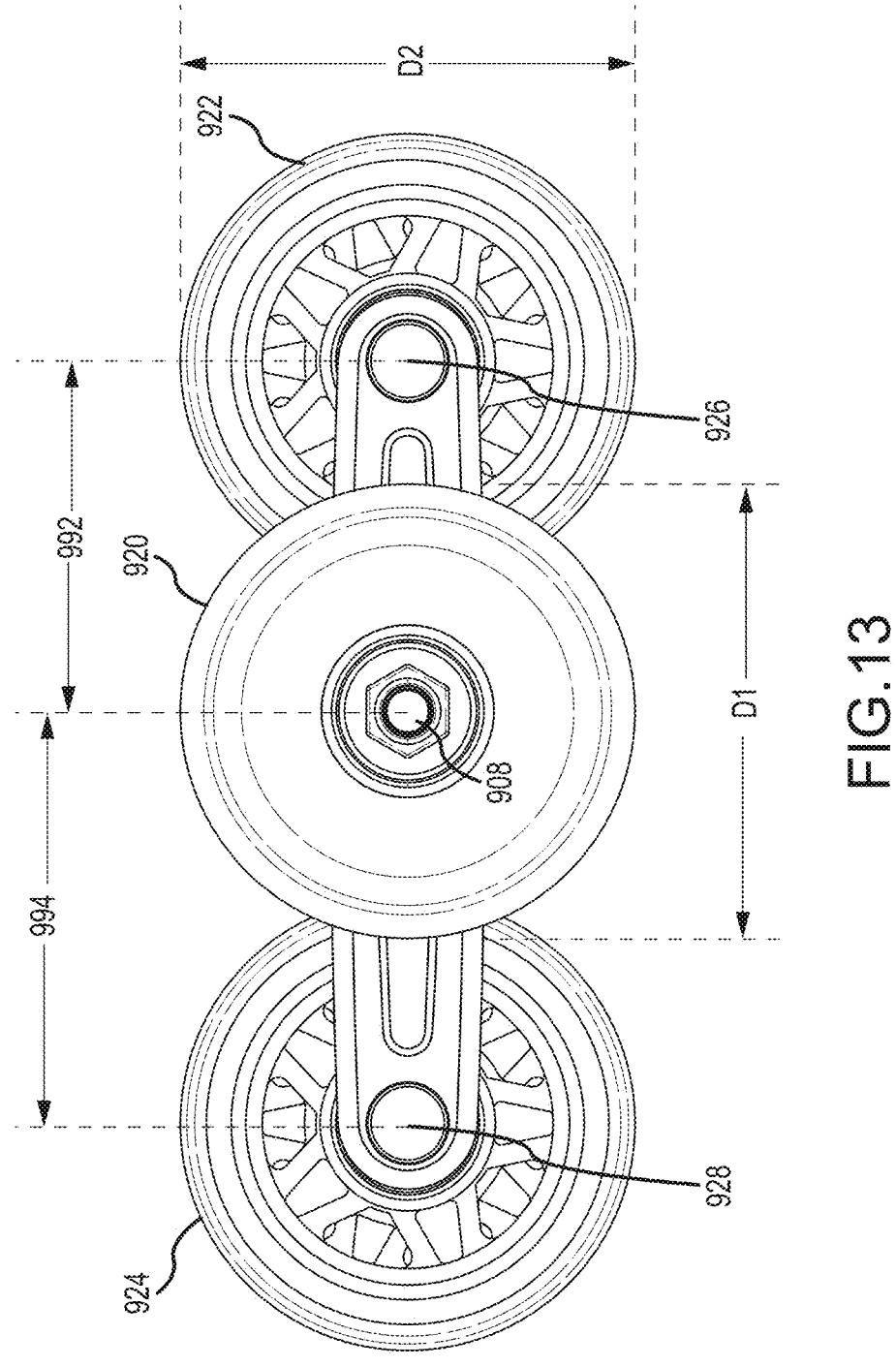
FIG. 13 illustrates the dimensions and spacing of the wheel set illustrated in FIG. 3 from a side view.

The attack angle α is further determined by a front-to-rear distance between adjacent wheels. FIG. 13 illustrates a front-to-rear distance 992 defined between the leading wheel 922 and the central wheel 920, wherein the distance 992 is measured as the perpendicular distance between the axles (i.e. the front axle 926 and the central axle 908) upon which each wheel is attached. Similarly, a front-to-rear distance 994 between the central wheel 920 and the trailing wheel 924 can be measured as the perpendicular distance between the central axle 908 and the rear axle 928, upon which each respective wheel is attached. In many embodiments, the front-to-rear distance 992, 994 between adjacent wheels is dependent on the front-to-rear length of the level arm 910, as the leading and trailing wheels 922, 924 are affixed proximate either end of the level arm 910.

In many embodiments, the front-to-rear distance between any adjacent pair of wheels can be approximately 1.5 inches. In some embodiments, the front-to-rear distance between any adjacent pair of wheels can be between approximately 0.5 and 2.5 inches. In some embodiments, the front-to-rear distance between adjacent wheels can be between 0.5 and 1.0 inches, between 1.0 and 1.5 inches, between 1.5 and 2.0 inches, or between 2.0 and 2.5 inches. In some embodiments, the front-to-rear distance between adjacent wheels can be between 0.5 and 0.75 inches, between 0.75 and 1.0 inches, between 1.0 and 1.25 inches, between 1.25 and 1.5 inches, between 1.5 and 1.75 inches, between 1.75 and 2.0 inches, between 2.0 and 2.25 inches, between 2.25 and 2.5 inches, between 2.5 and 2.75, between 2.75 and 3.0, between 2.75 and 3.25, or between 3.25 and 3.5. In many embodiments, the front-to-rear distance 992 between the leading wheel 922 and the central wheel 920 can be substantially similar to the front-to-rear distance 994 between the central wheel 920 and the trailing wheel 924. In other embodiments, the front-to-rear distance 992 between the leading wheel 922 and the central wheel 920 can substantially differ from the front-to-rear distance 994 between the central wheel 920 and the trailing wheel 924. The front-to-rear distance between adjacent wheels determines, in part, the location of the first reference point R1 and the second reference point R2, and therefore influences the attack angle α.

The configuration of the central wheel 920 and the leading wheel 922, both in terms of spacing and dimensions of each wheel, define the attack angle α for the truck 900. In many embodiments, an attack angle α between 30 and 60 degrees is desirable to allow the truck 900 the ability to smoothly traverse obstacles at the widest range of angles. In many embodiments, the attack angle α of the present truck 900 is approximately 45 degrees. In some embodiments, the attack angle α is between approximately 30 degrees and 60 degrees. In some embodiments, the attack angle α is between approximately 30 and 35 degrees, between approximately 35 and 40 degrees, between approximately 40 degrees and 45 degrees, between approximately 45 degrees and 50 degrees, between approximately 50 degrees and 55 degrees, or between approximately 55 degrees and 60 degrees. In other embodiments, the attack angle α is between approximately 30 and 32 degrees, between approximately 32 and 34 degrees, between approximately 34 and 36 degrees, between approximately 36 and 38 degrees, between approximately 38 and 40 degrees, between approximately 40 degrees and 42 degrees, between approximately 42 degrees and 44 degrees, between approximately 44 degrees and 46 degrees, between approximately 46 degrees and 48 degrees, between approximately 48 degrees and 50 degrees, between approximately 50 degrees and 52 degrees, between approximately 52 degrees and 54 degrees, between approximately 54 degrees and 56 degrees, between approximately 56 degrees and 58 degrees, or between approximately 58 degrees and 60 degrees.

Figure 14:
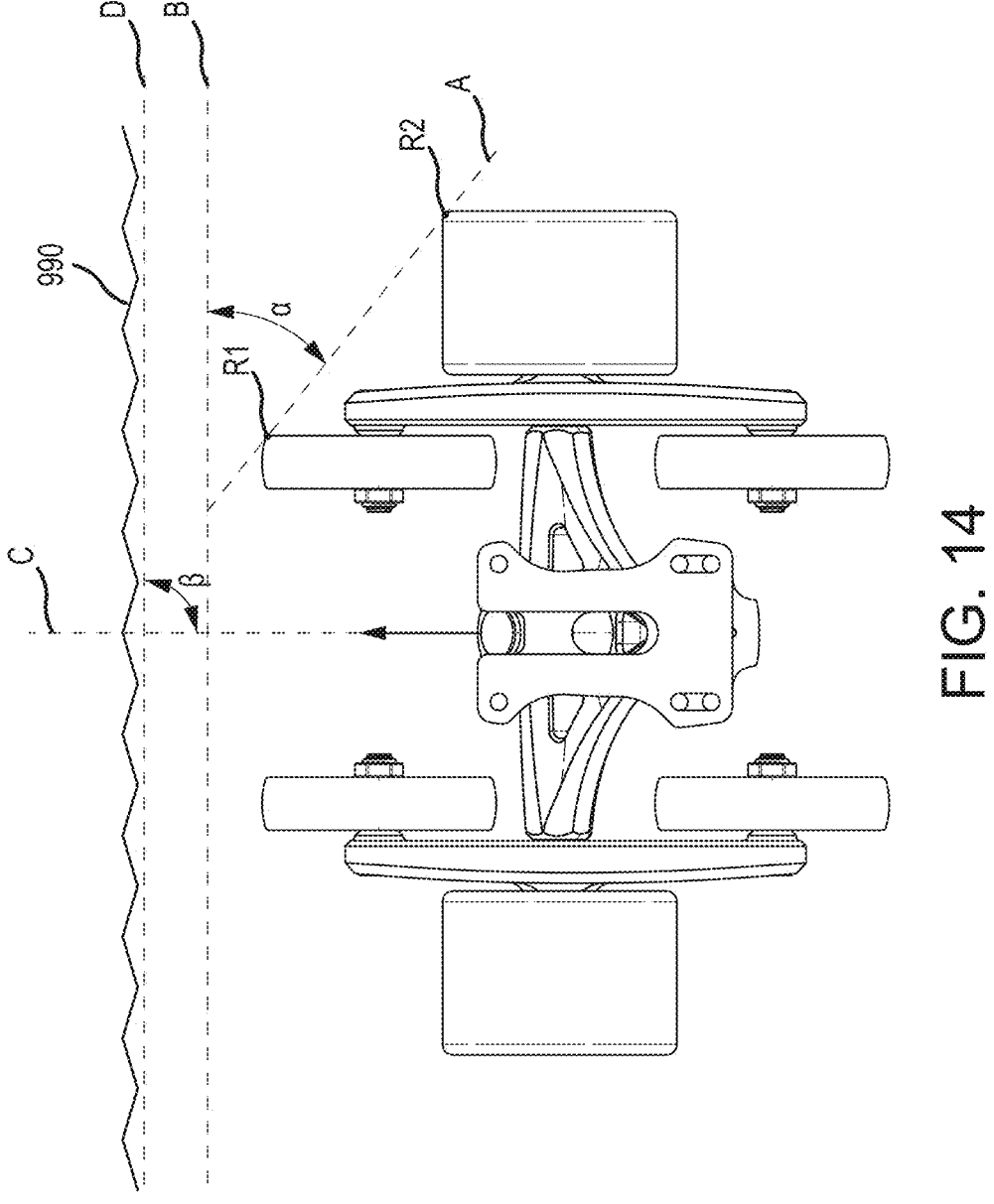
FIG. 14 illustrates a top view of a multi-wheel truck according to one embodiment comprising an attack angle approaching an obstacle at a particular approach angle.
Figure 15:
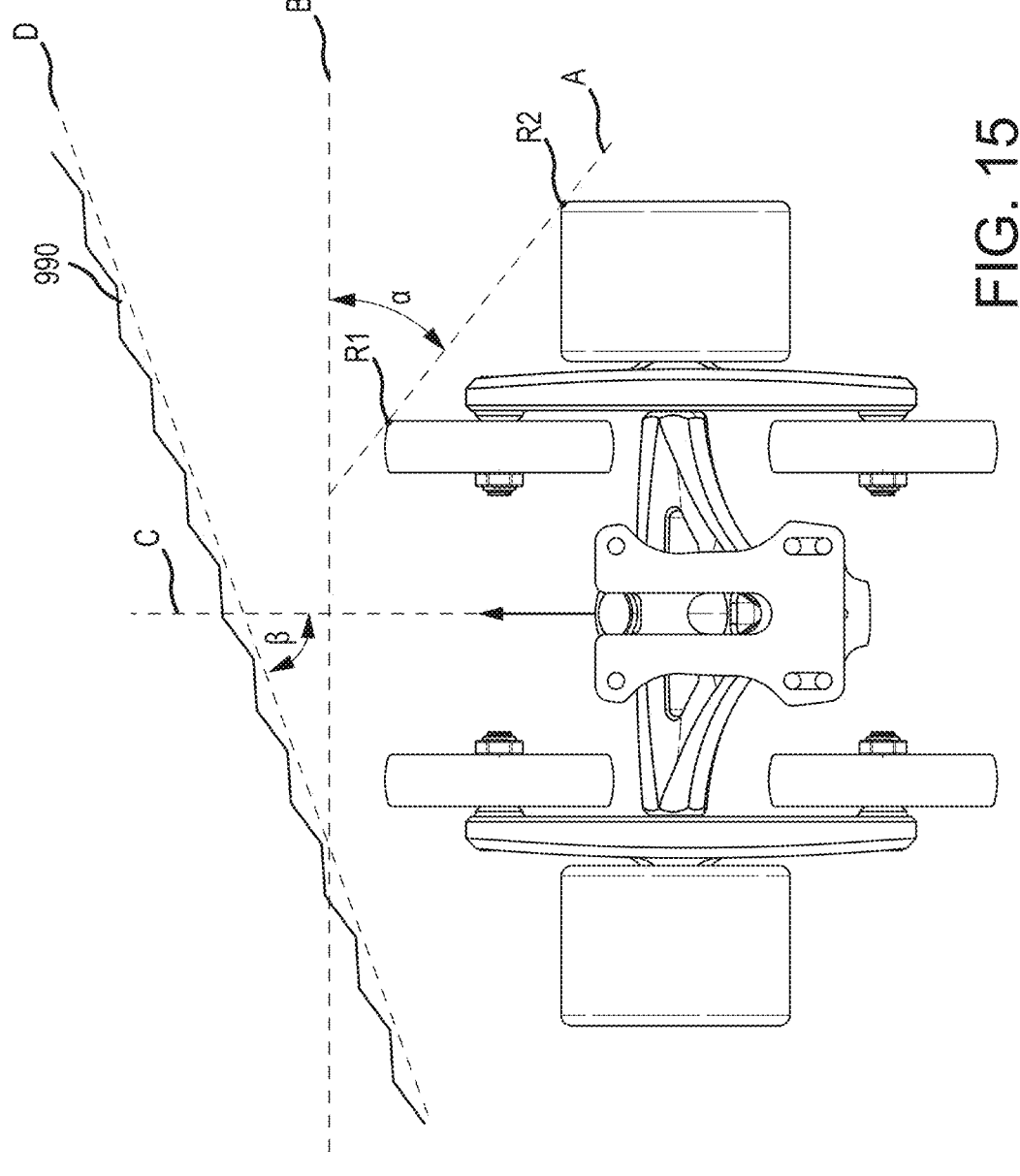
FIG. 15 illustrates a top view of the multi-wheel truck of FIG. 7 approaching an obstacle at an alternative approach angle.

An optimized attack angle α enhances the ability of the truck 900 to smoothly traverse obstacles of varying size, while approaching such obstacles at a wide range of angles. As shown in FIGS. 14 and 15, an approach angle β can be defined between the truck 900 and an obstacle 990 as the skateboard approaches the obstacle 990. The approach angle β can be defined as the acute angle between the obstacle 990 and the skateboard's direction of travel. More specifically, the approach angle β is formed by a reference line C corresponding to the direction of travel at the moment the truck 900 impacts the obstacle 990 and a second reference line D tangent to the obstacle 990 at the point of impact. For example, a skateboard approaching an elongate obstacle 990 "straight on" would define an approach angle β of approximately 90 degrees, while a skateboard approaching the obstacle 990 from any direction other than straight on would define an approach angle β substantially less than 90 degrees.

The attack angle α of the truck 900 allows the truck 900 to smoothly traverse obstacles and discontinuous surfaces at a wider range of approach angles β than a conventional skateboard. Because the central wheel 920 and the leading wheel 922 are laterally spaced apart to form the attack angle α, the truck 900 essentially comprises a wider base than a similar board with an in-line wheel configuration or a conventional skateboard forming no angle of attack. The angle of attack reduces the likelihood that multiple wheels in the set will impact an obstacle at the same time. This provides balance and stability over obstacles of various sizes and orientations by allowing at least one wheel in each wheel set to contact the regular rolling surface at any given time. In other words, the attack angle α allows the lifting effect to occur at a wide range of approach angles β.

When the present truck 900 encounters an obstacle at any approach angle β, the load created by the weight of the rider can be shifted between the central and auxiliary wheels in both a front-to-rear direction as well as a lateral direction. This configuration provides the present truck 900 with two more degrees of stability than a conventional skateboard truck, which comprises only a single wheel on either side of a truck 900. When a conventional truck encounters an obstacle, the load created by the weight of the rider cannot be shifted from the wheel, and thus the wheel experiences the full force of impact with the obstacle. In contrast, the ability to shift load between a central wheel 920 and auxiliary wheels allows the present truck 900 to absorb the force of impact with the obstacle. The ability to shift load in multiple directions due to the attack angle α of the truck 900 provides a greater absorption of this force over a wider range of approach angles β.

Figure 16:
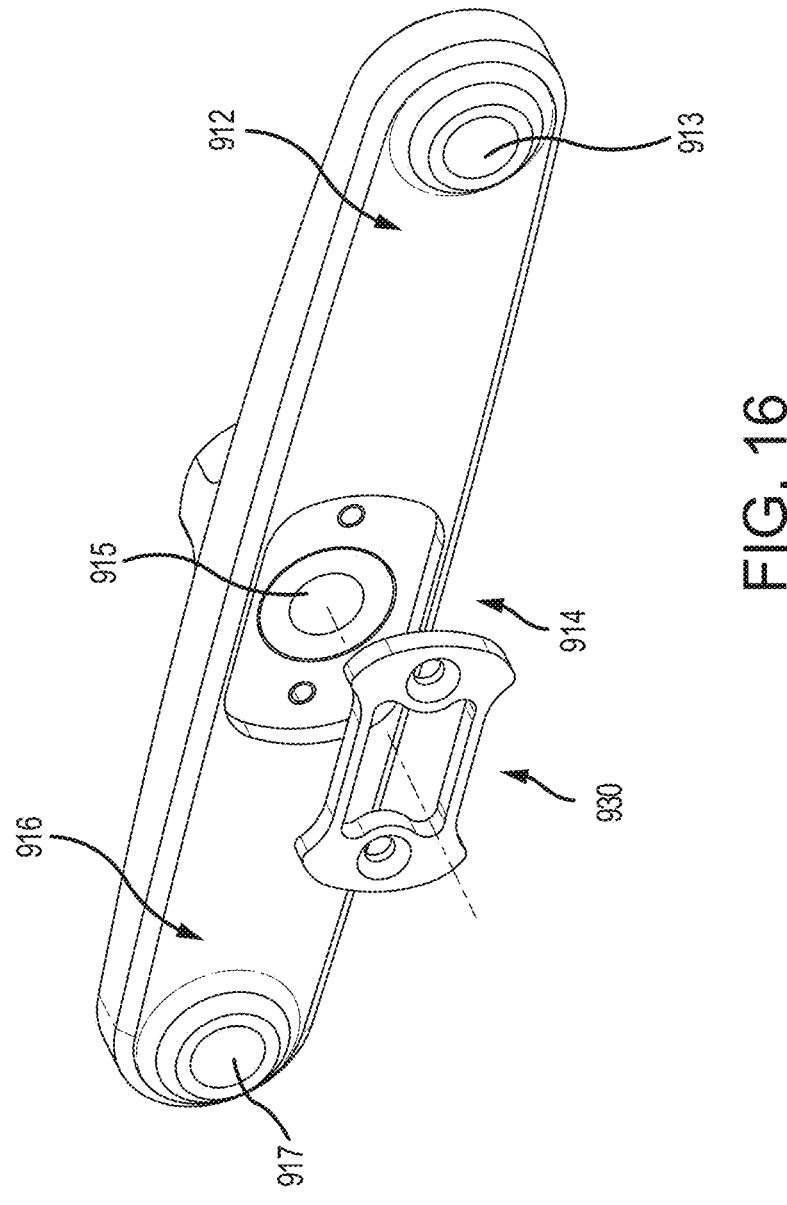
FIG. 16 illustrates an exploded view of a level arm and corresponding spring insert according to the embodiment of FIG. 1.
Figure 17:
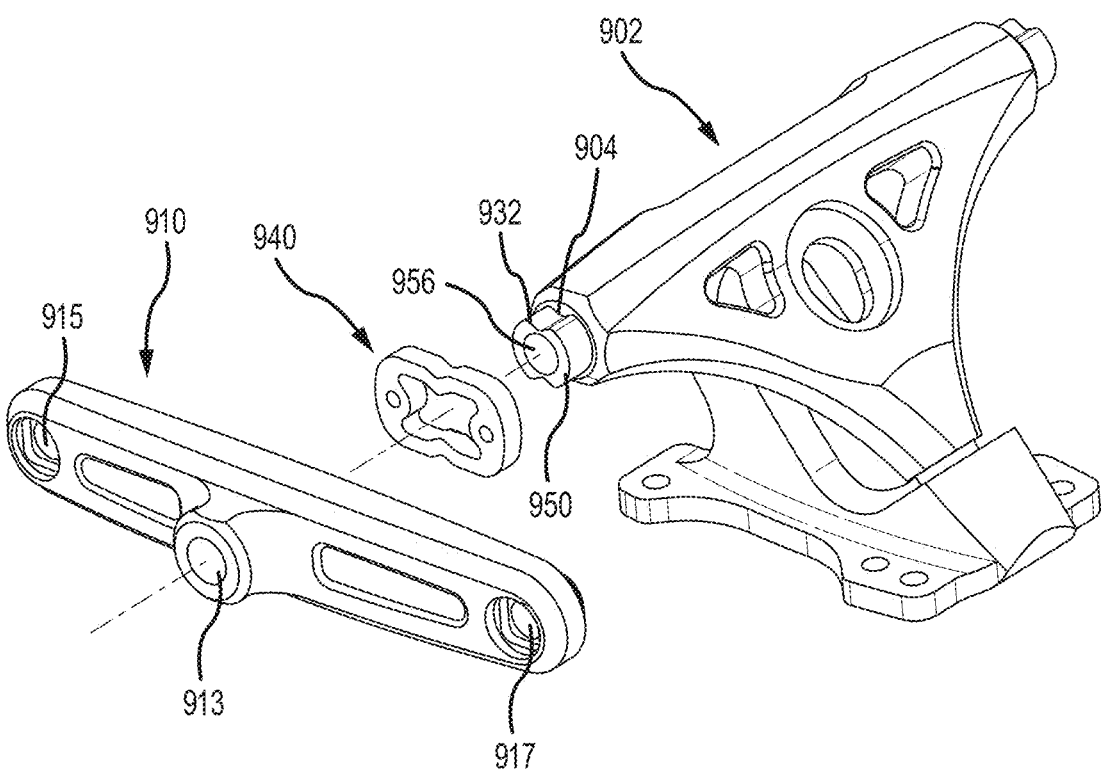
FIG. 17 illustrates an exploded view of the level arm, spring insert, and hanger of the truck of FIG. 1.

The lifting effect allows the truck 900 to smoothly traverse obstacles due to the lifting of the leading wheel 922 and the trailing wheel 924 upon the level arm 910 rotating about the central axle 908. However, in some situations, such as when the skateboard is being carried rather than ridden, it may be desirable for the rotation of the level arm 910 to be selectively restricted. Doing so can prevent the level arm 910 from freely swinging back and forth while the skateboard is being carried, which can lead to the wheels slamming against the underside of the skateboard. Referring now to FIGS. 16-17, the level arm 910 may comprise a spring mechanism 930 that provides a certain amount of mechanical interference to control the rotation of the level arm 910 about the axle. In many embodiments, the spring mechanism 930 can comprise an insert recess 932 formed within level arm 910 and configured to receive a spring insert 940. The spring insert 940 can be configured to engage and work in conjunction with one or more components of the truck 900 to create a "spring effect" that provides resistance against rotation of the level arm 910 under certain loads. The insert recess 932 can be formed within the middle region 914 of the level arm 910 and can be centered about the middle bore 915 of the level arm 910. In this way, the middle bore 915 can extend through a portion of the insert recess 932 and the central axle 908 can extend through the entirety of the insert recess 932. Preferably, the insert recess 932 is formed inward from an inward facing surface of the level arm 910 (i.e. the side of the level arm 910 that faces toward the hanger 902 when the level arm 910 is affixed to the central axle 908). The location and orientation of the spring insert 940 is provided to expose the corresponding spring insert 940 toward an end of the hanger 902, the geometry of which the spring insert 940 will engage to produce the desired spring effect.

The insert recess 932 can receive a spring insert 940 that is configured to create a spring effect that governs the rotation of the level arm 910 about the axle. The spring insert 940 can be secured within the recess by the use of mechanical fasteners such as screws or snap fit mechanisms, by the use of adhesives, or by a combination thereof. The spring insert 940 is designed to provide a certain amount of resistance against the rotation of the level arm 910 to retain the position of the level arm 910 as the skateboard is being carried. Retaining the position of the level arm 910 as the skateboard is carried through the air protects the skateboard by preventing the auxiliary wheels from slamming against the skateboard deck. The spring insert 940 can be configured to restrict rotation of the level arm 910 under relatively light loads while permitting rotation of the level arm 910 under relatively heavy loads. For instance, the spring insert 940 can restrict rotation of the level arm 910 under light loads typically associated with a user carrying the skateboard rather than riding it. The spring insert 940 can also permit rotation of the level arm 910 under heavy loads experienced when the skateboard is ridden over an obstacle.

In many embodiments, as shown in FIGS. 16 and 17, the spring insert 940 is a single, substantially flat piece and is configured to correspond to the shape of the insert recess 932 such that the spring insert 940 sits flush within the insert recess 932. The spring insert 940 can be formed of a generally flexible material such as an injection-molded plastic. The spring insert 940 can be constructed from any one or combination of the following: nylon, polypropylene, polyethylene, thermoplastic resins, thermoplastic polyurethane, thermosetting resins, aromatic diisocyanates, toluene diisocyanate (TDI), methylene diphenyl diisocyanate (MDI), acrylonitrile butadiene styrene (ABS), acetal, steel, steel alloy, or any material suitable for providing a spring insert 940 with the desired geometry and properties. It is desirable for the spring insert 940 to be formed of a material with a high elongation. The high elongation allows the spring insert 940 to flex and "bounce back" easily. The high elongation material allows the spring insert 940 to flex and bend in response to forces associate with use of the truck 900.

In many embodiments, the spring insert 940 is configured to engage a portion of the hanger 902. As shown in FIG. 17, the hanger 902 comprises a shoulder 950 on each of the first and second ends, where the central axle 908 is attached. The spring insert 940 is disposed within the level arm 910 in such a way that it is mounted on the shoulder 950 of the hanger 902. The shoulder 950 and the spring insert 940 can comprise complementary geometries that together produce the desired spring effect as force is applied to the level arm 910. The spring insert 940 comprises an internal geometry configured to engage the shoulder 950 and act as a spring. The internal geometry can comprise a plurality of apertures, extensions, flexures, slots, grooves, notches, and/or any other features that are configured to engage the central axle 908 and/or hanger 902 in a way that produces the desired spring effect. In many embodiments, the internal geometry can take the form of a cutout extending through the entire thickness of the spring insert 940 and thereby forms one or more apertures. In many embodiments, the shoulder 950 can be generally cylindrical. In some embodiments, the shoulder

950 comprises one or more notches configured to interact and provide resistance between one or more features of the spring insert geometry.

Figure 18:
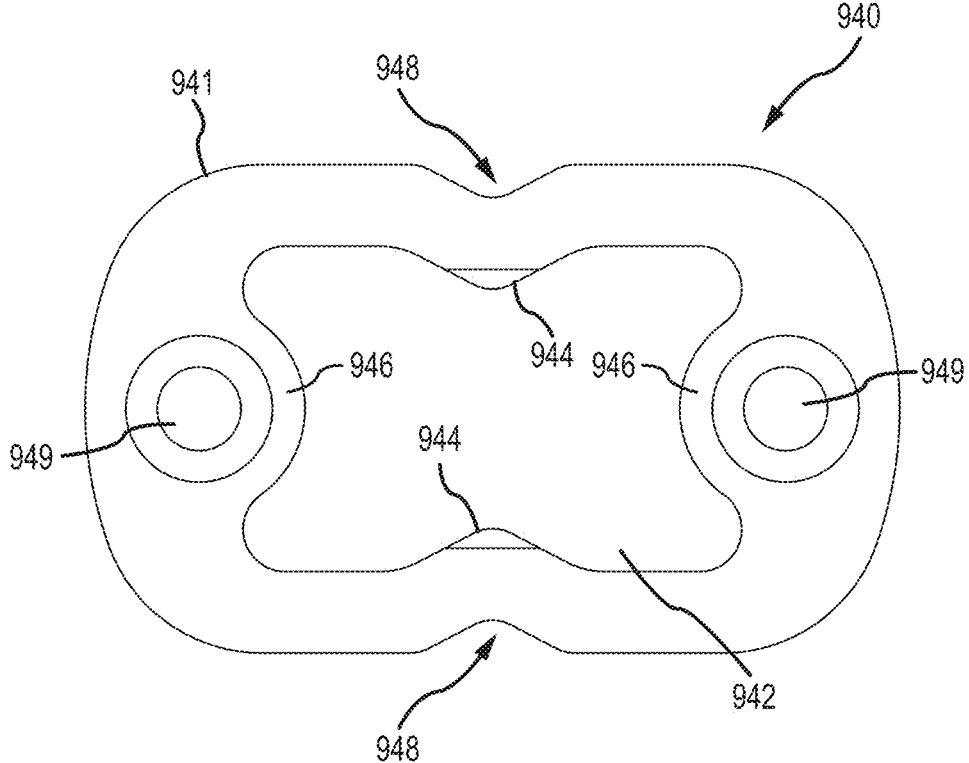
FIG. 18 illustrates a spring insert according to one embodiment of a multi-wheel truck.

In one embodiment, referring to FIG. 18, the spring insert 940 comprises a perimeter 941 forming a central aperture 942 therein, a plurality of protrusions 944, and a plurality of bumper portions 946. The protrusions 944 can extend from the perimeter 941 of the spring insert 940 inward toward the central aperture 942. In many embodiments, the protrusions 944 are configured to fit within corresponding notches 952 formed in the shoulder 950 of the hanger 902. For example, in the illustrated embodiment, the protrusions 944 of the spring insert 940 are generally triangular in shape and are configured to mate with the generally triangular shaped notches 952 formed in the shoulder 950 (as shown in FIG. 17). During use of the truck 900 (either riding or carrying the skateboard), the load on the level arm 910 causes the protrusion 944 to press against the surface of the shoulder 950 and provide resistance against rotation. However, due to the flexibility of the spring insert material, the protrusion 944 will flex to permit rotation of the arm under a sufficient load. In many embodiments, the spring insert 940 comprises a notch 948 formed opposite the protrusion 944. The notch 948 of the spring insert 940 can provide a small space between the perimeter 941 of the spring insert 940 and the insert recess 932, such that the insert is not flush within the recess at the particular location of the notch 948. The space created by the notch 948 provides a greater ability for the protrusion 944 to flex upon engagement with the shoulder 950.

The spring insert 940 further comprises a plurality of bumper portions 946 that act as guides to keep the spring insert 940 centered about the shoulder 950 of the hanger 902 during use of the truck 900, providing stable rotation of the level arm 910. In many embodiments, while the bumper portions 946 abut a portion of the shoulder 950, the contact area between the shoulder 950 and the bumper portions 946 can be minimal in order not to inhibit the rotation of the level arm 910 during regular use of the skateboard. Rather, the protrusions 944 provide the main contact area between the spring insert 940 and the shoulder 950. Under sufficient loads, the protrusions 944 flex to allow the level arm 910 to rotate, and the bumper portions 946 serve to keep the spring insert 940 centered.

The spring insert 940 can further comprise a pair of attachment holes 949 located proximate the perimeter 941. The attachment holes 949 can be configured to receive a mechanical fastener (such as a screw). The attachment holes 949 provide locations for the spring insert 940 to be affixed within the level arm 910 by such mechanical fasteners.

Figure 19:
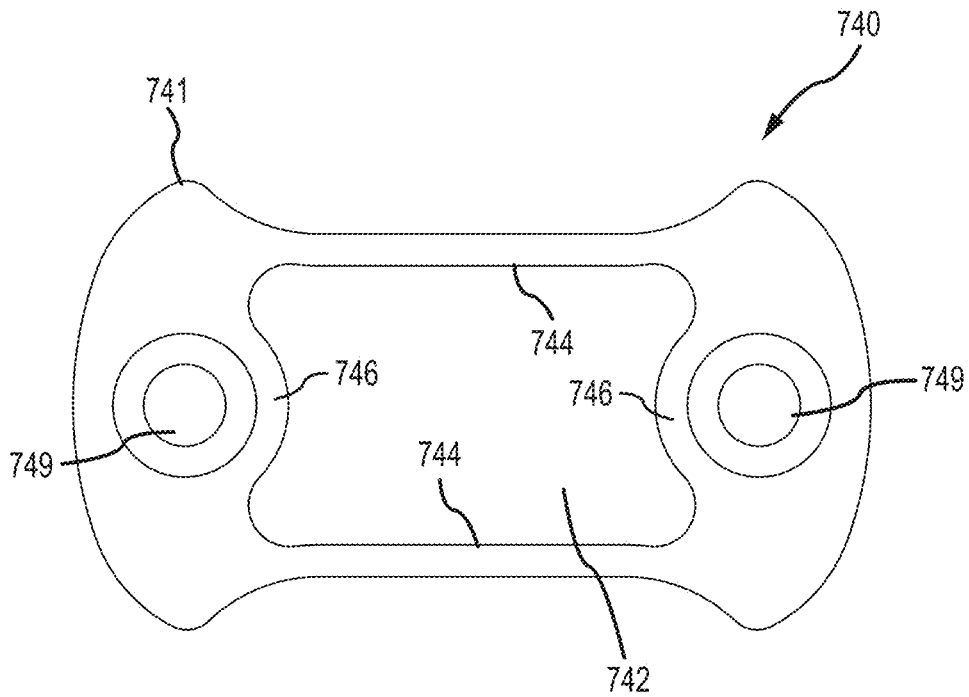
FIG. 19 illustrates a spring insert according to an alternative embodiment of a multi-wheel truck.

FIG. 19 illustrates an alternative embodiment of a spring insert 740 according to the present invention. Spring insert 740 is similar to spring insert 940 and includes substantially the same geometry. Spring insert 740 also performs the same functionality as spring insert 940, wherein upon engagement with the shoulder 950 of the hanger 902, portions of the spring insert geometry are configured to provide resistance against rotation yet flex and allow rotation under sufficient loads. Rather than a protrusion extending inward toward the aperture 742, spring insert 740 comprises a pair of elongated flexure portions 744 extending laterally across the insert. The flexure portion 744 can be substantially thin compared to other portions of the insert, allowing the flexure portion 744 to flex upon engagement with the shoulder 950 of the hanger 902. Similar to the notch 948 of spring insert 940, the flexure portion 744 of spring insert 740 can form a space between the perimeter 741 of the spring insert 740 and the insert recess 932. This space allows the flexure portion 744 to flex outward as the shoulder 950 presses against the flexure portion 744. Under sufficient loads, the flexure portion 744 flexes enough to allow rotation of the level arm 910. In many embodiments, spring insert 740 further comprises a plurality of bumper portions 746 and attachment holes 749 similar to those of spring insert 940.

Figure 20:
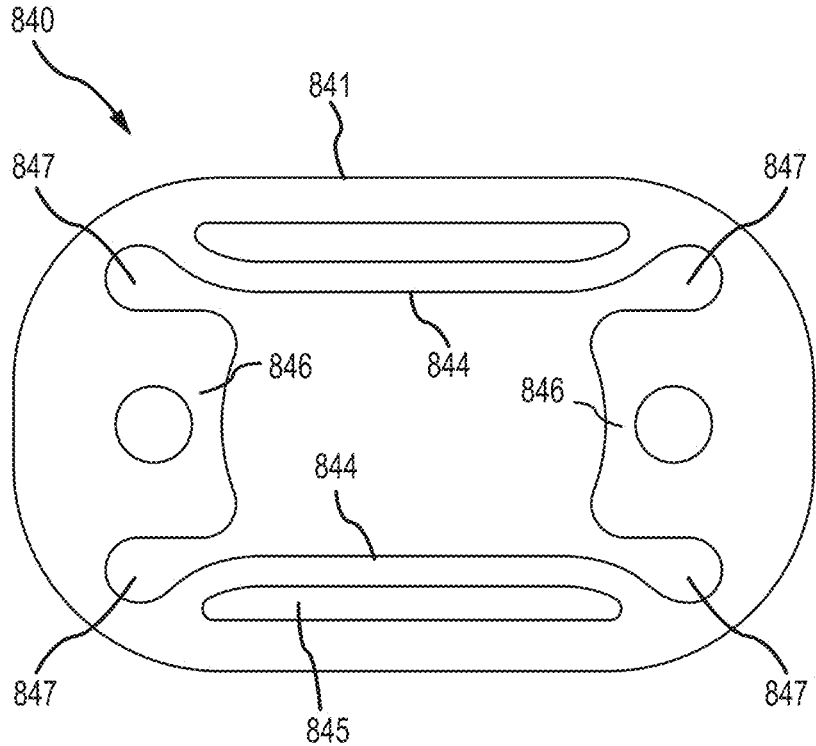
FIG. 20 illustrates a spring insert according to another alternative embodiment of a multi-wheel truck.

FIG. 20 illustrates another alternative embodiment of a spring insert 840 according to the present invention. Spring insert 840 is similar to spring inserts 940 and 740 and includes substantially similar features. Spring insert 840 also performs the same functionality as spring inserts 940 and 740, wherein upon engagement with the shoulder 950 of the hanger 902, portions of the spring insert geometry are configured to provide resistance against rotation, yet flex and allow rotation under sufficient loads. Spring insert 840 comprises a plurality of elongate protrusions 844 that extend away from the perimeter 841 and are configured to engage a portion of the shoulder 950. The spring insert 840 further comprises a slot 845 that separates the elongate protrusion 844 from the perimeter 841. The slot 845 allows the elongate protrusion 844 to flex outward toward the perimeter 841 as the shoulder 950 presses against the elongate protrusion 844. Under sufficient loads, the elongate protrusion 844 flexes enough to allow rotation of the level arm 910. The spring insert 840 further comprises bumper portions 846 similar to the bumper portions 946 of spring insert 940. However, instead of bumper portions 946 that create a small contact area between the bumper portion 846 and the shoulder 950, the bumper portions 846 of spring insert 840 can comprise arcuate surfaces that correspond to the shape of the shoulder 950 and provide a larger contact area between the bumper portion 846 and the shoulder 950. This configuration provides extra stability in centering the spring insert 840 with respect to the central axle 908 and the hanger 902, while still allowing the level arm 910 to rotate. In some embodiments, spring insert 840 further comprises a plurality of gaps 847 formed between each of the bumper portions 846 and elongate protrusions 844. The plurality of gaps 847 can separate the bumper portions 846 and elongate protrusions 844 from one another and allow greater overall flexure within the internal geometry of the spring insert 840.

The spring insert 940 governs the rotation of the level arm 910. When the truck 900 is on the ground, the level arm 910 can be considered at a "rest" position. When at rest, the level arm 910 can be generally parallel to the deck of the skateboard, and the wheels can be spaced approximately evenly away from the underside of the deck. When the skateboard is carried (i.e. when the wheels are not touching the ground), the weight of the wheels applies a force to the level arm 910, causing the level arm 910 to want to rotate away from rest position. The geometry of the spring insert 940 can engage with the geometry of the shoulder 950 and restrict the level arm 910 from rotating, and the level arm 910 will generally be retained in rest position. By retaining the level arm 910 in the rest position and restricting its rotation, the spring mechanism 930 prevents the wheels from slamming into the underside of the deck, as would be the case if the level arm 910 were able to rotate freely as the board is being carried.

During use of the skateboard, however, it is desirable for the level arm 910 to rotate and produce the lifting effect in order to allow the multi-wheel truck 900 to smoothly traverse discontinuous and uneven surfaces. The spring mechanism 930 can permit the level arm 910 to rotate during use of the skateboard. If a sufficient moment is applied to the level arm 910 during use, as would be the case when traversing a crack or uneven surface, the force of the shoulder 950 pressing against the flexible spring insert 940 causes the spring portion to flex, permitting the level arm 910 to rotate and produce the desired lifting effect.

In many embodiments, the spring mechanism 930 can comprise a rotation threshold. The rotation threshold can be defined as the smallest force applied to the level arm 910 wherein the spring mechanism 930 allows the level arm 910 to rotate. For instance, if a force applied to the level arm 910 is less than the rotation threshold, the spring mechanism 930 restricts rotation of the level arm 910 and retains the level arm 910 in the rest position. In contrast, if a force applied to the level arm 910 is greater than the rotation threshold, the spring mechanism 930 permits the level arm 910 to rotate. The rotation threshold can depend on the design of the spring insert 940, specifically the internal geometry and the materials used. Preferably, the spring insert 940 is designed such that the lesser forces associated with the carrying of the skateboard are below the rotation threshold, whereas the greater forces associated with riding a skateboard over obstacles and discontinuous surfaces are preferably above the rotation threshold. In some embodiments, the rotation threshold is approximately between 0.1 ft-lb and 1.5 ft-lb. In some embodiments, the rotation threshold can be approximately between 0.1 ft-lb and 0.25 ft-lb, approximately between 0.25 ft-lb and 0.5 ft-lb, approximately between 0.5 ft-lb and 0.75 ft-lb, approximately between 0.75 ft-lb and 1.0 ft-lb, or approximately between 1.0 ft-lb and 1.5 ft-lb. In some embodiments the rotation threshold can be approximately between 0.1 ft-lb and 0.4 ft-lb, between approximately 0.4 ft-lb and 0.7 ft-lb, between approximately 0.7 ft-lb and 1.1 ft-lb, or between approximately 1.1 ft-lb and 1.5 ft-lb. The rotation threshold allows the spring mechanism 930 to restrict rotation of the level arm 910 under sufficiently small loads yet allow rotation of the level arm 910 under sufficiently large loads.

In many embodiments, the spring mechanism 930 comprises a spring insert 940 located within an insert recess 932 formed from a level arm 910. However, in alternative embodiments, rather than comprising a separate spring insert 940 within the level arm 910, the spring mechanism 930 can be integrally formed within level arm 910. In other words, the level arm 910 can be formed with an integral spring geometry centered about the middle bore 915 that provides the same spring effect as the spring inserts of the above embodiments. In many such embodiments, the level arm 910 comprising an integral spring geometry can be formed of a non-metallic material, such as an injection molded plastic material or a composite material. Embodiments of lift arms with integral spring mechanisms are discussed in further detail below.

Remaining Features

As discussed above, the multi-wheel truck 900 comprises a hanger 902 and a baseplate 970 that serve to couple the plurality of wheel sets and configure the truck 900 to be attachable to the underside of a skateboard deck. As shown in FIG. 16, the hanger 902 is configured to couple the wheel sets to the truck 900, and the baseplate 970 is configured to receive the hanger 902 and attach the truck 900 to the underside of the skateboard deck.

Figure 21:
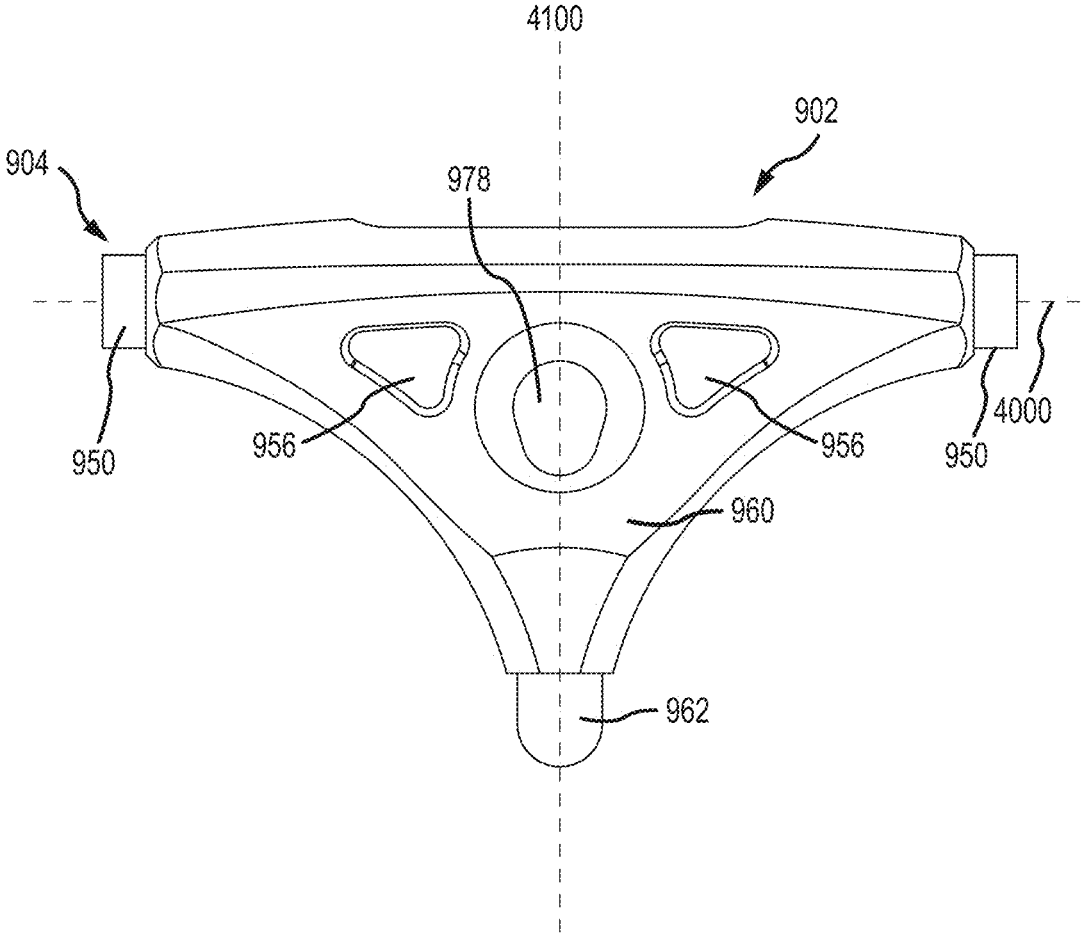
FIG. 21 illustrates a top view a hanger of the truck according to the embodiment of FIG. 1.
Figure 22:
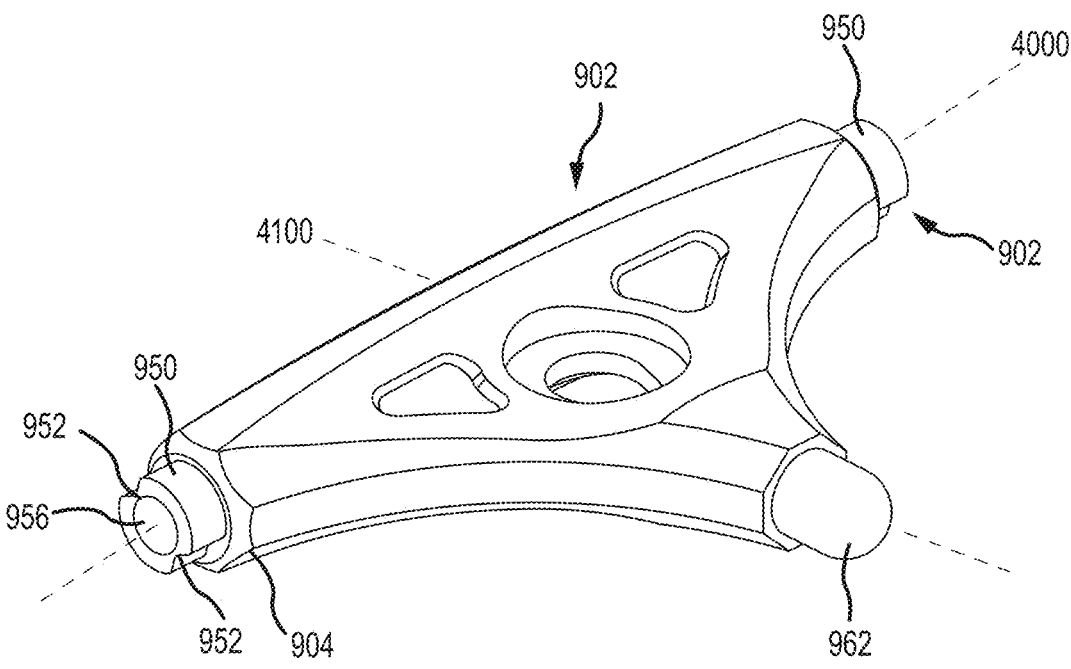
FIG. 22 illustrates a perspective view of the hanger of FIG. 14.

FIGS. 21 and 22 illustrate an embodiment of the hanger 902 of the multi-wheel truck 900. The hanger 902 comprises a first end 904 and a second end 906 opposite the first end 904. The hanger 902 defines a longitudinal axis 4000 extending between the first end 904 and the second end 906, wherein the first and second ends are each located proximate the longitudinal axis 4000. The hanger 902 further defines a transverse axis 4100 that extends perpendicular to the longitudinal axis 4000. As such, the transverse axis 4100 corresponds to a front-to-rear direction of the hanger 902, with respect to the front and the rear of the skateboard. In many embodiments, the first and second ends are located proximate a front of the hanger 902, while other components of the hanger 902, such as a pivot tip 962 or pivot saddle 972, may be located rearward of the first and second ends. In many embodiments, a maximum width of the hanger 902 is located between the first and second ends, such that the front of the hanger 902 comprises the hanger's widest portion. The first and second ends generally form the widest portion of the hanger 902 so that the wheel sets, which are attached to the first and second ends, are spaced away from the remainder of the hanger 902 and are free to rotate without interference from the hanger 902.

Each of the first end 904 and the second end 906 can comprise a void 956 configured to couple the wheel set to the hanger 902. The void 956 is configured to receive the central axle 908 of the wheel set and fixedly attach the central axle 908 to the hanger 902. In many embodiments, the void 956 is threaded to receive a correspondingly threaded portion of the central axle 908. In some embodiments, the void 956 can comprise any form of attachment mechanism suitable for fixedly securing a portion of the central axle 908 therein such as snap fits, adhesives, epoxies, magnets, interlocking attachment mechanisms, or some combination thereof.

As discussed briefly above, the hanger 902 further comprises a plurality of shoulders 950 configured to engage the spring insert 940 of the level arm 910 upon rotation of the level arm 910. As shown in FIGS. 21 and 22, the hanger 902 comprises a shoulder 950 located at each of the first and second end 906. In many embodiments, the shoulder 950 protrudes from the end of the hanger 902 such that it may be received within the internal geometry of the spring insert 940. The shoulder 950 comprises a geometry configured to correspond to the internal geometry of the spring insert 940 in such a way that the shoulder 950 can engage the spring insert 940 upon rotation of the level arm 910 and produce the spring effect discussed above. As illustrated in the embodiment of FIGS. 21 and 22, the geometry comprises a generally cylindrical shape but for a plurality of notches 952 around its perimeter. Each notch 952 can be configured to receive a protrusion 944 of a spring insert 940, such as the protrusions 944 of spring insert 940. As the level arm 910 rotates about the central axle 908, the surface of the notch 952 can press against the protrusion 944 of the spring insert 940 and restrict rotation of the level arm 910 up to a certain amount of force.

In many embodiments, the hanger 902 can be configured to pivot left or right about a portion of the baseplate 970 to control the direction of the skateboard during use. As the rider shifts his or her weight toward either the right or left side of the skateboard, the hanger 902 can pivot about the baseplate 970, turning the skateboard either left or right. The hanger 902 comprises a pivot body 960 configured to engage a pivot cup 964 of the baseplate 970 and allow the hanger 902 to pivot. The pivot body 960 can be located rearward of the front of the hanger 902 and can comprise a width substantially less than the maximum width of the hanger 902. In many embodiments, the pivot body 960 is generally triangularly shaped with rounded edges that allow the hanger 902 to pivot about a surface of the pivot cup 964.

The hanger 902 further comprises a pivot tip 962 configured to center the hanger 902 about the baseplate 970. In many embodiments, the pivot tip 962 protrudes from a rearmost portion of the hanger 902. The pivot tip 962 can be received by a portion of the baseplate 970 such as a pivot cup 964, which will be further detailed below. In many embodiments, the pivot tip 962 is generally cylindrical but for a capped or tipped end that allows the hanger 902 to smoothly rotate and/or pivot within the pivot cup 964. The pivot tip 962 can be integrally formed with the hanger 902, thereby forming a continuous hanger structure.

As illustrated in FIG. 21 The hanger 902 comprises a king pin aperture 978 that receives a king pin 975 or other attachment mechanism to allow the hanger 902 to be coupled to one or more other components of the truck 900, such as a baseplate 970. The king pin aperture 978 can be a through aperture extending through a portion of the hanger body. In many embodiments, the king pin aperture 978 is located substantially in the center of the hanger 902, proximate the pivot body 960. In many embodiments, the king pin aperture 978 is located between the pivot body 960 and the front of the hanger 902. The connection between the hanger 902 and the baseplate 970 via the king pin aperture 978 is further detailed below.

In some embodiments, the hanger 902 can comprise one or more weight saving features. The weight saving features can be provided in the form of a notch, an indentation, a gap, a void, or a bore, etc. The weight saving features are zones or portions of the hanger 902 that are devoid of material. The weight saving features can be provided within any portion of the hanger 902, such as the first end 904, the second end 906, the pivot body 960, the pivot tip 962, substantially proximate the front of the hanger 902, or substantially proximate the rear of the hanger 902. In many embodiments, the weight saving features are provided within the pivot body 960, as the pivot body 960 is generally the most substantial portion of the hanger mass.

The hanger 902 can be constructed from any material used to construct a conventional skateboard truck. The hanger 902 can be constructed from any one or combination of the following: 8620 alloy steel, S25C steel, carbon steel, maraging steel, 17-4 stainless steel, 1380 stainless steel, 303 stainless steel, stainless steel alloy, brushed steel, tungsten, magnesium, magnesium alloy, titanium, titanium alloy, Ti-6-4, aluminum, aluminum alloy, aluminum 2024, aluminum 3003, aluminum 5052, aluminum 6061, aluminum 7075, ADC-12, aluminum A356, magnesium AZ61A, magnesium AZ80A, magnesium AZ31B, carbon fiber reinforced plastic composite, glass filled plastic composite, nylon, polyether ether ketone, polyetherimide, polyphenylene sulfide or any material suitable for creating a hanger or skateboard truck. In many embodiments, the hanger 902 can be constructed of aluminum 6061, aluminum A356, or magnesium AZ61A. The material of the hanger 902 can vary based upon the intended use and/or desired weight of the hanger 902.

The weight saving features can occupy between approximately 1% to approximately 20% of the volume of the hanger 902. In many embodiments, the weight saving features can occupy between approximately 1% to approximately 5%, approximately 5% to approximately 10%, approximately 10% to approximately 15%, or approximately 15% to approximately 20% of the volume of the hanger 902. In alternative embodiments, the weight saving features can occupy between approximately 1%, approximately 2%, approximately 3%, approximately 4%, approximately 5%, approximately 6%, approximately 7%, approximately 8%, approximately 9%, approximately 10%, approximately 11%, approximately 12%, approximately 13%, approximately 14%, approximately 15%, approximately 16%, approximately 17%, approximately 18%, approximately 19%, or approximately 20% of the hanger volume. The one or more weight saving features allows the mass of the hanger 902 to be kept to a minimum while maintaining structural integrity.

Figure 23:
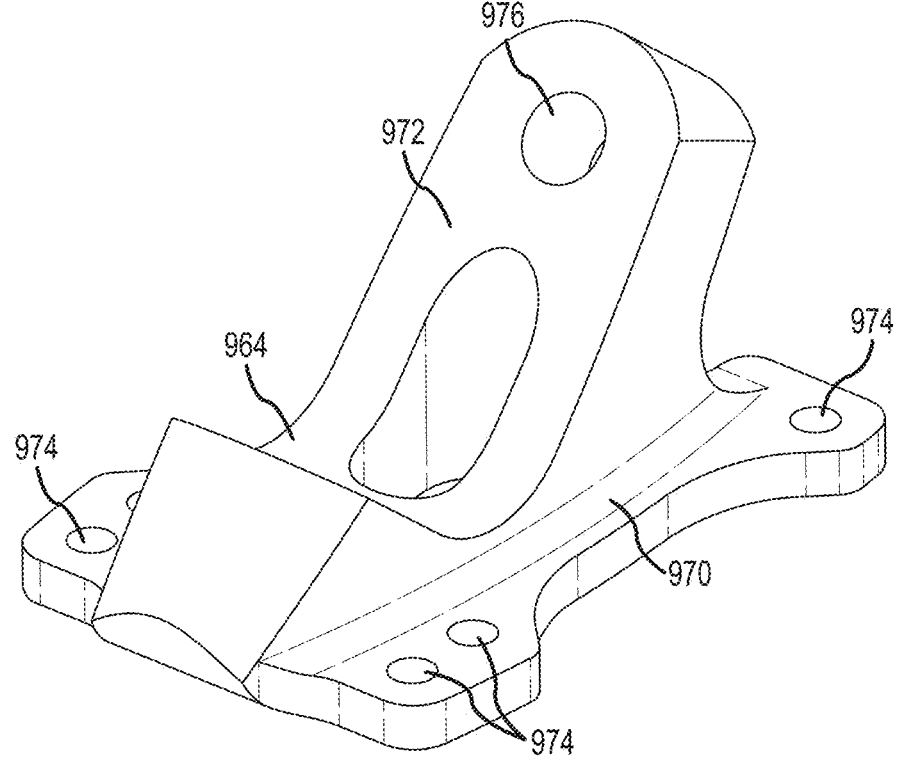
FIG. 23 illustrates a perspective view of a baseplate according of the truck according to the embodiment of FIG. 1.

The truck 900 further comprises a baseplate 970 configured to receive the hanger 902 and couple the truck 900 to the underside of a skateboard deck. The baseplate 970 can be mechanically attached to the underside of the skateboard deck by any fastening means such as screws, bolts, adhesives, snap fits, or some combination thereof. In many embodiments, as illustrated in FIG. 23, the baseplate 970 comprises a plurality of apertures 974 extending through the body of the baseplate 970 and configured to receive a mechanical fastener such as a bolt or screw. In many embodiments, each of the plurality of apertures 974 are proximal to the outer periphery or outer perimeter edge of the baseplate 970. Further, in some embodiments, the apertures 974 can be threaded to receive a corresponding threaded fastener. In some embodiments, the baseplate 970 can have two apertures, three apertures, four apertures, five apertures, six apertures, or seven apertures. In many embodiments, the base plate can comprise at least four apertures 974 to provide sufficient structural rigidity to affix the baseplate 970 to the deck of the skateboard.

The baseplate 970 can be constructed from any material used to construct a conventional skateboard truck. The baseplate 970 can be constructed from any one or combination of the following: 8620 alloy steel, S25C steel, carbon steel, maraging steel, 17-4 stainless steel, 1380 stainless steel, 303 stainless steel, stainless steel alloy, brushed steel, tungsten, magnesium, magnesium alloy, titanium, titanium alloy, Ti-6-4, aluminum, aluminum alloy, aluminum 2024, aluminum 3003, aluminum 5052, aluminum 6061, aluminum 7075, ADC-12, aluminum A356, magnesium AZ61A, magnesium AZ80A, magnesium AZ31B, carbon fiber reinforced plastic composite, glass filled plastic composite, nylon, polyether ether ketone, polyetherimide, polyphenylene sulfide or any material suitable for creating a baseplate or skateboard truck. In many embodiments, the baseplate 970 can be constructed of aluminum 6061, aluminum A356, or magnesium AZ61A. The material of the baseplate 970 can vary based upon the intended use and/or desired weight of the baseplate 970.

The baseplate 970 further comprises a saddle 972 and a pivot cup 964 extending in a direction opposite the skateboard deck. The saddle 972 forms a base for the pivot body 960 of the hanger 902 to sit and pivot upon. In many embodiments, the surface of the saddle 972 is substantially flat. This allows the rounded surface and/or rounded edges of the hanger 902 the ability to pivot about the surface of the saddle 972. The saddle 972 can be located near the front of the baseplate 970 and can orient the hanger 902 in such a way that the front of the hanger 902 is proximate the front of the baseplate 970 when fully assembled. In many embodiments, the saddle 972 extends away from the skateboard deck at an angle so that the hanger 902 is oriented at an angle with respect to the deck of the skateboard. By angling the hanger 902 in such a way, the pivoting action of the hanger 902 upon the saddle 972 causes the wheels to turn either left or right. In this way, the rider can control the direction of the skateboard during use by shifting his or her weight to the left or to the right.

The saddle 972 further comprises a king pin receiving port 976. The king pin receiving port 976 can take the form an aperture extending through the saddle 972. The king pin receiving port 976 is configured to receive a king pin 975 that couples the baseplate 970 to the hanger 902. In many embodiments, the king pin receiving port 976 may or may not be threaded. The geometrical characteristics of the king pin receiving port 976 (i.e. thread type, thread count, pitch, etc.) can vary based upon the type and geometry of the king pin 975.

The pivot cup 964 is formed rearward of the saddle 972 and is configured to receive the pivot tip 962 of the hanger 902. The pivot cup 964 forms a cup-like structure including one or more inner walls forming a cavity. The pivot cup 964 is shaped to receive the pivot tip 962 and house the pivot tip 962 within the cavity. When assembled, the pivot cup 964 helps to center the hanger 902 on the baseplate 970 by retaining the pivot tip 962 within the pivot cup 964. In many embodiments, the inner walls of the pivot cup 964 can form a generally cylindrical shape that corresponds to the generally cylindrical shape of the pivot tip 962. In this way, the pivot tip 962 can be retained within the pivot cup 964, while still being allowed to rotate within the pivot cup 964 as the hanger 902 pivots.

Figure 24:
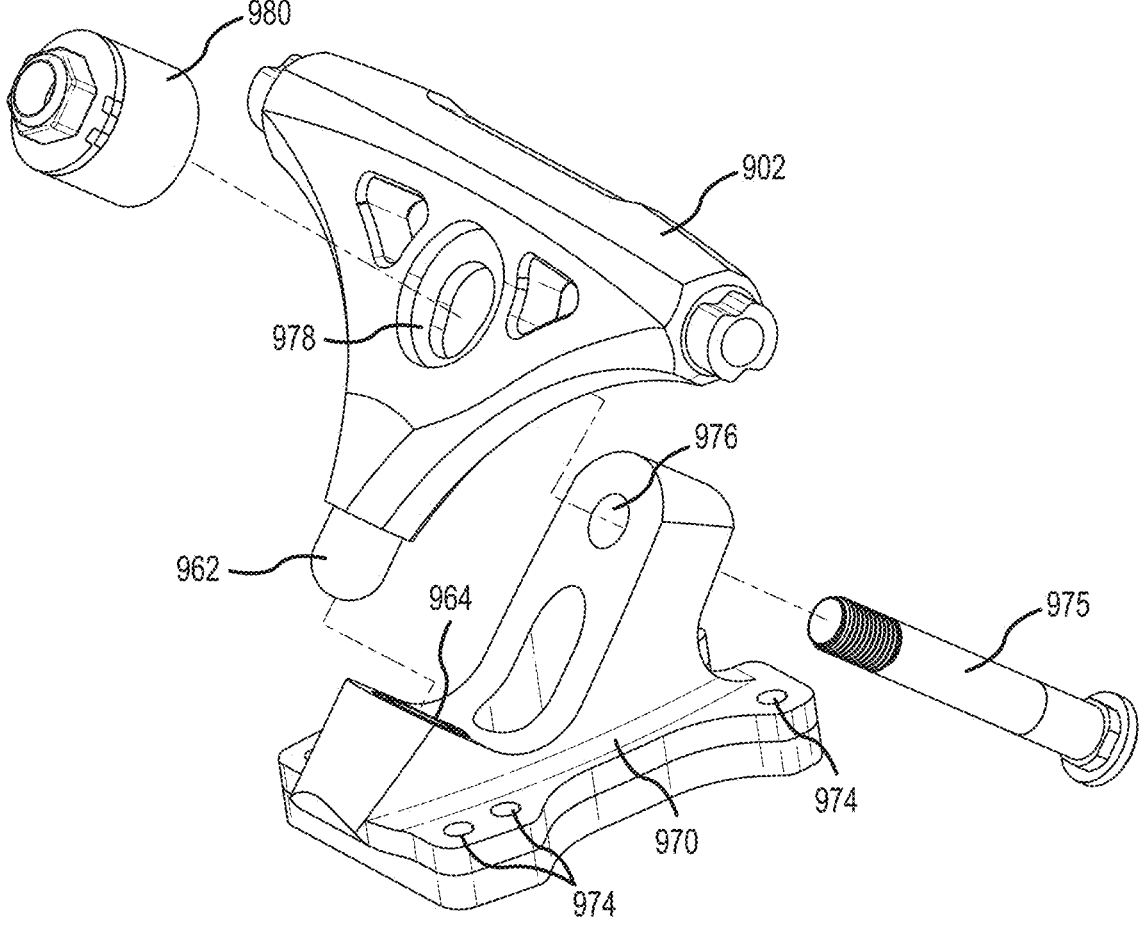
FIG. 24 illustrates an exploded view of a hanger and baseplate assembly of the truck of FIG. 1.

FIG. 24 illustrates the configuration in which the hanger 902 and the baseplate 970 are coupled. The hanger 902 sits upon the baseplate 970 and is coupled thereto by a king pin 975. The hanger 902 sits upon the angled saddle 972, orienting the hanger 902 at an angle with respect to the skateboard deck. The pivot body 960 of the hanger 902 rests upon the surface of the saddle 972 in a way that allows the hanger 902 to pivot about the saddle 972. Further, the pivot tip 962 of hanger 902 is inserted into the pivot cup 964 of the baseplate 970 to center the hanger 902 with respect to the baseplate 970.

The king pin receiving port 976 of the saddle 972 is aligned with the king pin aperture 978 of the hanger 902 and each are configured to receive a king pin 975. In many embodiments, the king pin 975 is a threaded, elongate screw. The king pin 975 extends through each of the king pin receiving port 976 and the king pin aperture 978 to couple the hanger 902 and the base. In many embodiments, a threaded bolt 980 can be attached to a threaded end of the king pin 975 to lock the king pin 975 in place and secure the connection between the baseplate 970 and the hanger 902.

As described above, the multi-wheel truck 900 comprises one or more level arms 910 that serve to connect a plurality of wheels in a wheel set and rotate to provide a lifting effect over obstacles and discontinuous surfaces. In many embodiments, the one or more level arms 910 are constructed of a metallic material, a non-metallic material, or some combination thereof. In many embodiments the one or more level arms 910 can be constructed of any one or combination of the following: 8620 alloy steel, S25C steel, carbon steel, maraging steel, 17-4 stainless steel, 1380 stainless steel, 303 stainless steel, stainless steel alloy, brushed steel, tungsten, magnesium, magnesium alloy, titanium, titanium alloy, Ti-6-4, aluminum, aluminum alloy, aluminum 2024, aluminum 3003, aluminum 5052, aluminum 6061, aluminum 7075, ADC-12, aluminum A356, magnesium AZ61A, magnesium AZ80A, magnesium AZ31B, carbon fiber reinforced plastic composite, glass filled plastic composite, nylon, polyether ether ketone (PEEK), polyetherimide, polyphenylene sulfide or any material suitable for creating components of a skateboard truck. In many embodiments, the one or more level arms 910 can be constructed of aluminum 6061, aluminum A356, or magnesium AZ61A. In other embodiments, the one or more level arms 910 can be constructed of nylon or carbon fiber reinforced nylon. In some embodiments, the one or more level arms 910 can comprise a multi-part construction combining a portion formed of a carbon fiber reinforced plastic and a plastic without carbon fiber reinforcement.

Figure 25:
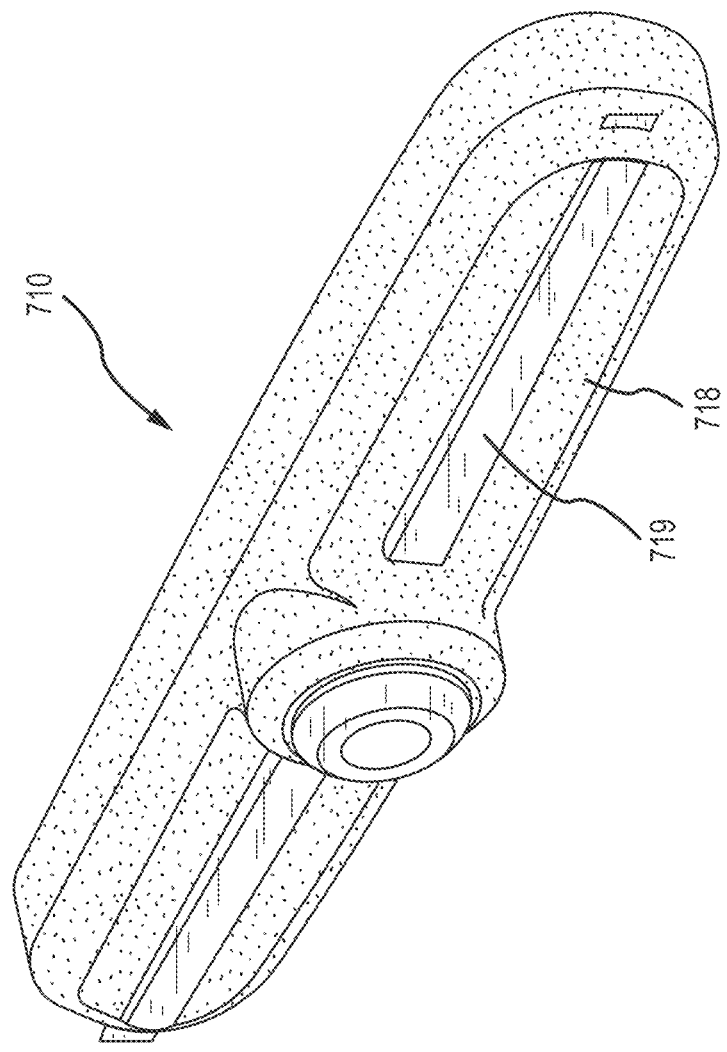
FIG. 25 illustrates a perspective view of a level arm of a multi-wheel truck according to an alternative embodiment.

As illustrated in an alternative embodiment of FIG. 25, the one or more level arms 710 can comprise a multi-part construction comprising a skeletal portion 718 and a casing portion 719. The skeletal portion 718 can be an internal portion of the level arm 710 and can comprise the main structural elements of the level arm, including forming the front, middle, and rear apertures of the level arm 710. In this way, the skeletal portion 718 is the only portion of the level arm that directly receives and contacts the plurality of axles of the wheel set. The skeletal portion 718 can be formed of a high strength material to provide support and durability to the level arm 710. In many embodiments, the skeletal portion 718 can be constructed of a hard plastic such as a carbon fiber reinforced plastic composite material or a glass filled plastic composite material, a metallic material, or any other material possessing sufficient strength to provide support and durability to the level arm 710.

The casing portion 719 surrounds and encases at least a portion of the skeletal portion 718. In many embodiments, the casing portion 719 is constructed of a "softer material" comprising a higher elongation than the skeletal portion 718. In many embodiments, the casing portion 719 is constructed of an injection molded plastic, an unfilled plastic (i.e. a plastic devoid of carbon fiber or glass reinforcement), nylon, polypropylene, polyethylene, or any other plastic or other material with the desired elongation. The casing portion 719 can provide protection against failure of the level arm 710. For example, if the skeletal portion 718, which is rigid due to its high strength, was to become damaged and crack or fail completely, the high elasticity of the casing portion 719 would allow the surrounding casing portion 719 to elongate rather than break. This configuration protects against catastrophic failure of the level arm 710.

The casing portion 719 can also be configured to comprise a spring mechanism integrally formed within. Due to the ability to injection mold the casing portion 719, the casing portion 719 can be designed to comprise a spring geometry substantially similar to the geometry of spring inserts 940, 740, and 840. Including an integrally formed spring mechanism within the level arm 710 itself eliminates the need for a separately formed spring insert.

As discussed above, the multi-wheel truck 900 comprises a plurality of wheels including at least one central wheel 920 and one or more auxiliary wheels. Each wheel may be characterized by a diameter (wheel diameter), a width (wheel width), a durometer (wheel durometer), and a material (wheel material). In many embodiments, the characteristics (diameter, width, durometer, and/or material) of the central wheel 920 can differ from those of one or more of the auxiliary wheels. In other embodiments, the characteristics of the central wheel 920 can be substantially similar to those of one or more of the auxiliary wheels.

In many embodiments, the diameter of one or more wheels, as illustrated in FIG. 13, ranges approximately between 1.5 inches and 4.0 inches. In some embodiments, the diameter of one or more wheels can range between 1.5 inches and 2.0 inches, between 2.0 inches and 2.5 inches, between 2.5 inches and 3.0 inches, between 3.0 inches and 3.5 inches, or between 3.5 inches and 4.0 inches. In some embodiments, the diameter of one or more wheels can range between 1.5 inches and 1.75 inches, between 1.75 inches and 2.0 inches, between 2.0 inches and 2.25 inches, between 2.25 inches and 2.5 inches, between 2.5 inches and 2.75 inches, between 2.75 inches and 3.0 inches, between 3.0 inches and 3.25 inches, between 3.25 inches and 3.5 inches, between 3.5 inches and 3.75 inches, or between 4.0 inches.

One or more wheels can have a substantially similar diameter with respect to another wheel, two or more wheels, three or more wheels, four or more wheels, or five or more wheels. In many embodiments the at least one central wheel 920 can have a substantially similar diameter D1 with respect to one or more auxiliary wheels. In some embodiments, one or more auxiliary wheels can have a substantially similar diameter D2 with respect to one or more other auxiliary wheels. For example, the leading wheel 922 of a particular wheel set can comprise a substantially similar diameter to the trailing wheel 924 of the same wheel set. In other embodiments, one or more auxiliary wheels can have a substantially different diameter D2 with respect to one or more other auxiliary wheels. For example, the leading wheel 922 of a particular wheel set can comprise a substantially greater or substantially lesser diameter than the trailing wheel 924 of the same wheel set.

In alternative embodiments, one or more wheels can have a substantially different diameter with respect to another wheel, two or more wheels, three or more wheels, four or more wheels, or five or more wheels. In many embodiments the at least one central wheel 920 can have a substantially different diameter with respect to one or more auxiliary wheels. In some embodiments, the diameter D1 of at least one central wheel 920 can be less than the diameter D2 of at least one auxiliary wheel. In some embodiments, the diameter D1 of at least one central wheel 920 can be greater than the diameter D2 of at least one auxiliary wheel. In some embodiments, one or more auxiliary wheels can have a substantially different diameter with respect to one or more other auxiliary wheels. For example, the leading wheel 922 of a particular wheel set can comprise a substantially greater or substantially lesser diameter than the trailing wheel 924 of the same wheel set.

The diameter of the one or more wheels is significant in allowing the truck 900 to smoothly traverse obstacles and discontinuous surfaces. The wheels are sized with sufficiently large diameters such that when a given wheel encounters an obstacle, the point along the wheel that contacts the obstacle occurs low enough on the wheel to reduce the force of impact between the wheel and the obstacle. As discussed above, the diameter of the one or more wheels also impacts the attack angle α. Reducing or increasing the diameter of the leading and/or central wheel 920 alters the position of reference point R1 and/or reference point R2 in relation to one another. Altering the location of the reference points may change the orientation of reference line A and effect the attack angle α formed between reference line A and reference line B.

For example, in some embodiments, each of the wheels can be provided with substantially small diameters to provide a substantially steep attack angle α (i.e. an attack angle substantially greater than 45 degrees). In other embodiments, each of the wheels can be provided with a substantially large diameter to provide a substantially shallow angle of attack a (i.e. an attack angle substantially greater than 45 degrees). In some embodiments, each of the wheels can be provided with a different diameter in order to optimize the attack angle α. In some embodiments the leading wheel 922 can comprise the greatest diameter, the central wheel 920 can comprise a diameter D1 less than the diameter of the leading wheel 922, and the trailing wheel 924 can comprise a diameter less than both the leading wheel 922 and the central wheel 920. Such an embodiment with a large leading wheel 922 diameter can provide an extra advantage in traversing obstacles. The leading wheel 922 is generally the first wheel to encounter such obstacles, and providing a large leading wheel 922 diameter minimizes the impact between the obstacle and the leading wheel 922. As discussed above, the diameter of each respective wheel can be balanced with the width and spacing of each wheel to optimize the attack angle α.

In many embodiments, the wheel width for one or more wheels can range between approximately 0.1 inches and 2.5 inches. In some embodiments, the width of one or more wheels can be between approximately 0.1 and 0.5 inches, between 0.5 and 1.0 inches, between 1.0 and 1.5 inches, between 1.5 and 2.0 inches, or between 2.0 and 2.5 inches. In some embodiments, the wheel for one or more wheels can be between approximately 0.1 and 0.25 inches, between 0.25 and 0.5 inches, between 0.5 and 0.75 inches, between 0.75 and 1.0 inches, between 1.0 and 1.25 inches, between 1.25 and 1.5 inches, between 1.5 and 1.75 inches, between 1.75 and 2.0 inches, between 2.0 and 2.25 inches, or between 2.25 and 2.5 inches.

In many embodiments, the width W2 of each auxiliary wheel is substantially the same as the width of the other auxiliary wheels. For example, the trailing wheel 924 and leading wheel 922 in a given wheel set generally comprise the same width W2. In many embodiments, the width W2 of the auxiliary wheels is approximately 0.5 inches. In many embodiments, the width W2 of one or more of the auxiliary wheels can range between approximately 0.1 and 1.5 inches. In some embodiments, the width W2 of one or more auxiliary wheels can range between approximately 0.1 and 0.3 inches, between 0.3 and 0.5 inches, between 0.5 and 0.7 inches, between 0.7 and 0.9 inches, between 0.9 and 1.1 inches, between 1.1 and 1.3 inches, and between 1.3 and 1.5 inches.

In many embodiments, the width W1 of the central wheel 920 is greater than the width W2 of the auxiliary wheels. In many embodiments, the width W1 of the central wheel 920 is approximately 1.7 inches. In many embodiments, the width W1 of the central wheel 920 can range between approximately 1.0 and 2.5 inches. In some embodiments, the width W1 of the central wheel 920 can be between 1.0 and 1.25 inches, between 1.25 and 1.5 inches, between 1.5 and 1.75 inches, between 1.75 and 2.0 inches, between 2.0 and 2.25 inches, or between 2.25 and 2.5 inches. The central wheel 920, which generally bears the majority of the load when the skateboard is rolling along a smooth rolling surface, is provided with a greater width W1 to provide increased stability to the truck 900 as well as to increase the durability of the central wheel 920.

The respective widths of the wheels, particularly the widths of the central and leading wheels 922, impact the attack angle α. Reducing or increasing the width of the leading and/or central wheel 920 alters the position of reference point R1 and/or reference point R2 in relation to one another. Altering the location of the reference points may change the orientation of reference line A and affect the attack angle α formed between reference line A and reference line B.

In many embodiments, the wheel durometer for each wheel can be determined by the intended use of the wheel and desired gripping ability with the ground surface. For example, if the user requires wheels that provides enough grip to maneuver over uneven or continuous surfaces, sidewalk contraction joints, cracks, pebbles, rocks, etc., then the durometer of one or more wheels measured on a Shore A durometer scale can range between approximately 78 A-98 A. In other embodiments, the durometer of one or more wheels can be between approximately 78 A-80 A, 80 A-82 A, 82 A-84 A, 84 A-86 A, 86 A-88 A, 88 A-90 A, 90 A-92 A, 92 A-94 A, 94 A-96 A, or 96 A-98 A. In some embodiments, the wheel durometer value can be 78 A, 79 A, 80 A, 81 A, 82 A, 83 A, 84 A, 85 A, 86 A, 87 A, 88 A, 89 A, 90 A, 91 A, 92 A, 93 A, 94 A, 95 A, 96 A, 97 A, or 98 A. To achieve a desired wheel durometer, the plurality of wheels can be comprised of various plastic or plastic polyurethane materials of differing hardness values.

In many embodiments, one or more wheels can be constructed of a material selected from the group comprising: Thermoplastic resins, thermoplastic polyurethane, thermosetting resins, aromatic diisocyanates, toluene diisocyanate (TDI), methylenediphenyl diisocyanate (MDI), nylon, polypropylene, polyethylene, or any material suitable for creating a skateboard wheel. In some embodiments, the material of the central wheel 920 is the same as the material of the plurality of auxiliary wheels 922, 924. In other embodiments, the central wheel 920 can be constructed of a first material selected from the above group while the plurality of auxiliary wheels 922, 924 are constructed of a second material selected from the above group. In many embodiments, the central wheel 920 is constructed of a thermosetting plastic such as MDI and the plurality of auxiliary wheels 922, 924 are constructed of TPU.

More information regarding multi-wheel skateboard trucks can be found in pending U.S. Patent Publication No. 2021-0402283, filed Jun. 29, 2021.

VI. ELECTRIC TRUCK

The skateboard decks described herein can be coupled with any form of an electronic motorized wheel, electric motors, or any assembly that would form an electronically powered skateboard assembly. In some embodiments, the skateboard can have a remote that controls the motor and thus dictates the speed at which the board travels. The electronically powered skateboard assembly can further comprise a battery pack to power the motors.

In some embodiments (not shown), the multi-wheel truck 900 described herein can be configured to be applied to an electric skateboard. In many embodiments, the multi-wheel truck 900 can be configured to receive one or more belts connected to an electric motor. In such embodiments, the belt can connect the electric motor to 'the central axle 908, wherein the motor is configured to drive the central axle 908 via the one or more belts. The electric motor can deliver power to the axle by driving the belt, which in turn spins the axle. In such embodiments, the central wheel 920 of each wheel set can be fixedly attached to the central axle 908 rather than rotatably attached. This way, the central wheels 920 can spin when powered by the electric motor and propel the skateboard forward.

In other embodiments (not shown), the multi-wheel truck 900 can comprise one or more wheels configured to receive a hub motor. Each hub motor can be caged inside each of the central wheels 920 and can couple to the central axle 908. In such embodiments, the hub motor can rotate about the central axle 908, providing power to the central wheel 920 and causing the central wheel 920 to spin. The spinning of the central wheel 920 by the hub motor propels the skateboard forward.

In some embodiments, the multi-wheel truck 900 can be configured to receive one or more sensors in one of the wheels, one or more of the axles, the hanger 902, or the pivot saddle 972. The sensors can be in communication with the motor and transmit a signal that controls the speed of the motor when the user steps on to the board or shifts weight. In this way, the user can control the speed of the skateboard by leaning forward or backwards on the deck of the skateboard.

VII. DECAL

In many embodiments, one or more stiffening layers can comprise a graphic or decal to enhance the aesthetic appearance of the multi-material skateboard deck 100. In particular, it is desirable for any stiffening layers that form a visible surface of the multi-material skateboard deck 100 (i.e. the riding surface 114 or the underside surface 116) to comprise a graphic or decal 160. In many embodiments one or more stiffening layers forming a visible surface of the multi-material skateboard deck 100 which can comprise a decal 160 encased within the resin matrix. Encasing the decal 160 within the resin matrix allows the decal to be visible, as if printed on or adhered to the surface of the laminate, as well as protects the decal from scratching, peeling, or otherwise becoming damaged.

In many embodiments, the decal 160 can be a vinyl decal. The decal 160 can comprise any shape or size suitable to fit within the stiffening layer. In many embodiments, particularly in embodiments comprising a relatively large decal, the decal 160 can comprise a plurality of perforations that allow resin to easily flow through the decal 160. The plurality of perforations can keep the decal 160 from folding or creasing as the resin is applied to the stiffening layer.

Because the top layer 120 and the bottom layer 130 form the visible surfaces including the riding surface 114 and the underside surface 116 of the multi-material skateboard deck 100, it may be desirable to provide graphics on the top outer surface 142 and/or the bottom outer surface 152. In many embodiments, as illustrated in FIG. 2A, the top layer 120 and/or the bottom layer 130 comprises a decal 160 or graphic encased within the resin matrix of the carbon fiber reinforced polymer making up the layer.

VIII. METHOD OF MANUFACTURING THE MULTI-MATERIAL SKATEBOARD DECK

Figure 6:
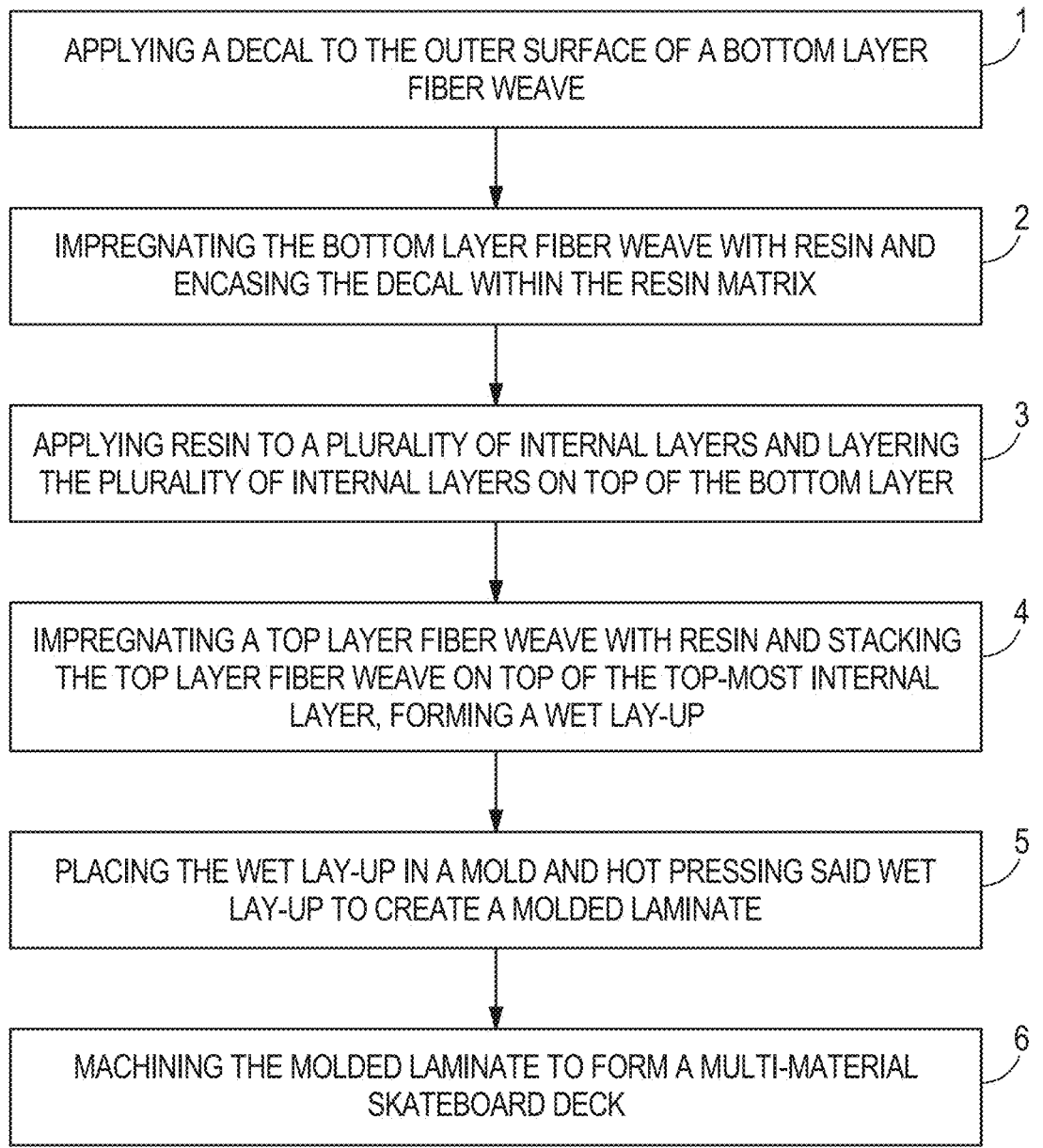
FIG. 6 is a process flow diagram of a method of manufacturing the multi-material skateboard deck of FIG. 2B.
Figure 7:
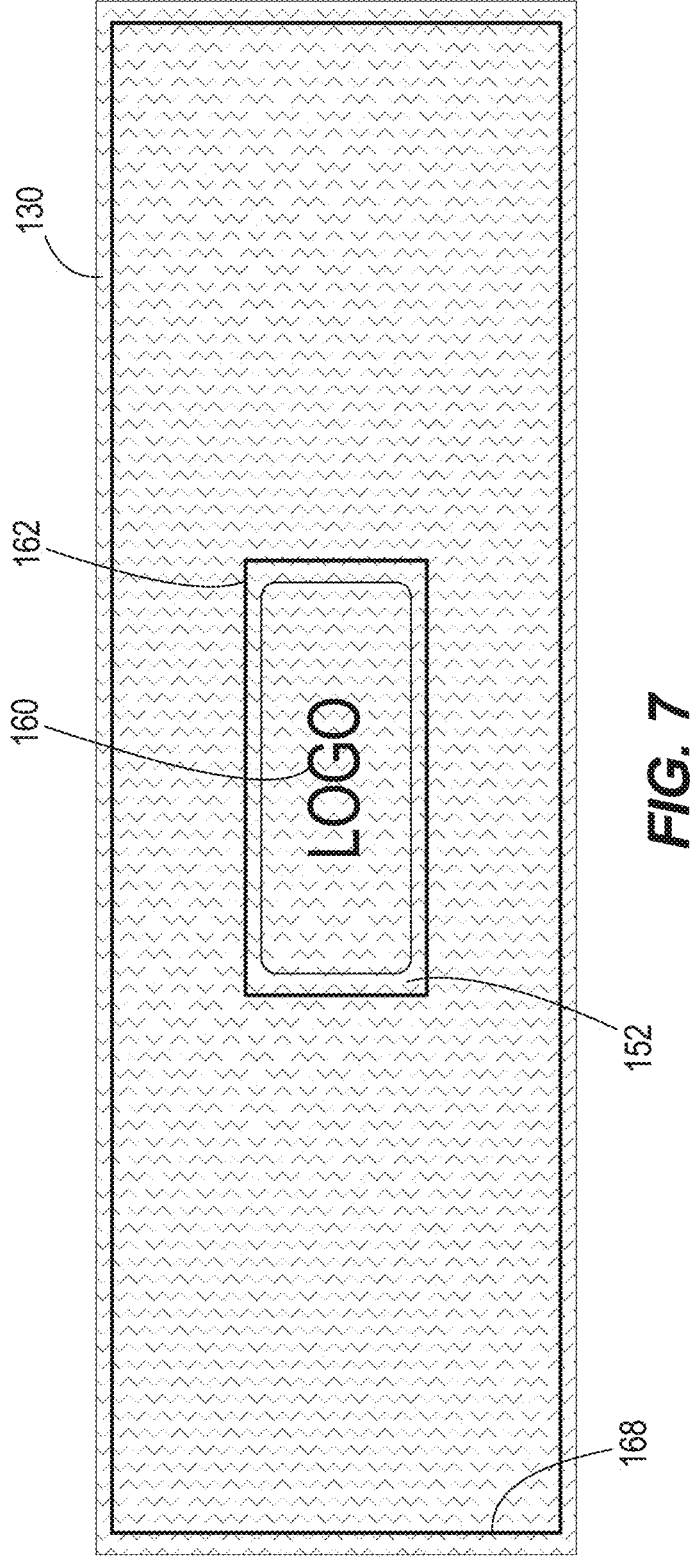
FIG. 7 illustrates a bottom view of the multi-material skateboard deck of the FIG. 2B showing the process of applying the decal to the outer surface of the bottom layer.

In many embodiments, the multi-material skateboard deck is formed through a lamination and pressing process. FIG. 6 illustrates a process flow diagram describing one embodiment of a method of manufacturing a multi-material skateboard deck with a top and bottom layer comprising a fiber-reinforced composite material, a plurality of internal layers made of a resilient material, and a decal encased within the resin matrix. In many embodiments, lamination is accomplished through a process wherein a plurality of dry (un-impregnated) fiber weaves and resilient layers are impregnated with resin, pressed, and molded. Referring to block 1 and illustrated in FIG. 7, a decal is aligned with a fiber weave that, after impregnation and lamination, forms the bottom layer of the skateboard deck. In many embodiments, the decal is a vinyl decal. The decal can be aligned at a specific position on the fiber weave and can further be aligned in a specific orientation in relation to the directionality of the fibers. In many embodiments, the decal can be aligned with the bottom layer fiber weave by the use of a stencil 162. The stencil 162 can properly orient the decal in relation to the bottom layer fiber weave.

Referring to block 2, the bottom layer fiber weave can be impregnated with resin. The resin applied to the fiber weave can be one of the resins described above. The resin can be applied to both the outer surface and the inner surface of the bottom layer fiber weave. The resin can soak through the entire fiber weave, impregnating the fibers and encasing the decal within the resin matrix. Encasing both the fibers and the decal within the resin matrix allows the decal to be protected within the bottom layer when fully laminated.

Referring to block 3, each internal layer (i.e. the first internal layer, second internal layer, third internal layer, and fourth internal layer) is coated with resin and layered on the bottom layer fiber weave one by one. For example, before allowing the resin of the bottom layer to dry, the fourth internal layer can be layered on top of the bottom layer and coated with resin. Similarly, the third internal layer can be layered on top of the fourth internal layer and coated with resin. This process is repeated for each of the internal layers. Each internal layer can be bonded together by the resin, and the bottom-most internal layer (i.e. the fourth internal layer) can be bonded to the inner surface of the bottom layer.

Referring to block 4, a top layer fiber weave is layered on top of the top-most internal layer (i.e. the first internal layer). The top layer fiber weave is the fiber weave that will, after impregnation and lamination, form the top layer of the skateboard deck. Resin is applied to the top layer fiber weave in a similar manner as the bottom layer fiber weave. In some embodiments, a decal can be optionally adhered to the top layer fiber weave. The decal can be applied to the outer surface of the top layer fiber weave and resin can be applied to the outer surface and the inner surface of the top layer fiber weave to impregnate the fibers of the top prepreg sheet and encase the decal within the resin matrix.

Impregnation of the various fiber weaves and internal layers creates a wet lay-up, comprising an uncured version of the multi-material skateboard deck. Referring to block 5, the wet lay-up is molded and cured to form a laminate of the multi-material skateboard deck. The lamination of the wet lay-up is achieved by use of a hydraulic press. The wet layup can be placed in a mold that is in turned placed within the hydraulic press for molding. The hydraulic press applies a force of 40 tons or less to the deck to shape and compress the deck layers. In some embodiments, the hydraulic press applies a force between 20 and 25 tons, 25 and 30 tons, 30 and 35 tons, or 35 and 40 tons. When applied to the uncut deck layup, the pressure exerted on the deck is between 90 and 200 psi. In some embodiments, the pressure is between 90 and 100 psi, 100 and 110 psi, 110 and 120 psi, 120 and 130 psi, 130 and 140 psi, 140 and 150 psi, 150 and 160 psi, 160 and 170 psi, 170 and 180 psi, 180 and 190 psi, or 190 and 200 psi.

The mold can be any shape suitable of molding the layup to create the desired shape including but not limited to the shapes described above. In many embodiments, the wet lay-up is placed within the mold and hot pressed. The high temperatures that the press can produce will decrease the viscosity of the resin applied to the deck. This decrease in viscosity, along with the high pressure applied by the press, aids in removing excess resin from the interlaminar layers and composite layers. A reduction in the amount of resin used to manufacture a composite material improves the mechanical properties and performance of the deck. In many embodiments, the layup is heated to a temperature that will cure every known thermoset of the resin for a predetermined amount of time. While heating, pressure is simultaneously applied to the wet lay-up by the hydraulic press via the mold. The combination of heat and pressure molds and cures the wet lay-up into a laminate comprising the desired shape of the skateboard deck.

In some embodiments, the wet lay-up is heated to a temperature at or above 150° F. In some embodiments, the wet lay-up is heated to a temperature at or above 155° F., 160° F., 165° F., 170° F., 175° F., 180° F., 185° F., 190° F., 195° F., 200° F., 205° F., or 210° F. The wet lay-up is heated to the necessary temperature for a predetermined amount of time to fully cure the specific type of resin being used. In many embodiments, the wet lay-up is heated to the appropriate curing temperature for between 15 minutes and 60 minutes. In many embodiments, the wet lay-up is heated to the appropriate curing temperature for between 15 minutes and 35 minutes, between 20 minutes and 40 minutes, between 25 minutes and 45 minutes, between 30 minutes and 50 minutes, between 35 minutes and 55 minutes, or between 40 minutes and 60 minutes. In some embodiments, the wet lay-up can be heated above the glass transition temperature for approximately 15 minutes, 20 minutes, 25 minutes, 30 minutes, 35 minutes, 40 minutes, 45 minutes, 50 minutes, 55 minutes, or 60 minutes. Utilizing heat allows for the use of a higher performance resin to adhere the deck layers. The heat, coupled with the force of the hydraulic press, reduces the viscosity of the resin, which allows for improved fiber impregnation with the higher performance resin. The hot press process also removes excess resin from between deck layers by lowering the resin viscosity, which results in a higher performance deck. Removing up to 30% of the excess resin provides a structure that is mostly dependent on the deck layers instead of the adhesive epoxy. In some embodiments, rather than being hot pressed, the wet lay-up can be cold pressed. In such embodiments, high pressure can be applied to the wet lay-up without heating the wet lay-up. The molding process forms the wet lay-up into a pressed and cured laminate prepared to be cut to form the final desired profile of the skateboard deck.

After lamination, referring to block 6, the laminate is cut to form the desired final shape of the skateboard deck. The cutting of the board can be achieved through a subtractive manufacturing process, such as CNC machining. The uncut laminate can be machined to remove excess material such that only the final profile of skateboard deck profile remains. In many embodiments, the laminate may comprise one or more alignment features 168 in the top and/or bottom layer to allow for precise alignment of the laminate in the CNC machine. The one or more alignment features 168 can be formed during the molding process as indentations into the outer surface of the top layer and/or bottom layer. After molding, alignment holes can be drilled into the laminate at the location of each alignment feature 168. Prior to the machining process, the alignment holes can be configured to mate with one or more corresponding features of the CNC machine, holding the skateboard deck in the precise location necessary to produce the desired cut. By using the mold to create the alignment holes, the laminate can be consistently and repeatably positioned within the CNC machine, simplifying the manufacturing process and producing a skateboard deck repeatably cut to the proper dimensions.

Following cutting the deck to the proper size and shape, a protective two-component acrylic coat is sprayed onto the exterior deck surface and left to cure at room temperature for 24 hours. This acrylic coating provides protection against ultraviolet (UV) radiation, moisture, and minor scratches. UV radiation can degrade the epoxy, resulting in a decrease in the deck mechanical properties and changing the epoxy aesthetics to a less visually appealing yellow color. Preventing moisture from being introduced to the maple veneers will extend the overall life of the deck by preserving the original wood properties.

IX. EXAMPLE I

An exemplary skateboard deck coupon, measuring 10 inches by 1 inch was compared to a similar control skate-board deck coupon in a 3-point bend test. Both the exemplary coupon and the control coupon were a sample section of a skateboard deck. The exemplary coupon comprised a multi-material skateboard deck coupon made of 6 layers. The exemplary coupon had the same layering as the multi-material skateboard deck 100. The top layer comprised a triaxial woven carbon fiber reinforced polymer. The first internal layer comprised maple wood wherein the grain was oriented in parallel to the longitudinal axis. The second internal layer comprised maple wood wherein the grain was oriented in perpendicular to the longitudinal axis. The third internal layer comprised maple wood wherein the grain was oriented in parallel to the longitudinal axis. The fourth internal layer comprised maple wood wherein the grain was oriented in parallel to the longitudinal axis. The bottom layer comprised a triaxial woven carbon fiber reinforced polymer. The top layer and the bottom layer act as stiffening layers and have a density less than the first, second, third, and fourth internal layers.

The control coupon comprised seven layers wherein all seven layers were made from maple wood. The first layer comprised maple wood wherein the grain was oriented in parallel to the longitudinal axis. The second layer comprised maple wood wherein the grain was oriented in parallel to the longitudinal axis. The third layer comprised maple wood wherein the grain was oriented in perpendicular to the longitudinal axis. The fourth layer comprised maple wood wherein the grain was oriented in parallel to the longitudinal axis. The fifth layer comprised maple wood wherein the grain was oriented in perpendicular to the longitudinal axis. The sixth layer comprised maple wood wherein the grain was oriented in parallel to the longitudinal axis. The seventh layer comprised maple wood wherein the grain was oriented in parallel to the longitudinal axis.

The exemplary coupon had a weight of 40.5 grams and yielded at a force of 163.7 lbf. The control coupon had a weight of 51.5 grams and yielded at a force of 202 lbf. These results showed that the exemplary coupon had a strength-to-weight ratio of 4.0 lbf/g and the control coupon had a strength-to-weight ratio of 3.9 lbf/g. The better strength-to-weight ratio of the exemplary coupon allows for the entire skateboard deck made from the same layup as the exemplary coupon to retain strength while decreasing the weight. The coupon weights are a good measure of the overall weight savings for the different skateboard deck layups. When comparing this exemplary coupon to the industry standard coupon, a weight savings of approximately 22% could be expected using the same layup as the exemplary coupon.

X. EXAMPLE II

An exemplary skateboard deck coupon, measuring 10 inches by 1 inch was compared to a similar control skate-board deck coupon in a 3-point bend test. Both the exemplary coupon and the control coupon were a sample section of a skateboard deck. The exemplary coupon comprised a multi-material skateboard deck coupon made of 7 layers. The exemplary coupon had the same layering as the multi-material skateboard deck 200. The top layer comprised a triaxial woven carbon fiber reinforced polymer. The first internal layer comprised maple wood wherein the grain was oriented in parallel to the longitudinal axis. The second internal layer comprised maple wood wherein the grain was oriented in parallel to the longitudinal axis. The third internal layer comprised maple wood wherein the grain was oriented in perpendicular to the longitudinal axis. The fourth internal layer comprised maple wood wherein the grain was oriented in parallel to the longitudinal axis. The fifth internal layer comprised maple wood wherein the grain was oriented in parallel to the longitudinal axis. The bottom layer comprised a triaxial woven carbon fiber reinforced polymer. The top layer and the bottom layer act as stiffening layers and have a density less than the first, second, third, and fourth internal layers.

The control coupon comprised nine layers wherein all nine layers were made from maple wood. The first layer comprised maple wood wherein the grain was oriented in parallel to the longitudinal axis. The second layer comprised maple wood wherein the grain was oriented in parallel to the longitudinal axis. The third layer comprised maple wood wherein the grain was oriented in perpendicular to the longitudinal axis. The fourth layer comprised maple wood wherein the grain was oriented in parallel to the longitudinal axis. The fifth layer comprised maple wood wherein the grain was oriented in perpendicular to the longitudinal axis. The sixth layer comprised maple wood wherein the grain was oriented in parallel to the longitudinal axis. The seventh layer comprised maple wood wherein the grain was oriented in parallel to the longitudinal axis.

The exemplary coupon had a weight of 47.9 grams and yielded at a force of 230.7 lbf. The control coupon had a weight of 70 grams and yielded at a force of 248 lbf. These results showed that the exemplary coupon had a strength-to-weight ratio of 4.8 lbf/g and the control coupon had a strength-to-weight ratio of 3.5 lbf/g. The better strength-to-weight ratio of the exemplary coupon allows for the entire skateboard deck made from the same layup as the exemplary coupon to retain strength while decreasing the weight. The coupon weights are a good measure of the overall weight savings for the different skateboard deck layups. When comparing this exemplary coupon to the industry stiff coupon, weight savings of approximately 32% could be expected using the same layup as the exemplary coupon.

XI. EXAMPLE III

An exemplary skateboard deck coupon, measuring 10 inches by 1 inch was compared to a similar control skateboard deck coupon in a 3-point bend test. Both the exemplary coupon and the control coupon were a sample section of a skateboard deck. The exemplary coupon comprised a multi-material skateboard deck coupon made of 5 layers. The exemplary coupon had the same layering as the multi-material skateboard deck 300. The top layer comprised a triaxial woven carbon fiber reinforced polymer. The first internal layer comprised a unidirectional carbon fiber oriented in the longitudinal axis direction. The second internal layer comprised of an end grain balsa wood. The third internal layer comprised a unidirectional carbon fiber oriented in the longitudinal axis direction. The bottom layer comprised a triaxial woven carbon fiber reinforced polymer. The top layer and the bottom layer act as stiffening layers.

The control coupon comprised seven layers wherein all seven layers were made from maple wood. The first layer comprised maple wood wherein the grain was oriented in parallel to the longitudinal axis. The second layer comprised maple wood wherein the grain was oriented in parallel to the longitudinal axis. The third layer comprised maple wood wherein the grain was oriented in perpendicular to the longitudinal axis. The fourth layer comprised maple wood wherein the grain was oriented in parallel to the longitudinal axis. The fifth layer comprised maple wood wherein the grain was oriented in perpendicular to the longitudinal axis. The sixth layer comprised maple wood wherein the grain was oriented in parallel to the longitudinal axis. The seventh layer comprised maple wood wherein the grain was oriented in parallel to the longitudinal axis.

The exemplary coupon had a weight of 21.5 grams and yielded at a force of 147.5 lbf. The control coupon had a weight of 51.5 grams and yielded at a force of 202 lbf. These results showed that the exemplary coupon had a strength-to-weight ratio of 6.9 lbf/g and the control coupon had a strength-to-weight ratio of 3.9 lbf/g. The better strength-to-weight ratio of the exemplary coupon allows for the entire skateboard deck made from the same layup as the exemplary coupon to retain strength while decreasing the weight. The coupon weights are a good measure of the overall weight savings for the different skateboard deck layups. When comparing this exemplary coupon to the industry standard coupon, weight savings of approximately 59% could be expected using the same layup as the exemplary coupon.

XII. EXAMPLE IV

An exemplary skateboard deck coupon, measuring 10 inches by 1 inch was compared to a similar control skateboard deck coupon in a 3-point bend test. Both the exemplary coupon and the control coupon were a sample section of used skateboard decks. These skateboard decks were heavily used for approximately 1-2 months to expose the decks to real-world wear before the coupons were cut from the decks. The exemplary coupon comprised a multi-material skateboard deck coupon made of 6 layers. The exemplary coupon had the same layering as the multi-material skateboard deck 100. The top layer comprised a triaxial woven carbon fiber reinforced polymer. The first internal layer comprised maple wood wherein the grain was oriented in parallel to the longitudinal axis. The second internal layer comprised maple wood wherein the grain was oriented in perpendicular to the longitudinal axis. The third internal layer comprised maple wood wherein the grain was oriented in parallel to the longitudinal axis. The fourth internal layer comprised maple wood wherein the grain was oriented in parallel to the longitudinal axis. The bottom layer comprised a triaxial woven carbon fiber reinforced polymer. The top layer and the bottom layer act as stiffening layers and have a density less than the first, second, third, and fourth internal layers.

The control coupon comprised seven layers wherein all seven layers were made from maple wood. The first layer comprised maple wood wherein the grain was oriented in parallel to the longitudinal axis. The second layer comprised maple wood wherein the grain was oriented in parallel to the longitudinal axis. The third layer comprised maple wood wherein the grain was oriented in perpendicular to the longitudinal axis. The fourth layer comprised maple wood wherein the grain was oriented in parallel to the longitudinal axis. The fifth layer comprised maple wood wherein the grain was oriented in perpendicular to the longitudinal axis. The sixth layer comprised maple wood wherein the grain was oriented in parallel to the longitudinal axis. The seventh layer comprised maple wood wherein the grain was oriented in parallel to the longitudinal axis.

The exemplary coupon had a weight of 42.5 grams and yielded at a force of 186.4 lbf. The control coupon had a weight of 46.7 grams and yielded at a force of 142.5 lbf. These results showed that the exemplary coupon had a strength-to-weight ratio of 4.4 lbf/g and the control coupon had a strength-to-weight ratio of 3.1 lbf/g. The better strength-to-weight ratio of the exemplary coupon allows for the entire skateboard deck made from the same layup as the exemplary coupon to retain strength while decreasing the weight. The coupon weights are a good measure of the overall weight savings for the different skateboard deck layups. When comparing this exemplary coupon to the industry standard coupon, weight savings of approximately 9% could be expected using the same layup as the exemplary coupon. This test shows that when exposed to use, the exemplary skateboard deck retained a higher strength-to-weight ratio than a ridden industry standard board.

CLAUSE

Clause 1. A skateboard deck comprising a plurality of resilient layers; wherein the plurality of resilient layers is no more than four layers; wherein the plurality of resilient layers comprises a first internal layer, a second internal layer, a third internal layer, and a fourth internal layer; a plurality of stiffening layers; wherein the plurality of stiffening layers comprises a first stiffening layer and a second stiffening layer; wherein: the first stiffening layer and second stiffening layer comprise a fiber-reinforced material; a top outer surface and a bottom outer surface; wherein the first stiffening layer forms the top outer surface and the second stiffening layer forms the bottom outer surface; and wherein the plurality of resilient layers and the plurality of stiffening layers are encased within a resin matrix.

Clause 2. The skateboard deck of clause 1, further comprising a strength-to-weight ratio greater than 4.0 lbf/g.

Clause 3. The skateboard deck of clause 1, wherein a decal can be encased within the resin matrix.

Clause 4. The skateboard deck of clause 1, wherein the first internal layer, second internal layer, the third internal layer, and the fourth internal layer comprise a wood-type material with a grain.

Clause 5. The skateboard deck of clause 4, wherein the first internal layer, the third internal layer, and the third internal layer comprise a grain that aligns with a longitudinal axis, and the second internal layer comprises a gran that aligns with the transverse axis.

Clause 6. The skateboard deck of clause 5, wherein each layer of the plurality of resilient layers are made from maple wood.

Clause 7. The skateboard deck of clause 1, further comprises a shape selected form a group consisting of: a long board shape, a radial shape, a progressive shape, a w-con-cave shape, a flat cave shape, a gas pedal shape, an asymmetric shape, a convex shape, a flat shape, a rocker shape, a camber shape, a drop down shape, a cruiser shape, a mini cruiser shape, and a bull dog cruiser shape.

Clause 8. The skateboard deck of clause 1, wherein the thickness of the resin matrix between each layer of the plurality resilient layers and the stiffening layers is less than 0.005 inches.

Clause 9. The skateboard deck of clause 3, wherein the decal has perforations to allow for the resin matrix to penetrate the decal.

Clause 10. A skateboard deck comprising a plurality of resilient layers; wherein the plurality of resilient layers is no more than four layers; wherein the plurality of resilient layers comprises a first internal layer, a second internal layer, a third internal layer, a fourth internal layer, and a fifth internal layer; a plurality of stiffening layers; wherein the plurality of stiffening layers comprises a first stiffening layer and a second stiffening layer; wherein the first stiffening layer and second stiffening layer comprise a fiber-reinforced material; a top outer surface and a bottom outer surface; wherein the first stiffening layer forms the top outer surface and the second stiffening layer forms the bottom outer surface; wherein the plurality of resilient layers and the plurality of stiffening layers are encased within a resin matrix.

Clause 11. The skateboard deck of clause 10, further comprising a strength-to-weight ratio greater than 4.0 lbf/g.

Clause 12. The skateboard deck of clause 10, wherein a decal can be encased within the resin matrix.

Clause 13. The skateboard deck of clause 10, wherein the first internal layer, second internal layer, the third internal layer, and the fourth internal layer comprise a wood-type material with a grain.

Clause 14. The skateboard deck of clause 13, wherein the first internal layer, the third internal layer, and the third internal layer comprise a grain that aligns with a longitudinal axis, and the second internal layer comprises a gran that aligns with the transverse axis.

Clause 15. The skateboard deck of clause 14, wherein each layer of the plurality of resilient layers are made from a maple wood.

Clause 16. The skateboard deck of clause 10, further comprises a shape selected form a group consisting of: a long board shape, a radial shape, a progressive shape, a w-concave shape, a flat cave shape, a gas pedal shape, an asymmetric shape, a convex shape, a flat shape, a rocker shape, a camber shape, a drop down shape, a cruiser shape, a mini cruiser shape, and a bull dog cruiser shape.

Clause 17. The skateboard deck of clause 10, wherein the thickness of the resin matrix between each layer of the plurality resilient layers and the stiffening layers is less than 0.005 inches.

Clause 18. The skateboard deck of clause 12, wherein the decal has perforations to allow for the resin matrix to penetrate the decal.

Clause 19. A method of manufacturing a skateboard deck comprising coating a first stiffening layer with resin; coating a first resilient layer with resin and placing it on top of the first stiffening layer; coating a second resilient layer with resin and placing it on top of the first resilient layer; coating a third resilient layer with resin and placing it on top of the second resilient layer; coating a fourth resilient layer with resin and placing it on top of the third resilient layer; coating a second stiffening layer with resin and placing it on top of the fourth resilient layer to form a laminated deck; placing the laminated deck into a mold; applying pressure and heat onto the deck with a press for a predetermined amount of time;

removing the deck from the mold to drill necessary holes; cutting the deck to the desired profile; and applying a polyurethane coating to the exterior surface of the deck Clause 20. The method of manufacturing a skateboard deck in clause 19, wherein the press applies a force of up to 40 tons.

Clause 21. The method of manufacturing a skateboard deck in clause 19, wherein the pressure experienced by the press is dependent upon the size and shape of the board.

Clause 22. The method of manufacturing a skateboard deck in clause 19, wherein the heat aids in curing the resin.

Clause 23. The method of manufacturing a skateboard deck in clause 19, wherein the press operates at a temperature of up to 210° F.

Clause 24. The method of manufacturing a skateboard deck in clause 19, wherein the deck is cut using a CNC machining process.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A skateboard deck, consisting of:
   a top surface area of the skateboard deck when viewed from above;
   a bottom surface area of the skateboard deck when viewed from below;
   a top layer made of a triaxial woven fiber-reinforced material extending across 90-100% of the top surface area and having a top inner surface and a top outer surface exposed to an exterior of the skateboard deck;
   a bottom layer made of a triaxial woven fiber-reinforced material extending across 90-100% of the bottom surface area and having a bottom inner surface and a bottom outer surface exposed to the exterior of the skateboard deck;
   a first internal layer made of a wood ply and coupled to the top inner surface;
   a second internal layer made of a wood ply and coupled to the first internal layer;
   a third internal layer made of a wood ply and coupled to the second internal layer;
   a fourth internal layer made of a wood ply, coupled to the third internal layer, and coupled to the bottom inner surface;
   wherein the first internal layer, the second internal layer, the third internal layer, and the fourth internal layer are all sandwiched between the top layer and the bottom layer;
   a resin matrix encasing each of the top layer, the first internal layer, the second internal layer, the third internal layer, the fourth internal layer, and the bottom layer; and
   optionally, a decal.

2. The skateboard deck of claim 1, further comprising a strength-to-weight ratio greater than 4.0 lbf/g.

3. The skateboard deck of claim 1, wherein the decal is present and is encased within the resin matrix.

4. The skateboard deck of claim 1, wherein each of the first internal layer, the second internal layer, the third internal layer, and the fourth internal layer comprises a wood-type material with a grain.

5. The skateboard deck of claim 4, wherein each of the first internal layer, the third internal layer, and the fourth internal layer comprises a grain that aligns with a longitudinal axis, and the second internal layer comprises a grain that aligns with a transverse axis.

6. The skateboard deck of claim 5, wherein each of the first internal layer, the second internal layer, the third internal layer, and the fourth internal layer comprises maple wood.

7. The skateboard deck of claim 1, further comprising a shape selected from a group consisting of: a long board shape, a radial shape, a progressive shape, a w-concave shape, a flat cave shape, a gas pedal shape, an asymmetric shape, a convex shape, a flat shape, a rocker shape, a camber shape, a drop down shape, a cruiser shape, a mini cruiser shape, and a bull dog cruiser shape.

8. The skateboard deck of claim 1, wherein the resin matrix comprises a thickness of less than 0.005 inches between each layer of the top layer, the first internal layer, the second internal layer, the third internal layer, the fourth internal layer, and the bottom layer.

9. The skateboard deck of claim 3, wherein the decal has perforations to allow for the resin matrix to penetrate the decal.

10. A skateboard deck, consisting of:
    a top surface area of the skateboard deck when viewed from above;
    a bottom surface area of the skateboard deck when viewed from below;
    a top layer made of a triaxial woven fiber-reinforced material extending across 90-100% of the top surface area and having a top inner surface and a top outer surface exposed to an exterior of the skateboard deck;
    a bottom layer made of a triaxial woven fiber-reinforced material extending across 90-100% of the bottom surface area and having a bottom inner surface and a bottom outer surface exposed to the exterior of the skateboard deck;
    a first internal layer made of a wood ply and coupled to the top inner surface;
    a second internal layer made of a wood ply and coupled to the first internal layer;
    a third internal layer made of a wood ply and coupled to the second internal layer;
    a fourth internal layer made of a wood ply and coupled to the third internal layer a fifth internal layer made of a wood ply, coupled to the fourth internal layer, and coupled to the bottom inner surface;
    wherein the first internal layer, the second internal layer, the third internal layer, the fourth internal layer, and the fifth internal layer are all sandwiched between the top layer and the bottom layer;
    a resin matrix encasing each of the top layer, the first internal layer, the second internal layer, the third internal layer, the fourth internal layer, the fifth internal layer, and the bottom layer; and
    optionally, a decal.

11. The skateboard deck of claim 10, further comprising a strength-to-weight ratio greater than 4.0 lbf/g.

12. The skateboard deck of claim 10, wherein the decal is present and is encased within the resin matrix.

13. The skateboard deck of claim 10, wherein the first internal layer, the second internal layer, the third internal layer, the fourth internal layer, and the fifth internal layer comprise a wood-type material with a grain.

14. The skateboard deck of claim 13, wherein each of the first internal layer, the third internal layer, and the fifth internal layer comprises a grain that aligns with a longitudinal axis, and each of the second internal layer and the fourth internal layer comprises a grain that aligns with a transverse axis.

15. The skateboard deck of claim 14, wherein each of the first internal layer, the second internal layer, the third internal layer, the fourth internal layer, and the fifth internal layer comprises a maple wood.

16. The skateboard deck of claim 10, further comprising a shape selected from a group consisting of: a long board shape, a radial shape, a progressive shape, a w-concave shape, a flat cave shape, a gas pedal shape, an asymmetric shape, a convex shape, a flat shape, a rocker shape, a camber shape, a drop down shape, a cruiser shape, a mini cruiser shape, and a bull dog cruiser shape.

17. The skateboard deck of claim 10, wherein the resin matrix comprises a thickness of less than 0.005 inches between each layer of the top layer the first internal layer, the second internal layer, the third internal layer, the fourth internal layer, the fifth internal layer, and the bottom layer.

18. The skateboard deck of claim 12, wherein the decal has perforations to allow for the resin matrix to penetrate the decal.

\* \* \* \* \*